US012761656B2

(12) United States Patent
Ikeda et al.

(10) Patent No.: US 12,761,656 B2
(45) Date of Patent: Oct. 13, 2026

(54) CONTROL DEVICE AND REMOTE OPERATION DEVICE

(71) Applicant: TOYOTA JIDOSHA KABUSHIKI KAISHA, Toyota (JP)

(72) Inventors: Keigo Ikeda, Nisshin (JP); Rio Suda, Toyota (JP); Yoshinori Watanabe, Isehara (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 301 days.

(21) Appl. No.: 18/612,456

(22) Filed: Mar. 21, 2024

(65) Prior Publication Data

US 2024/0329651 A1 Oct. 3, 2024

(30) Foreign Application Priority Data

Mar. 30, 2023 (JP) ................................. 2023-054753

(51) Int. Cl.
*G05D 1/227* (2024.01)
*G05D 1/224* (2024.01)
(Continued)

(52) U.S. Cl.
CPC ......... *G05D 1/2274* (2024.01); *G05D 1/2247* (2024.01); *G05D 2109/10* (2024.01); *G05D 2111/17* (2024.01); *G05D 2111/30* (2024.01)

(58) Field of Classification Search
CPC ............... G05D 1/2274; G05D 1/2247; G05D 2109/10; G05D 2111/17; G05D 2111/30; G05D 2105/45; G05D 1/6987; G05D 2107/70; G05D 1/227; G05D 1/43; G05D 1/242; G05D 1/2435; G05D 1/246;
(Continued)

(56) References Cited

U.S. PATENT DOCUMENTS 7,117,743 B2 10/2006 Blakley
12,197,209 B2 * 1/2025 Altman ................ G05D 1/2247
(Continued)

FOREIGN PATENT DOCUMENTS

JP 2017-538619 A 12/2017
JP 2018-063615 A 4/2018
(Continued)

*Primary Examiner* — Thomas Ingram
(74) *Attorney, Agent, or Firm* — Sughrue Mion, PLLC

(57) ABSTRACT

A technique that can prevent conveyance of a moving object from delaying when the moving object stops during autonomous driving by a remote operation. A control device includes a switching execution unit that, when a predetermined first switching condition is satisfied, switches a driving mode of the moving object from a remote autonomous driving mode to a remote manual driving mode, and the first switching condition includes as a condition a case where, during running in the remote autonomous driving mode, the moving object falls in at least one state of (1a) a first state where a state of the moving object has become an abnormal state, (1b) a second state where a moving object has intruded a surrounding area set in advance to surroundings of the moving object, and (1c) a third state where a failure has occurred during the running in the remote autonomous driving mode.

10 Claims, 41 Drawing Sheets

(51) Int. Cl.

| | |
|---|---|
| ***G05D 109/10*** | (2024.01) |
| ***G05D 111/10*** | (2024.01) |
| ***G05D 111/30*** | (2024.01) |

(58) Field of Classification Search

CPC ........ G05D 1/248; G05D 1/633; G05D 1/644; G05D 1/648; G05D 1/65

See application file for complete search history.

(56) References Cited

U.S. PATENT DOCUMENTS

| | | | | |
|---|---|---|---|---|
| 12,572,615 | B2 * | 3/2026 | Lakes | G06F 16/955 |
| 2017/0320529 | A1 | 11/2017 | Nordbruch | |
| 2018/0053415 | A1 * | 2/2018 | Krunic | G08G 1/091 |
| 2019/0339692 | A1 * | 11/2019 | Sakai | G05D 1/0027 |
| 2019/0361436 | A1 * | 11/2019 | Ueda | G05D 1/0038 |
| 2020/0047773 | A1 * | 2/2020 | Akaba | B60W 60/0053 |
| 2023/0133873 | A1 * | 5/2023 | Iwai | G06V 20/20 348/148 |

FOREIGN PATENT DOCUMENTS

| | | | |
|---|---|---|---|
| JP | 2018-142265 | A | 9/2018 |
| JP | 2021-528790 | A | 10/2021 |
| JP | 2022-084288 | A | 6/2022 |
| JP | 2022-163242 | A | 10/2022 |
| JP | 2023-006734 | A | 1/2023 |
| WO | 2018/087828 | A1 | 5/2018 |
| WO | 2018/155159 | A1 | 8/2018 |
| WO | 2019/180700 | A1 | 9/2019 |

* cited by examiner

FIRST OPERATION CONTROL METHOD (S1)

SECOND OPERATION CONTROL METHOD (S2)

BROADCASTING START METHOD (S81)

BROADCASTING STOP METHOD (S82)

CONTROL DEVICE AND REMOTE OPERATION DEVICE

CROSS REFERENCE TO RELATED APPLICATIONS

This application is based upon and claims benefit of priority from Japanese Patent Application No. 2023-054753, filed on Mar. 30, 2023, the entire contents of which are incorporated herein by reference.

BACKGROUND

Field

The present disclosure relates to a control device and a remote operation device.

Related Art

Conventionally, vehicles that are autonomously driven by a remote operation is known (JP 2017-538619 A1).

SUMMARY

There is a case where a vehicle that can be run by a remote operation is manufactured in a factory, and then is stored at a storage place different from the factory. In this case, there may be conceived a method for moving the vehicle from the factory to the storage place by autonomously driving the vehicle by the remote operation. There may be a case where a vehicle stops during autonomous driving by the remote operation due to some failure in a process of moving a vehicle from a first place to a second place by autonomous driving according to a remote operation. When the vehicle stops, and a distance between a stop position of the vehicle and a standby position of a worker is long, the worker may require a time to get on the stopped vehicle and move the vehicle.

The present disclosure can be implemented as a following aspect.

(1) A first aspect according to the present disclosure provides a control device. According to the control device that controls an operation of a moving object, the moving object has a manned driving mode that a driver having got on the moving object operates a driver input device provided to the moving object, and thereby determines a running condition that defines a running operation of the moving object to run, and a remote unmanned driving mode that the moving object receives the running condition of the moving object from an outside of the moving object, and thereby runs without the driver's getting on the moving object, the remote unmanned driving mode includes a remote manual driving mode that the moving object receives the running condition generated by an operator by operating an operator input device connected to a remote manual control device provided at a place different from a place of the moving object, and thereby runs without the driver's getting on the moving object, and a remote autonomous driving mode that the moving object receives the running condition generated by a remote automatic control device provided at a place different from the place of the moving object, and thereby runs without an operation of any one of the driver input device and the operator input device, the control device includes a switching execution unit that, when a predetermined first switching condition is satisfied, switches a driving mode of the moving object from the remote autonomous driving mode to the remote manual driving mode, and the first switching condition includes as a condition a case where, during running in the remote autonomous driving mode, the moving object falls in at least one state of (1a) a first state where a state of the moving object has become an abnormal state, (1b) a second state where a moving object has intruded a surrounding area set in advance to surroundings of the moving object, and (1c) a third state that is different from the first state and in which a failure has occurred during the running in the remote autonomous driving mode. According to this aspect, when the moving object falls in at least one of the first state, the second state, and the third state that are examples of failures during running in the remote autonomous driving mode, it is possible to switch the driving mode of the moving object from the remote autonomous driving mode to the remote manual driving mode. By so doing, even when the moving object falls in at least one of the first state, the second state, and the third state in a process of moving the moving object from a first place to a second place in the remote autonomous driving mode, and therefore the moving object stops, it is possible to move the moving object by a remote operation of the operator via the operator input device. Consequently, even when a distance between a stop position of the moving object and a standby position of the operator is long, the operator can move the moving object without getting on the stopped moving object. Consequently, it is possible to prevent conveyance of the moving object from delaying.

(2) According to the above aspect, the control device may further include an information transmission unit that, when the switching execution unit switches the driving mode from the remote autonomous driving mode to the remote manual driving mode, transmits to the remote manual control device at least one of first sensor information acquired by a first sensor mounted on the moving object and detection information acquired by a detection device provided at a place different from the place of the moving object, the first sensor information may include at least one of moving object position information indicating a position of the moving object, and surroundings information indicating a state of the surrounding area, and the detection information may include information that is acquired from the outside of the moving object, and is at least one of the moving object position information indicating the position of the moving object, and the surroundings information indicating the state of the surrounding area. According to this aspect, when the driving mode of the moving object is switched from the remote autonomous driving mode to the remote manual driving mode, it is possible to transmit at least one of the first sensor information and the detection information to transmit to the remote manual control device. Consequently, the remote manual control device can determine whether or not to switch the driving mode of the moving object, and create a driving control value indicating the running condition of the moving object.

(3) According to the above aspect, the first sensor may be a sensor that can detect at least the state of the surrounding area. According to this aspect, it is possible to transmit the state of the surrounding area of the moving object detected by the first sensor to the remote manual control device. Consequently, the remote manual control device can determine whether or not to switch the driving mode of the moving object, and create the driving control value indicating the running condition of the moving object using the information of the first sensor.

(4) According to the above aspect, the first sensor may be at least one of a camera, a LiDAR, and a radar. According to this aspect, it is possible to transmit the information acquired by at least one of the camera, the LiDAR, and the radar to the remote manual control device. Consequently, the remote manual control device can determine whether or not to switch the driving mode of the moving object, and create the driving control value indicating the running condition of the moving object using the information acquired by at least one of the camera, the LiDAR, and the radar.

(5) According to the above aspect, the control device may further include a broadcasting control unit that, when the switching execution unit switches the driving mode from the remote autonomous driving mode to the remote manual driving mode, broadcasts to the outside that the moving object is running in the remote manual driving mode. According to this aspect, when the driving mode of the moving object is switched from the remote autonomous driving mode to the remote manual driving mode, it is possible to broadcast to the outside that the moving object is running in the remote manual driving mode. Consequently, it is possible to easily distinguish from the outside of the moving object a moving object that is running in the remote manual driving mode and a moving object that is running in other driving modes such as the remote autonomous driving mode.

(6) According to the above aspect, when a predetermined second switching condition is satisfied, the switching execution unit may switch the driving mode from the remote manual driving mode to the remote autonomous driving mode, and the second switching condition may include as a condition a case that does not correspond to any one of the first state, the second state, and the third state. According to this aspect, when the state of the moving object does not correspond to any one of the first state, the second state, and the third state, it is possible to switch the driving mode of the moving object from the remote autonomous driving mode to the remote manual driving mode. Consequently, it is possible to reduce the number of operators and a work load required to move the moving object.

(7) According to the above aspect, the third state may be a case where the position of the moving object cannot be specified using imaging information.

(8) According to the above aspect, the third state may be specified on a basis of at least one of a weather condition and a time zone.

(9) According to the above aspect, the third state may be specified on a basis of a shadow production situation caused by glaring of light.

(10) A second aspect according to the present disclosure provides a remote operation device. The remote operation device that remotely controls an operation of a moving object includes: a remote manual control device; and an operator input device that is connected to the remote manual control device, the moving object has a manned driving mode that a driver having got on the moving object operates a driver input device provided to the moving object, and thereby determines a running condition that defines a running operation of the moving object to run, and a remote unmanned driving mode that the moving object receives the running condition of the moving object from an outside of the moving object, and thereby runs without the driver's getting on the moving object, the remote unmanned driving mode includes a remote manual driving mode that the moving object receives the running condition generated by an operator by operating an operator input device provided at a place different from a place of the moving object, and thereby runs without the driver's getting on the moving object, and a remote autonomous driving mode that the moving object receives the running condition generated by a remote automatic control device provided at a place different from the place of the moving object, and thereby runs without an operation of any one of the driver input device and the operator input device, the remote manual control device includes a switching information acquisition unit that acquires at least one of (2a) abnormality information indicating that a state of the moving object has become an abnormal state, (2b) intrusion information indicating that a moving object has intruded a surrounding area set in advance to surroundings of the moving object, and (2c) failure information indicating that a failure has occurred during running in the remote autonomous driving mode, and a switching instruction unit that, when a predetermined first switching condition is satisfied, transmits to the moving object a first switching instruction for switching a driving mode of the moving object from the remote autonomous driving mode to the remote manual driving mode, and the first switching condition includes as a condition a case where, during the running in the remote autonomous driving mode, the moving object falls in at least one state of (1a) a first state where the state of the moving object has become the abnormal state, (1b) a second state where the moving object has intruded the surrounding area, (1c) a third state that is different from the first state and in which the failure has occurred during the running in the remote autonomous driving mode. According to this aspect, when the moving object falls in at least one of the first state, the second state, and the third state that are examples of failures during running in the remote autonomous driving mode, it is possible to switch the driving mode of the moving object from the remote autonomous driving mode to the remote manual driving mode. By so doing, even when the moving object falls in at least one of the first state, the second state, and the third state in the process of moving the moving object from the first place to the second place in the remote autonomous driving mode, and therefore stops, it is possible to move the moving object by a remote operation of the operator via the operator input device. Consequently, even when a distance between a stop position of the moving object and a standby position of the operator is long, the operator can move the moving object without getting on the stopped moving object. Consequently, it is possible to prevent conveyance of the moving object from delaying.

(11) According to the above aspect, the first switching condition may further include as a condition a case where a distance between a current position of the moving object and a standby position of the operator who can get on the moving object and operate the driver input device has become a predetermined distance or more. Consequently, even when the distance between the current position of the moving object and the standby position of the operator is long, it is possible to move the moving object by the remote operation of the operator via the operator input device. Consequently, it is possible to further prevent conveyance of the moving object from delaying.

(12) According to the above aspect, the first switching condition may further include as a condition a case where a number of the operators who can get on the moving object that runs in the remote manual driving mode, and operate the driver input device has become a predetermined number of people or less. According to this aspect, even when the operator has difficulty in moving the moving object by getting on the moving object and operating the driver input device, it is possible to move the moving object by the remote operation of the operator via the operator input device. Consequently, it is possible to further prevent conveyance of the moving object from delaying.

(13) According to the above aspect, even when the first switching condition is satisfied, and when a number of the operators who can operate the operator input device is a predetermined number of people or less, the switching instruction unit may transmit a stop instruction for stopping the moving object to the moving object without transmitting the first switching instruction to the moving object. According to this aspect, even when the operator has difficulty in moving the moving object by the remote operation of the operator via the operator input device, it is possible to safely stop the moving object.

(14) According to the above aspect, the remote manual control device may further include an information acquisition unit that, when the driving mode is switched from the remote autonomous driving mode to the remote manual driving mode, acquires at least one of first sensor information acquired by a first sensor mounted on the moving object and detection information acquired by a detection device provided at a place different from the place of the moving object, the first sensor information may include at least one of moving object position information indicating a position of the moving object, and surroundings information indicating a state of the surrounding area, and the detection information may include information that is acquired from the outside of the moving object, and is at least one of the moving object position information indicating the position of the moving object, and the surroundings information indicating the state of the surrounding area. According to this aspect, when the driving mode of the moving object is switched from the remote autonomous driving mode to the remote manual driving mode, the remote manual control device can acquire at least one of the first sensor information and the detection information. Consequently, the remote manual control device can determine whether or not to switch the driving mode of the moving object, and create a driving control value indicating the running condition of the moving object.

(15) According to the above aspect, the first sensor may be a sensor that can detect at least the state of the surrounding area. According to this aspect, the remote manual control device can acquire the state of the surrounding area of the moving object detected by the first sensor. Consequently, the remote manual control device can determine whether or not to switch the driving mode of the moving object, and create a driving control value indicating the running condition of the moving object using the information of the first sensor.

(16) According to the above aspect, the first sensor may be at least one of a camera, a LiDAR, and a radar. According to this aspect, the remote manual control device can acquire the information acquired by at least one of the camera, the LiDAR, and the radar. Consequently, the remote manual control device can determine whether or not to switch the driving mode of the moving object, and create the driving control value indicating the running condition of the moving object using the information acquired by at least one of the camera, the LiDAR, and the radar.

(17) According to the above aspect, the remote operation device may further include a display device that includes a display unit that conveys at least one of the first sensor information and the detection information to the operator, and the remote manual control device may further include a display control unit that controls display contents to display on the display unit. According to this aspect, it is possible to display at least one of the first sensor information and the detection information on the display unit. Consequently, it is possible to convey at least one of the first sensor information and the detection information to the operator who operates the operator input device.

(18) According to the above aspect, the display control unit may cause the display unit to display an information designation screen for allowing the operator to designate the first sensor information or the detection information to display on the display unit. According to this aspect, it is possible to cause the display unit to display the information designation screen for allowing the operator to designate the first sensor information or the detection information to display on the display unit. Consequently, the operator who operates the operator input device can easily designate the information to display on the display unit.

(19) According to the above aspect, at least one of the first sensor and the detection device may be a camera, the detection information may include imaging information imaged by the camera, and intrusion position information indicating a position of the moving object that has intruded the surrounding area, and the display control unit may cause the display unit to display information obtained by superimposing the intrusion position information on the imaging information. According to this aspect, it is possible to cause the display unit to display the information obtained by superimposing the intrusion position information on the imaging information. Consequently, the operator can easily grasp the presence and the position of the moving object that has intruded the surrounding area of the moving object.

(20) According to the above, the remote manual control device may further include an area setting unit that, when the driving mode is switched from the remote autonomous driving mode to the remote manual driving mode, sets an intrusion forbidden area such that a range of the intrusion forbidden area that is set to surroundings of the moving object and forbids the intrusion of the moving object is larger than a range of the intrusion forbidden area in the remote autonomous driving mode. According to this aspect, it is possible to set the range of the intrusion forbidden area in the remote manual driving mode larger than the range of the intrusion forbidden area in the remote autonomous driving mode. Consequently, it is possible to more safely move the moving object in the remote manual driving mode.

(21) According to the above aspect, the remote manual control device may further include a broadcasting control unit that, when the driving mode is switched from the remote autonomous driving mode to the remote manual driving mode, broadcasts to the outside that the moving object is running in the remote manual driving mode. According to this aspect, when the driving mode of the moving object is switched from the remote autonomous driving mode to the remote manual driving mode, it is possible to broadcast to the outside that the moving object is running in the remote manual driving mode. Consequently, it is possible to easily distinguish from the outside of the moving object a moving object that is running in the remote manual driving mode and a moving object that is running in other driving modes such as the remote autonomous driving mode.

(22) According to the above aspect, when a predetermined second switching condition is satisfied, a second switching instruction for switching the driving mode from the remote manual driving mode to the remote autonomous driving mode may be transmitted to the moving object, and the second switching condition may include as a condition a case that does not correspond to any one of the first state, the second state, and the third state. According to this aspect, when the state of the moving object does not correspond to any one of the first state, the second state, and the third state, it is possible to transmit the second switching instruction for switching the driving mode of the moving object from the remote manual driving mode to the remote autonomous driving mode. Consequently, it is possible to switch the driving mode of the moving object from the remote autonomous driving mode to the remote manual driving mode, so that it is possible to reduce the number of operators and a work load required to move the moving object.

(23) According to the above aspect, the second switching condition may further include as a condition a case where the moving object reaches a recovery area that serves as a criteria to resume running in the remote autonomous driving mode. According to this aspect, by arranging the recovery area in advance at a place at which the position, a traveling direction, and the like of the moving object are easily detected, it is possible to acquire more accurate moving object position information when running in the remote autonomous driving mode is resumed.

(24) According to the above aspect, the moving object may run at least one of in a factory that manufactures the moving object, at a storage place at which the moving object manufactured in the factory is stored, and on a conveyance passage that connects the factory and the storage place. According to this aspect, when the moving object is moved in the remote autonomous driving mode from the factory to the storage place through the conveyance passage, it is possible to switch the driving mode of the moving object from the remote autonomous driving mode to the remote manual driving mode.

(25) According to the above aspect, the third state may be a case where the position of the moving object cannot be specified using imaging information.

(26) A third aspect according to the present disclosure provides a display device. According to the display device that is connected to a remote operation device that remotely controls an operation of a moving object, the moving object has a manned driving mode that a driver having got on the moving object operates a driver input device provided to the moving object, and thereby determines a running condition that defines a running operation of the moving object to run, and a remote unmanned driving mode that the moving object receives the running condition of the moving object from an outside of the moving object, and thereby runs without the driver's getting on the moving object, the remote unmanned driving mode includes a remote manual driving mode that the moving object receives the running condition generated by an operator by operating an operator input device provided at a place different from a place of the moving object, and thereby runs without the driver's getting on the moving object, and a remote autonomous driving mode that the moving object receives the running condition generated by a remote automatic control device provided at a place different from the place of the moving object, and thereby runs without an operation of any one of the driver input device and the operator input device, the display device includes a display unit, and a display control unit that controls display contents to display on the display unit, the display control unit causes the display unit to display at least one of internal imaging information and external imaging information, the internal imaging information being acquired by a first camera that is a camera mounted on the moving object that, during running in the remote autonomous driving mode, has fallen in at least one state of (1a) a first state where a state of the moving object has become an abnormal state, (1b) a second state where a moving object has intruded a surrounding area set in advance to surroundings of the moving object, and (1c) a third state that is different from the first state and in which a failure has occurred during the running in the remote autonomous driving mode, and the external imaging information being acquired by an infrastructure camera, and the external imaging information is information that is acquired by imaging the moving object from the outside, and includes at least one of moving object position information indicating a position of the moving object, and the surroundings information indicating a state of the surrounding area. According to this aspect, it is possible to display at least one of the internal imaging information and the external imaging information on the display unit. Consequently, it is possible to convey at least one of the internal imaging information and the external imaging information to the operator who operates the operator input device.

(27) According to the above aspect, the display control unit may cause the display unit to display an information designation screen for allowing the operator to designate the internal imaging information or the external imaging information to display on the display unit. According to this aspect, it is possible to cause the display unit to display the information designation screen for allowing the operator to designate the internal imaging information or the external imaging information to display on the display unit. Consequently, the operator who operates the operator input device can designate the information in more detail to display on the display unit.

(28) According to the above aspect, the third state may be a case where the position of the moving object cannot be specified using imaging information.

(29) A fourth aspect according to the present disclosure provides a remote operation system. The remote operation system includes: a control device; a moving object that includes a driver input device; a remote operation device that includes a remote manual control device, and an operator input device; and a remote automatic control device, the moving object has a manned driving mode that a driver having got on the moving object operates the driver input device, and thereby determines a running condition that defines a running operation of the moving object to run, and a remote unmanned driving mode that the moving object receives the running condition of the moving object from an outside of the moving object, and thereby runs without the driver's getting on the moving object, the remote unmanned driving mode includes a remote manual driving mode that the moving object receives the running condition generated by an operator by operating the operator input device connected to the remote manual control device provided at a place different from a place of the moving object, and thereby runs without the driver's getting on the moving object, and a remote autonomous driving mode that the moving object receives the running condition generated by the remote automatic control device provided at a place different from the place of the moving object, and thereby runs without an operation of any one of the driver input device and the operator input device, the control device includes a switching execution unit that, when a predetermined first switching condition is satisfied, switches a driving mode of the moving object from the remote autonomous driving mode to the remote manual driving mode, and the first switching condition includes as a condition a case where, during running in the remote autonomous driving mode, the moving object falls in at least one state of (1a) a first state where a state of the moving object has become an abnormal state, (1b) a second state where a moving object has intruded a surrounding area set in advance to surroundings of the moving object, and (1c) a third state that is different from the first state and in which a failure has occurred during the running in the remote autonomous driving mode. According to this aspect, when the moving object falls in at least one of the first state, the second state, and the third state that are examples of failures during running in the remote autonomous driving mode, it is possible to switch the driving mode of the moving object from the remote autonomous driving mode to the remote manual driving mode. By so doing, even when the moving object falls in at least one of the first state, the second state, and the third state in the process of moving the moving object from the first place to the second place in the remote autonomous driving mode, and therefore stops, it is possible to move the moving object by the remote operation of the operator via the operator input device. Consequently, even when a distance between the stop position of the moving object and the standby position of the operator is long, the operator can move the moving object without getting on the stopped moving object. Consequently, it is possible to prevent conveyance of the moving object from delaying.

(30) According to the above aspect, the third state may be a case where the position of the moving object cannot be specified using imaging information.

(31) A fifth aspect according to the present disclosure provides a remote operation method. According to the remote operation method of a moving object, the moving object has a manned driving mode that a driver having got on the moving object operates a driver input device provided to the moving object, and thereby determines a running condition that defines a running operation of the moving object to run, and a remote unmanned driving mode that the moving object receives the running condition of the moving object from an outside of the moving object, and thereby runs without the driver's getting on the moving object, the remote unmanned driving mode includes a remote manual driving mode that the moving object receives the running condition generated by an operator by operating an operator input device connected to a remote manual control device provided at a place different from a place of the moving object, and thereby runs without the driver's getting on the moving object, and a remote autonomous driving mode that the moving object receives the running condition generated by a remote automatic control device provided at a place different from the place of the moving object, and thereby runs without an operation of any one of the driver input device and the operator input device, the remote operation method includes a switching step of, when a predetermined first switching condition is satisfied, switching a driving mode of the moving object from the remote autonomous driving mode to the remote manual driving mode, and the first switching condition includes as a condition a case where, during running in the remote autonomous driving mode, the moving object falls in at least one state of (1a) a first state where a state of the moving object has become an abnormal state, (1b) a second state where a moving object has intruded a surrounding area set in advance to surroundings of the moving object, and (1c) a third state that is different from the first state and in which a failure has occurred during the running in the remote autonomous driving mode. According to this aspect, in a case where the moving object falls in at least one of the first state, the second state, and the third state that are examples of failures during running in the remote autonomous driving mode, it is possible to switch the driving mode of the moving object from the remote autonomous driving mode to the remote manual driving mode. By so doing, even when the moving object falls in at least one of the first state, the second state, and the third state in the process of moving the moving object from the first place to the second place in the remote autonomous driving mode, and therefore stops, it is possible to move the moving object by the remote operation of the operator via the operator input device. Consequently, even when the distance between the stop position of the moving object and the standby position of the operator is long, the operator can move the moving object without getting on the stopped moving object. Consequently, it is possible to prevent conveyance of the moving object from delaying.

(32) According to the above aspect, the third state may be a case where the position of the moving object cannot be specified using imaging information.

The present disclosure can be implemented as various aspects such as the above control device, remote operation device, display device, remote operation system, and remote operation method. For example, the present disclosure can be implemented as, for example, aspects such as a manufacturing method for the control device, the remote operation device, the display device, and the remote operation system, a control method for the control device, the remote operation device, the display device, and the remote operation system, a computer program for implementing this control method, a non-transitory recording medium having this computer program recorded thereon, and the like.

DETAILED DESCRIPTION

A. First Embodiment

A-1. Configuration of Remote Operation System

Figure 1:
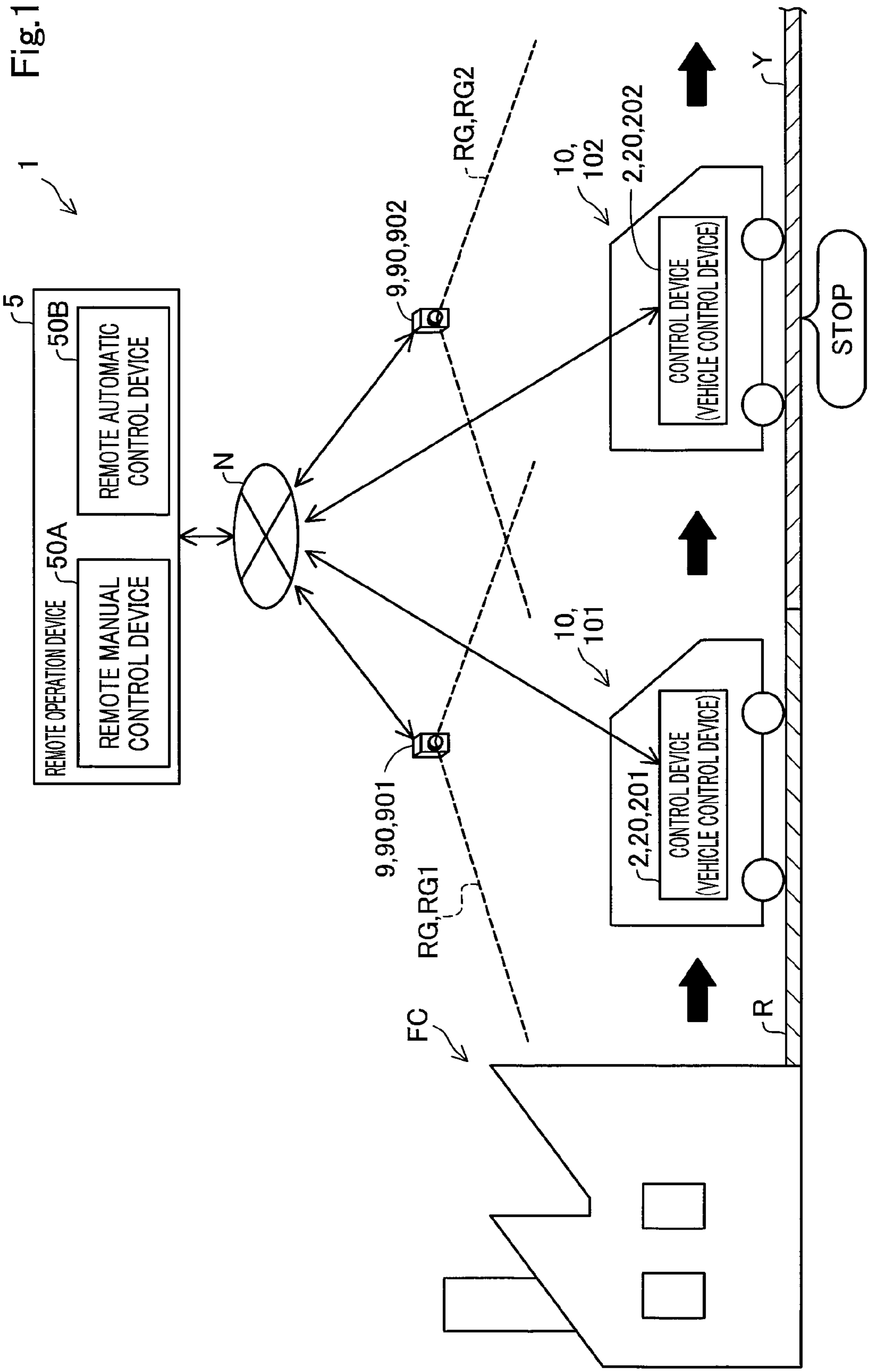
FIG. 1 is a view illustrating a schematic configuration of a remote operation system.

FIG. 1 is a view illustrating a schematic configuration of a remote operation system 1. The remote operation system 1 remotely controls autonomous driving of a vehicle 10. The remote operation system 1 includes the one or more vehicles 10 as moving objects, a control device 2, and a remote operation device 5 that is a server including a remote manual control device 50A and a remote automatic control device 50B. In the present embodiment, the control device 2 is a vehicle control device 20 (ECU) that is mounted on each vehicle 10.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving."

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

The vehicle 10 includes a manned driving mode and a remote unmanned driving mode. The manned driving mode is a driving mode that a driver having got on the vehicle 10 operates a driver input device provided to the vehicle 10, and thereby determines a running condition to run. The running condition described herein is a condition that defines a running operation. The running condition includes, for example, a running route (course), a position, a running speed, an acceleration, and a wheel rudder angle of the vehicle 10. The remote unmanned driving mode is a driving mode that the vehicle 10 receives the running condition of the vehicle 10 from an outside of the vehicle 10, and thereby runs without the driver's getting on the vehicle 10. The remote unmanned driving mode includes a remote manual driving mode and a remote autonomous driving mode. The remote manual driving mode is a driving mode that the vehicle 10 receives the running condition (running control signal) generated by an operator by operating an operator input device connected to the remote manual control device 50A, and thereby runs without the driver's getting on the vehicle 10. The remote autonomous driving mode is a driving mode that the vehicle 10 receives the running condition generated by the remote automatic control device 50B provided at a place different from that of the vehicle 10, and thereby runs without an operation of any one of the driver input device and the operator input device. When running in the remote unmanned driving mode, the vehicle 10 runs by controlling operations of various actuators or the like mounted on the vehicle 10 according to a driving control value (running control signal) received from the remote operation device 5.

In the present embodiment, the vehicle 10 runs from a factory FC to a predetermined parking position (not illustrated) at a storage place Y (e.g., yard) through a conveyance passage R. The factory FC is a place at which the vehicles 10 are manufactured. The conveyance passage R is a track that connects the factory FC and the storage place Y. The storage place Y is a place at which the vehicles 10 manufactured in the factory FC are stored. FIG. 1 illustrates a first vehicle 101 and a second vehicle 102 as a plurality of the vehicles 10 that run in the remote autonomous driving mode from the factory FC to the predetermined parking position in the storage place Y through the conveyance passage R. Furthermore, FIG. 1 illustrates a case where the second vehicle 102 stops at the storage place Y due to some failure during running in the remote autonomous driving mode. Hereinafter, in a case where each of the first and second vehicles 101 and 102 does not need to be distinguished, each of the first and second vehicles 101 and 102 will be referred to simply as the "vehicle 10". Furthermore, in a case where a vehicle control device 20 mounted on each vehicle 10 is distinguished, the vehicle control device 20 mounted on the first vehicle 101 will be referred to as a first vehicle control device 201. The vehicle control device 20 mounted on the second vehicle 102 will be referred to as a second vehicle control device 202. In a case where each vehicle control device 20 does not need to be distinguished, each vehicle control device 20 will be referred to simply as the "vehicle control device 20".

Note that the factory FC and the storage place Y are not limited to a case where the factory FC and the storage place Y exist in one building, a case where the factory FC and the storage place Y exist at one site or one address, and the like, and each of the factory FC and the storage place Y may exist across a plurality of buildings, a plurality of sites, a plurality of addresses, and the like. For example, the vehicle 10 may run on not only a private road, but also a public road to move from the factory FC to the storage place Y that exists at a different address from that of the factory FC. Furthermore, the vehicle 10 may a vehicle that is finished as a product, or a vehicle that is a semifinished product/product in process. Hereinafter, vehicles that are finished as products, and vehicles that are semifinished products/products in process will be collectively referred to as the "vehicle 10".

Figure 2:
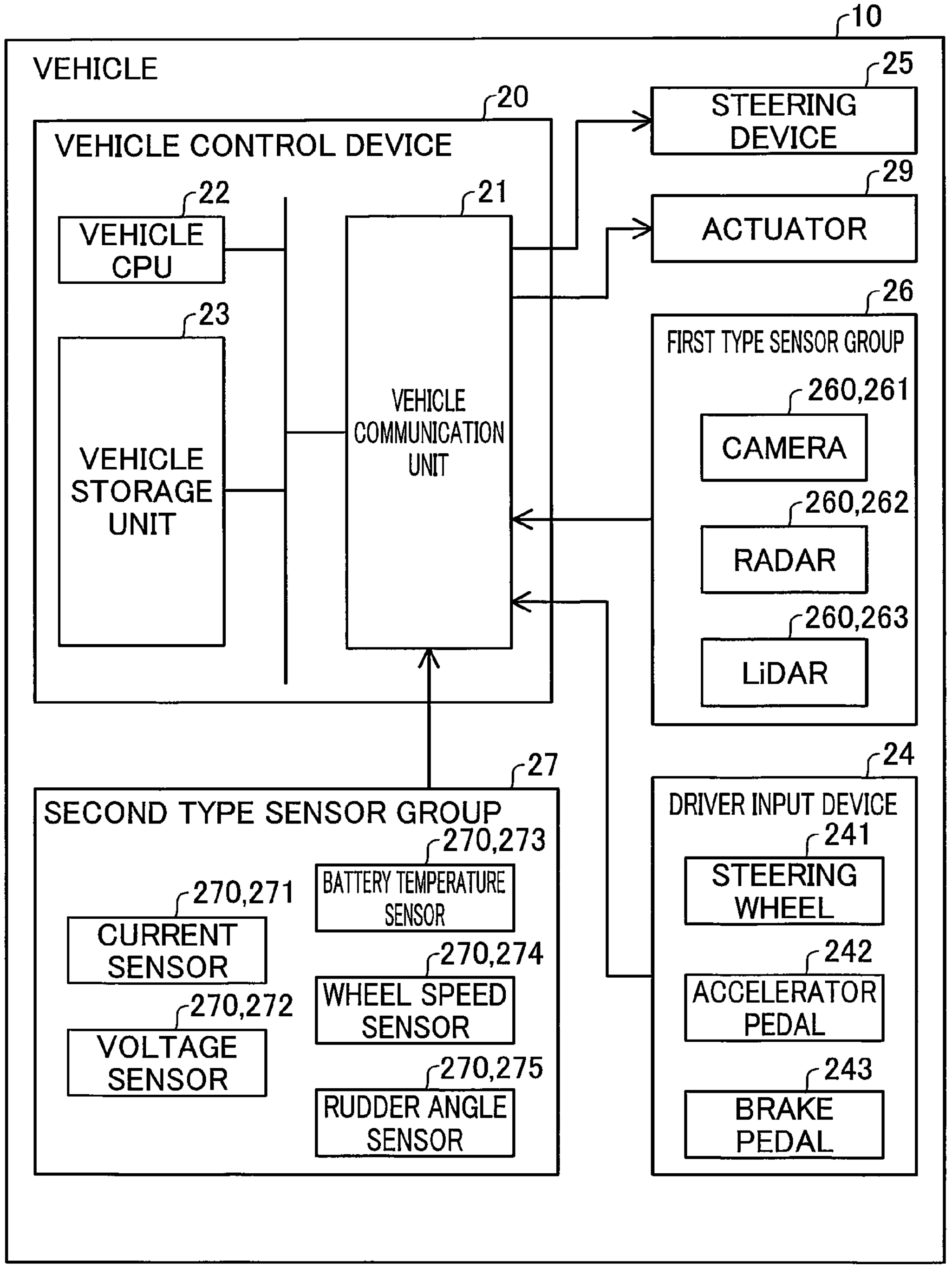
FIG. 2 is a view illustrating a schematic configuration of a vehicle.

FIG. 2 is a view illustrating a schematic configuration of the vehicle 10. FIG. 2 typically illustrates part of the configuration of the vehicle 10. In the present embodiment, the vehicle 10 is an electric vehicle that runs with a driving force of a running motor (not illustrated) that is a motor generator. Although not illustrated in FIG. 2, the vehicle 10 includes the running motor, a main battery that supplies electric power to the running motor, a power converter that includes an inverter and a converter, a decelerator, a braking device, accessory machines such as lamps and a car navigation device, an accessory machine battery that supplies electric power to the accessory machines, and the like. Note that the vehicle 10 may be a hybrid car that runs with a driving force of at least one of an internal combustion engine (not illustrated) and the running motor, or may be a gasoline car or a diesel car that runs using only the engine as a driving force source. Furthermore, the vehicle 10 is not limited to a private car such as a passenger car, and may be cars for business such as trucks, buses, and construction vehicles. Furthermore, the vehicle 10 includes a driver input device 24, a steering device 25, a first type sensor group 26 and a second type sensor group 27 that include first in-vehicle sensors 260 as a first sensor and second in-vehicle sensors 270 as a first sensor, an actuator 29, and the vehicle control device 20.

The driver input device 24 is an input device that the driver having got on the vehicle 10 operates to determine the running condition of the vehicle 10. That is, the driver input device 24 is used for running in the manned driving mode, and is provided in the vehicle 10. The driver input device 24 includes a steering wheel 241, an accelerator pedal 242, and a brake pedal 243. The steering wheel 241 is an input device for steering wheels (not illustrated). The accelerator pedal 242 is an input device for accelerating the vehicle 10. The brake pedal 243 is an input device for decelerating the vehicle 10. Note that the configuration of the driver input device 24 is not limited to this.

The steering device 25 rotates a steering shaft (not illustrated) with a torque of a steering motor (not illustrated) according to a driving control value received from the remote operation device 5 such that the steering angle of the steering wheel 241 and a target rudder angle of the wheels match. Consequently, the steering device 25 causes the wheels to automatically turn without a driver's steering operation in the remote unmanned driving mode. That is, the steering device 25 is used for running in the remote unmanned driving mode.

The first type sensor group 26 includes a plurality of types of the first in-vehicle sensors 260. The first in-vehicle sensors 260 are in-vehicle sensors that acquire surroundings information indicating a state of surrounding area set in advance to surroundings of the vehicle 10. That is, the first in-vehicle sensors 260 are the in-vehicle sensors that can detect at least the state of the surrounding area. Each of the first in-vehicle sensors 260 transmits acquired data to the vehicle control device 20. In the present embodiment, the first type sensor group 26 includes an in-vehicle camera 261, a radar 262, and a LIDAR 263 as the first in-vehicle sensors 260.

The in-vehicle camera 261 acquires internal imaging information by imaging an imaging range RG including at least part of the surrounding area. The internal imaging information may be still image data, or may be moving image data. Furthermore, the internal imaging information may be color data, or may be monochrome data.

The radar 262 emits an exploration wave (radio wave) to a predetermined exploration range, receives a reflected wave reflected by an object existing in the surrounding area, and thereby detects a distance, an angle, a relative speed, and the like of the object existing in the surrounding area.

The LiDAR 263 radiates laser light to a predetermined measurement range, detects reflected light reflected by an object existing in the surrounding area, and thereby detects a distance, an angle, the shape, and the like of the object existing in the surrounding area. Note that the configuration of the first type sensor group 26 is not limited to this.

The second type sensor group 27 includes a plurality of types of the second in-vehicle sensors 270. The second in-vehicle sensors 270 are a sensor group that acquires various physical quantities necessary to control an operation of the vehicle 10. That is, the second in-vehicle sensors 270 are in-vehicle sensors that can acquire the various physical quantities to acquire or calculate state quantities indicating the state of the vehicle 10. In the present embodiment, the second type sensor group 27 includes a current sensor 271, a voltage sensor 272, a battery temperature sensor 273, a wheel speed sensor 274, and a rudder angle sensor 275 as the second in-vehicle sensors 270. The current sensor 271 measures an actual measurement value of an output current value of the main battery. The voltage sensor 272 measures an actual measurement value of an output voltage value (potential difference) of the main battery. The battery temperature sensor 273 measures the temperature of the main battery. The wheel speed sensor 274 measures the rotation speed (hereinafter, wheel speed) of each wheel. The rudder angle sensor 275 measures an actual rudder angle of each wheel. Each of the second in-vehicle sensors 270 transmits acquired data to the vehicle control device 20. Note that the configuration of the second type sensor group 27 is not limited to this.

The vehicle control device 20 includes a vehicle communication unit 21 that is a communication unit in the vehicle control device 20, a vehicle storage unit 23 that is a storage unit in the vehicle control device 20, and a vehicle CPU 22 that is a central processing unit in the vehicle control device 20. The vehicle communication unit 21, the vehicle storage unit 23, and the vehicle CPU 22 are connected to each other via an internal bus or an interface circuit.

The vehicle communication unit 21 connects internal equipment, external equipment, and the vehicle control device 20 so as to enable communication therebetween. The internal equipment is equipment such as the main battery, the first in-vehicle sensors 260, the second in-vehicle sensors 270, and the driver input device 24 that are mounted on the vehicle 10, and is equipment that can communicate with the vehicle control device 20. Furthermore, the external equipment is equipment such as the remote operation device 5 that is provided at a place different from that of the vehicle 10. The communication unit 21 is, for example, a wireless communication device. The vehicle communication unit 21 communicates with the internal equipment using, for example, Controller Area Network (CAN) communication. CAN communication is communication standards that make it possible to perform transmission or reception in multiple directions. Furthermore, the vehicle communication unit 21 communicates with the external equipment such as the remote operation device 5 connected to a network N via an access point (not illustrated) such as the factory FC, the conveyance passage R, and the storage place Y illustrated in FIG. 1. Note that the vehicle communication unit 21 may communicate with the vehicle control devices 20 of the other vehicles 10. A communication method of the vehicle communication unit 21 is not limited to this.

The vehicle storage unit 23 illustrated in FIG. 2 stores various pieces of information including various programs for controlling the operation of the vehicle 10, and abnormality determination information. The abnormality determination information is used by an abnormality detection unit to be described later. The vehicle storage unit 23 includes, for example, a RAM, a ROM, a Hard Disk Drive (HDD), and the like.

Figure 3:
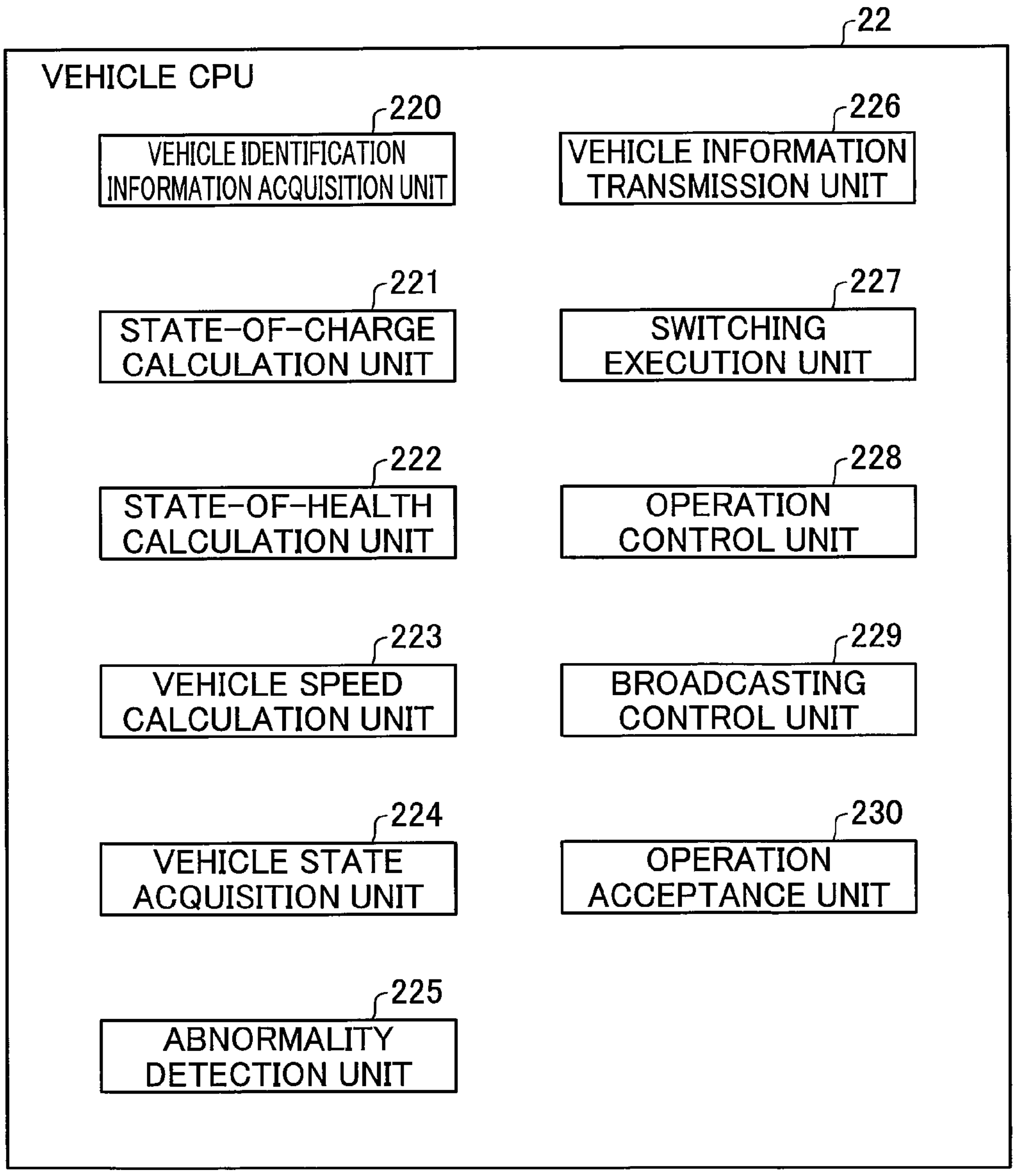
FIG. 3 is a block diagram illustrating a schematic configuration of a vehicle CPU.

FIG. 3 is a block diagram illustrating a schematic configuration of the vehicle CPU 22. The vehicle CPU 22 functions as a vehicle identification information acquisition unit 220, a state-of-charge calculation unit 221, a state-of-health calculation unit 222, a vehicle speed calculation unit 223, a vehicle state acquisition unit 224, and an abnormality detection unit 225 by expanding the various programs stored in the vehicle storage unit 23. Furthermore, the vehicle CPU 22 functions as a vehicle information transmission unit 226, a switching execution unit 227, an operation control unit 228, a broadcasting control unit 229, and an operation acceptance unit 230 by expanding the various programs stored in the vehicle storage unit 23.

The vehicle identification information acquisition unit 220 acquires vehicle identification information that is identification information of the vehicle 10. The vehicle identification information is a unique vehicle IDentifier (ID) assigned to each vehicle 10 without overlapping between the vehicles 10 to identify the plurality of vehicles 10. The vehicle identification information may include shipping destination information such as a vehicle type, a grade, and a destination of the vehicle 10. The vehicle identification information acquisition unit 220 acquires the vehicle identification information by receiving reading information acquired by, for example, a vehicle reading unit (not illustrated) installed in advance on a running route that goes from the factory FC to the parking position at the storage place Y. The reading information is information acquired by the vehicle reading unit by optically reading a vehicle identification portion (not illustrated) attached to the vehicle 10. In this case, the vehicle identification portion is a one-dimensional code such as a bar code in which the vehicle identification information is recorded, a stack type two-dimensional code, and a matrix type two-dimensional code such as a QR code (registered trademark). Furthermore, in this case, the vehicle reading unit is a code reader such as a camera that can optically read the vehicle identification portion. Note that an acquisition method for the vehicle identification information is not limited to this. The vehicle identification information acquisition unit 220 may acquire the vehicle identification information by, for example, reading the vehicle identification information stored in advance in the vehicle storage unit 23. Furthermore, the vehicle identification information acquisition unit 220 may acquire the vehicle identification information by, for example, accepting user's input of the vehicle identification information via an input operation unit (not illustrated). The vehicle identification information acquisition unit 220 causes the vehicle storage unit 23 to store the acquired vehicle identification information as appropriate.

The state-of-charge calculation unit 221 calculates a State Of Charge (SOC) of the main battery. The state-of-charge calculation unit 221 calculates the state of charge of the main battery by, for example, dividing an integration value of an output current value acquired by the current sensor 271 by a rated capacity (fully charged capacity) of the main battery. Note that a calculation method for the state of charge of the main battery is not limited to this. The state-of-charge calculation unit 221 may calculate the state of charge of the main battery by, for example, acquiring data such as an output voltage value of the main battery acquired by the voltage sensor 272, and comparing the data with an SOC database. The SOC database includes, for example, an SOC-OCV curve that indicates a relationship between the state of charge of the main battery and an Open Circuit Voltage value (OCV), and temperature characteristics data that indicates a relationship between the state of charge and the temperature of the main battery. Furthermore, the state-of-charge calculation unit 221 may calculate the state of charge of the main battery on the basis of, for example, a running time and a running distance of the vehicle 10 and a time that passes from a previous time of calculation of the state of charge.

The state-of-health calculation unit 222 calculates a State Of Charge (SOH) of the main battery. The state-of-health calculation unit 222 acquires, for example, the temperature of the main battery acquired by the battery temperature sensor 273, the open circuit voltage of the main battery, and the state of charge of the main battery (hereinafter, battery state-of-charge) calculated by the state-of-charge calculation unit 221. Furthermore, the state-of-health calculation unit 222 calculates an apparent state of charge using, for example, the temperature of the main battery and the open circuit voltage of the main battery. Furthermore, the state-of-health calculation unit 222 calculates the state of health of the main battery according to following equation (1) using, for example, the battery state of charge and the apparent state of charge. Note that a calculation method for the state of health of the main battery is not limited to this.

$$\text{State of health} = (100 - \text{battery state of charge})/(100 - \text{apparent state of charge}) \quad \text{Equation (1)}$$

The vehicle speed calculation unit 223 calculates the running speed of the vehicle 10 using an output value of the wheel speed sensor 274, that is, the wheel speed of the vehicle 10 acquired by the wheel speed sensor 274. The vehicle speed calculation unit 223 performs arithmetic processing of, for example, averaging the wheel speeds of the respective wheels, and then calculates the running speed of the vehicle 10 on the basis of the wheel speed per unit time. Note that a calculation method for the running speed of the vehicle 10 is not limited to this. Furthermore, at least part of the functions of the vehicle speed calculation unit 223 may be executed by the wheel speed sensor 274.

The vehicle state acquisition unit 224 acquires in-vehicle sensor information as first sensor information. The in-vehicle sensor information is information acquired by the first in-vehicle sensor 260. In the present embodiment, the in-vehicle sensor information includes internal imaging information acquired by the in-vehicle camera 261, and first surroundings information that is information acquired by the first in-vehicle sensor 260 and indicating a state of the surrounding area of the vehicle 10. The first surroundings information is, for example, radar information acquired by the radar 262, and LiDAR information acquired by the LiDAR 263. Note that the in-vehicle sensor information may include vehicle position information indicating the position of the vehicle 10 in other embodiments. In this case, the vehicle 10 includes as the first in-vehicle sensor 260 a position information reception unit such as a GNSS receiver than can receive radio waves emitted from GNSS satellites. The vehicle state acquisition unit 224 causes the vehicle storage unit 23 to store the acquired in-vehicle sensor information as appropriate.

The vehicle state acquisition unit 224 acquires one or more types of state quantities acquired or calculated from the data acquired by the second in-vehicle sensor 270 in association with an acquisition timing associated with each state quantity. The state quantity is data indicating a state of an in-vehicle device that is mounted on the vehicle 10 and includes internal equipment and internal members. The internal members are members that are mounted on the vehicle 10, and do not communicate with the vehicle control device 20. The internal members are, for example, damping members such as a suspension including a damper. The state quantity is, for example, the running speed of the vehicle 10, an actual rudder angle of the wheels, the output current value, the output voltage value, the temperature, the state of charge, and the state of health of the main battery, and the degree of vibration that changes according to the damping force of the damper. In the present embodiment, the vehicle state acquisition unit 224 acquires a plurality of types of the state quantities a plurality of times at different timings per predetermined time interval. More specifically, the vehicle state acquisition unit 224 acquires a first state quantity, and a plurality of second state quantities acquired a plurality of times at different timings per type of the state quantity. The first state quantity is a state quantity acquired at a timing before the vehicle 10 starts running in the remote autonomous driving mode. The second state quantity is a state quantity acquired at a timing at which the vehicle 10 is running in the remote autonomous driving mode. The vehicle state acquisition unit 224 causes the vehicle storage unit 23 to store the plurality of types of acquired state quantities per acquisition timing as appropriate.

The abnormality detection unit 225 detects an abnormality that occurs in the in-vehicle device using the state quantities acquired by the vehicle state acquisition unit 224 and abnormality determination information stored in advance in the vehicle storage unit 23. That is, the abnormality detection unit 225 detects that the state of the vehicle 10 has become an abnormal state using the state quantities and the abnormality determination information. In other words, the abnormality detection unit 225 detects that the vehicle 10 has fallen in a first state during running in the remote autonomous driving mode. The abnormality detection unit 225 detects, for example, the abnormal state by relatively comparing the state quantities acquired for each of the plurality of vehicles 10. More specifically, the abnormality detection unit 225 calculates similarity of the same type of the state quantities at the same acquisition timing acquired for each of the plurality of vehicles 10. Furthermore, the abnormality detection unit 225 clusters the same type of the state quantities at the same acquisition timing acquired for each of the plurality of vehicles 10 using the calculated similarity. At this time, the abnormality detection unit 225 classifies the state quantities whose similarity is less than a predetermined threshold into normal clusters. By contrast with this, the abnormality detection unit 225 classifies the state quantities whose similarity is the predetermined threshold or more into an outlier that is not included in the normal clusters. Furthermore, the abnormality detection unit 225 detects that the state of the vehicle 10 has become the abnormal state by determining that an abnormality has occurred in the in-vehicle device mounted on the vehicle 10 that is an acquisition source of the state quantity classified into the outlier. When detecting that the state of the vehicle 10 has become the abnormal state, the abnormality detection unit 225 creates abnormality information indicating that the state of the vehicle 10 is the abnormal state. The abnormality information may include, for example, an event that is a ground for the abnormality detection unit 225 to determine the abnormal state, that is, an abnormality cause. Note that a method for detecting the abnormal state is not limited to this. For example, the abnormality detection unit 225 may generate chronological data obtained by arranging the same type of state quantities acquired for each of the plurality of vehicles 10 in chronological order, and detect the abnormal state by relatively comparing the chronological data. Furthermore, for example, the abnormality detection unit 225 may detect the abnormal state by absolutely comparing the state quantity with the predetermined threshold.

The vehicle information transmission unit 226 transmits various pieces of information to the remote operation device 5. For example, the vehicle information transmission unit 226 transmits vehicle side information including the in-vehicle sensor information and vehicle state information indicating the state of the vehicle 10 together with the vehicle identification information to the remote operation device 5. The vehicle state information includes, for example, a plurality of types of state quantities. Furthermore, when, for example, the switching execution unit 227 switches the driving mode of the vehicle 10 from the remote autonomous driving mode to the remote manual driving mode, the vehicle information transmission unit 226 transmits the vehicle side information together with the vehicle identification information to the remote operation device 5. Furthermore, for example, the vehicle information transmission unit 226 transmits the abnormality information generated by the abnormality detection unit 225 together with the vehicle identification information to the remote operation device 5. Note that the vehicle information transmission unit 226 may transmit the various pieces of information to the detection device 9. Furthermore, when the vehicle information transmission unit 226 transmits the various pieces of information, it is not indispensable to transmit the vehicle identification information together with the various pieces of information. The vehicle information transmission unit 226 only needs to be configured to be able to transmit the various pieces of information in a mode that makes it possible to identify which vehicle 10 the information relates to.

The switching execution unit 227 switches the driving mode of the vehicle 10 between the remote manual driving mode and the remote autonomous driving mode according to an instruction transmitted from the remote operation device 5. More specifically, the switching execution unit 227 receives a first switching instruction transmitted from the remote operation device 5 when the predetermined first switching condition is satisfied. The first switching instruction is an instruction for switching the driving mode of the vehicle 10 from the remote autonomous driving mode to the remote manual driving mode. The first switching condition includes as a first basic condition a case where the vehicle 10 falls in at least one state of a first state, a second state, and a third state during running in the remote autonomous driving mode. The first state is a state where the state of the vehicle 10 has become an abnormal state. The case corresponding to the first state is, for example, a case where one of the in-vehicle devices mounted on the vehicle 10 goes out of order. The second state is a state where a moving object has intruded the surrounding area of the vehicle 10. The case corresponding to the second state is a case where an animal has unexpectedly intruded the surrounding area of the vehicle 10. The third state is a state that is different from the first state, and in which a failure occurs during running in the remote autonomous driving mode. The case corresponding to the third state is, for example, a case where a failure occurs during communication between the remote automatic control device 50B and the vehicle control device 20, and therefore the remote automatic control device 50B cannot transmit the driving control value to the vehicle control device 20. Furthermore, the case corresponding to the third state is, for example, a case where the position of the vehicle 10 cannot be specified using imaging information due to disturbances such as a weather condition such as sunny and rain, a time zone such as noon and night, and a shadow production situation caused by glaring of sun light, moon light, a street light, and an indoor light. When receiving the first switching instruction, the switching execution unit 227 switches the driving mode of the vehicle 10 from the remote autonomous driving mode to the remote manual driving mode. That is, when receiving the first switching instruction, the switching execution unit 227 passes an operation authority from the remote automatic control device 50B to the remote manual control device 50A. Furthermore, the switching execution unit 227 receives a second switching instruction transmitted from the remote operation device 5 when the predetermined second switching condition is satisfied. The second switching instruction is an instruction for switching the driving mode of the vehicle 10 from the remote manual driving mode to the remote autonomous driving mode. The second switching condition includes as a second basic condition a case that does not correspond to any one of the first state, the second state, and the third state. Thus, when receiving the second switching instruction, the switching execution unit 227 switches the driving mode of the vehicle 10 from the remote manual driving mode to the remote autonomous driving mode. That is, when receiving the second switching instruction, the switching execution unit 227 passes an operation authority from the remote manual control device 50A to the remote automatic control device 50B.

The operation control unit 228 controls operations of the steering device 25 and the actuator 29 according to the driving control value received from the remote operation device 5.

When the driving mode of the vehicle 10 is switched from the remote autonomous driving mode to the remote manual driving mode, the broadcasting control unit 229 broadcasts to the outside that the vehicle 10 is running in the remote manual driving mode. Furthermore, when the switching execution unit 227 switches the remote manual driving mode to the remote autonomous driving mode, the broadcasting control unit 229 stops broadcasting to the outside.

The operation acceptance unit 230 accepts an input from the driver input device 24. Furthermore, the operation acceptance unit 230 creates an instruction value for controlling the operations of the actuator 29 and the like on the basis of the input accepted from the driver input device 24.

Note that at least part of the functions of the vehicle CPU 22 may be implemented as the functions of the remote operation device 5 and the detection device 9. For example, the abnormality detection unit 225 may be implemented as the function of the remote operation device 5. In this case, the abnormality detection unit 225 detects the abnormal state using, for example, the vehicle state information transmitted from the vehicle control device 20 and abnormality determination information stored in advance in the remote storage unit 53. Furthermore, for example, the control device 2 may be a detection device control device that is a control device of the detection device 9. That is, the switching execution unit 227 may be implemented as the function of the detection device 9 that is the central processing unit of the camera control device.

Figure 4:
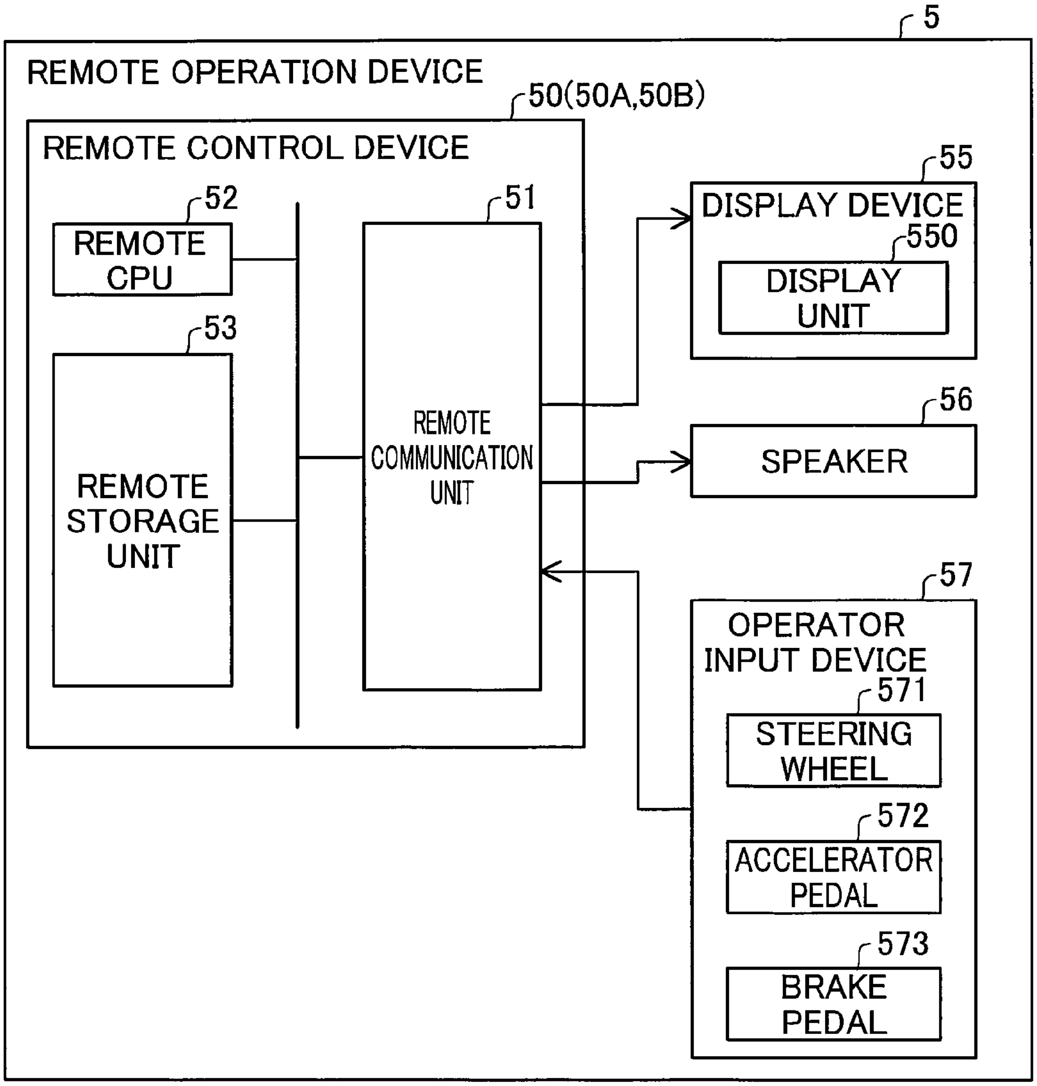
FIG. 4 is a block diagram illustrating a schematic configuration of a remote operation device.

FIG. 4 is a block diagram illustrating a schematic configuration of the remote operation device 5. In the present embodiment, as illustrated in FIGS. 1 and 4, the remote manual control device 50A and the remote automatic control device 50B are integrally configured as the remote control device 50. Hence, the remote operation device 5 includes an operator input device 57, a display device 55, a speaker 56, and the remote control device 50 configured by integrating the remote manual control device 50A and the remote automatic control device 50B.

The operator input device 57 is an input device that the operator operates to determine the running condition of the vehicle 10 in the remote manual driving mode. That is, the operator input device 57 is used for running in the remote manual driving mode, and is provided at a place different from that of the vehicle 10. The operator input device 57 includes a steering wheel 571, an accelerator pedal 572, and a brake pedal 573. The steering wheel 571 is an input device for steering the vehicle 10 by a remote operation. The accelerator pedal 572 is an input device for accelerating the vehicle 10 by the remote operation. The brake pedal 573 is an input device for decelerating the vehicle 10 by the remote operation. Note that the configuration of the operator input device 57 is not limited to this. The operator input device 57 may include, for example, a lever switch in place of the steering wheel 571. Furthermore, the operator input device 57 may include, for example, a push button switch and a lever switch in place of the accelerator pedal 572 and the brake pedal 573.

The display device 55 conveys various pieces of information to the operator. The display device 55 is arranged at, for example, a position that the operator who is operating the operator input device 57 can visually check. The display device 55 includes a display unit 550 that displays the various pieces of information. For example, the display unit 550 displays at least one of the in-vehicle sensor information and the detection information to convey to the operator. Furthermore, for example, the display unit 550 displays an information designation screen for allowing the operator to designate the in-vehicle sensor information or the detection information to display on the display unit 550. The display unit 550 is, for example, a liquid crystal display. The detection information is information acquired by the detection device 9. The detection information is information that is acquired from the outside of the vehicle 10, and includes at least one of vehicle position information indicating the position of the vehicle 10, and second surroundings information indicating the state of the surrounding area of the vehicle 10. In the present embodiment, the detection device 9 that is an external sensor is an infrastructure camera 90 that includes an imaging unit that can image the vehicle 10 and the surrounding area from the outside of the vehicle 10, and a camera control device. Hence, the detection information includes external imaging information that is the second surroundings information and object information generated using the external imaging information, and the vehicle position information specified from the external imaging information. The external imaging information is information acquired by the imaging unit provided to the infrastructure camera 90 that is the detection device 9 by imaging the vehicle 10 from the outside. The external imaging information may be still image data, or may be moving image data. Furthermore, the external imaging information may be color data, or may be monochrome data. The object information includes object basic information that is included in the external imaging information and indicates a detection result of, for example, the position and the shape of an object existing in the surrounding area of the vehicle 10, and intrusion position information that indicates the position of the moving object having intruded the surrounding area of the vehicle 10. The moving object is an object that is other than a fixed object such as a pole or a curb fixed in advance to a land or a track, and is an object that may move and approach the vehicle 10. The moving object is, for example, a living thing such as a person or an animal, the other vehicle 10, and an unmanned carrier. Note that the configuration and the function of the display device 55 are not limited to these. The display unit 550 may display the information designation screen for allowing the operator to designate the internal imaging information or the external imaging information to display on the display unit 550.

The speaker 56 plays back voice data acquired together with imaging data by a microphone (not illustrated) attached to the in-vehicle camera 261 or the infrastructure camera 90 that is the detection device 9. In other words, the speaker 56 plays back the voice data included in the internal imaging information or the external imaging information. Note that the configuration and the function of the speaker 56 are not limited to these. For example, the speaker 56 may be configured to emit a voice such as a message toward the operator according to a command of the remote operation device 5.

The remote control device 50 includes a remote communication unit 51 that is the communication unit in the remote control device 50, a remote storage unit 53 that is a storage unit in the remote control device 50, and a remote CPU 52 that is a central processing unit in the remote control device 50. The remote communication unit 51, the remote storage unit 53, and the remote CPU 52 are connected to each other via an internal bus or an interface circuit.

The remote communication unit 51 connects the vehicle control device 20, the detection device 9, and the remote control device 50 so as to enable communication therebetween. The remote communication unit 51 is, for example, a wireless communication device. Note that a communication method of the remote communication unit 51 is not limited to this.

Figure 5:
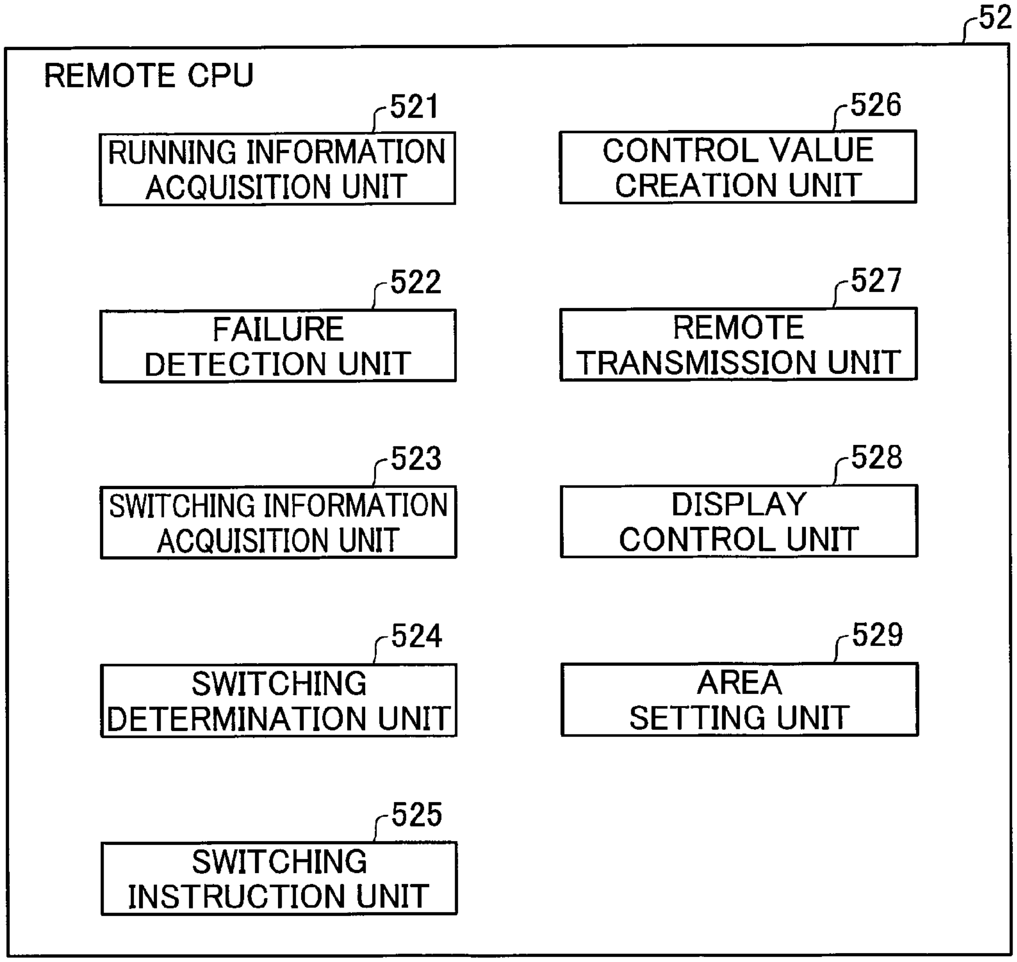
FIG. 5 is a block diagram illustrating a schematic configuration of a remote CPU.

The remote storage unit 53 stores various pieces of information including various programs for controlling the operation of the remote operation device 5, and running route information. The running route information is information that indicates a target running route of the vehicle 10 that runs in the remote autonomous driving mode. The remote storage unit 53 includes, for example, a RAM, a ROM, a Hard Disk Drive (HDD), and the like FIG. 5 is a block diagram illustrating a schematic configuration of the remote CPU 52. The vehicle CPU 52 functions as a running information acquisition unit 521, a failure detection unit 522, a switching information acquisition unit 523, a switching determination unit 524, and a switching instruction unit 525 by expanding the various programs stored in the remote storage unit 53. Furthermore, the remote CPU 52 functions as a control value creation unit 526, a remote transmission unit 527, a display control unit 528, and an area setting unit 529 by expanding the various programs stored in the remote storage unit 53.

The running information acquisition unit 521 acquires running information by receiving information (hereinafter, running information) related to the running condition of the vehicle 10 from at least one of the vehicle 10 and the detection device 9. In the present embodiment, the running information acquisition unit 521 acquires the vehicle side information, the detection information, and the running route information as the running information. Note that the running information acquisition unit 521 may acquire other information. As the running information for starting running in the remote autonomous driving mode, the running information acquisition unit 521 may receive a preparation completion signal transmitted from the vehicle 10 when, for example, preparation to start running in the running information acquisition unit is completed.

The failure detection unit 522 detects that a failure has occurred during running in the remote autonomous driving mode using the vehicle side information, the detection information, and other information (e.g., communication situation information indicating a communication situation between the vehicle 10 and the remote operation device 5). That is, the failure detection unit 522 detects that the vehicle 10 has fallen in the third state during running in the remote autonomous driving mode.

The switching information acquisition unit 523 acquires at least one of the abnormality information, the intrusion information, and the failure information by receiving at least one of the abnormality information, the intrusion information, and the failure information. The abnormality information is information indicating that the state of the vehicle 10 has become an abnormal state. That is, the abnormality information is information indicating the first state. The intrusion information is information indicating that a moving object has intruded the surrounding area of the vehicle 10. That is, the intrusion information is information indicating the second state. The failure information is information indicating that a failure has occurred during running in the remote autonomous driving mode. That is, the failure information is information indicating the third state. Note that the switching information acquisition unit 523 may acquire other information.

The switching determination unit 524 determines whether or not to switch the driving mode of the vehicle 10 between the remote manual driving mode and the remote autonomous driving mode. When, for example, the vehicle 10 falls in at least one of the first state, the second state, and the third state that are the examples of failures during running in the remote autonomous driving mode, the switching determination unit 524 determines to switch the driving mode of the vehicle 10 from the remote autonomous driving mode to the remote manual driving mode. That is, in this case, the first switching condition includes the first basic condition without including a first additional condition. Hence, when the first basic condition included in the first switching condition is satisfied, the switching determination unit 524 determines to switch the driving mode of the vehicle 10 from the remote autonomous driving mode to the remote manual driving mode. Furthermore, when, for example, the state of the vehicle 10 does not correspond to any one of the first state, the second state, and the third state during running in the remote manual driving mode, the switching determination unit 524 determines to switch the driving mode of the vehicle 10 from the remote manual driving mode to the remote autonomous driving mode. That is, in this case, the second switching condition includes the second basic condition without including a second additional condition. Hence, in this case, when the second basic condition included in the second switching condition is satisfied, the switching determination unit 524 determines to switch the driving mode of the vehicle 10 from the remote manual driving mode to the remote autonomous driving mode. Note that a switching determination method for the driving mode of the vehicle 10 is not limited to this. The first switching condition may include the predetermined first additional condition in addition to the first basic condition. That is, when, for example, the vehicle 10 falls in at least one of the first state, the second state, and the third state occurs during running in the remote autonomous driving mode, and the predetermined first additional condition is satisfied, the switching determination unit 524 may determine to switch the remote autonomous driving mode to the remote manual driving mode. In this case, the first additional condition included in the first switching condition may be one condition or may be a plurality of conditions. Furthermore, the second switching condition may include the second additional condition in addition to the second basic condition. When, for example, the state of the vehicle 10 does not correspond to any one of the first state, the second state, and the third state during running in the remote autonomous driving mode, and the predetermined second additional condition is satisfied, the switching determination unit 524 may determine to switch the remote manual driving mode to the remote autonomous driving mode. In this case, the second additional condition included in the second switching condition may be one condition or may be a plurality of conditions.

The switching instruction unit 525 transmits one of the first switching instruction, the second switching instruction, and the stop instruction to the vehicle 10 according to a determination result of the switching determination unit 524. The stop instruction is an instruction for interrupting and stopping running of the vehicle 10. Note that the switching instruction unit 525 may transmit various instructions to the vehicle 10 via the detection device 9. In this case, the switching instruction unit 525 may transmit the various instructions to the detection device 9. Furthermore, the detection device 9 transmits to the vehicle 10 the various instructions received from the remote operation device 5.

The control value creation unit 526 creates the driving control value for controlling the operation of the vehicle 10 using the running information acquired by the running information acquisition unit 521. For example, the control value creation unit 526 creates the driving control value for the vehicle 10 to run along the target running route. Furthermore, for example, the control value creation unit 526 creates the driving control value for correcting a relative position of the vehicle 10 with respect to the target running route while analyzing the external imaging information and the internal imaging information.

The remote transmission unit 527 transmits the driving control value created by the control value creation unit 526 to the vehicle 10. Note that the remote transmission unit 527 may transmit the driving control value to the vehicle 10 via the detection device 9. In this case, the remote transmission unit 527 may transmit the driving control value to the detection device 9. Furthermore, the detection device 9 transmits to the vehicle 10 the driving control value received from the remote operation device 5.

The display control unit 528 controls contents to display on the display unit 550. More specifically, the display control unit 528 causes the display unit 550 to display, for example, at least one of the in-vehicle sensor information acquired by the first in-vehicle sensor 260 mounted on the target vehicle 10 and the detection information acquired by the detection device 9. The target vehicle 10 is the vehicle 10 that has fallen in least one state of the first state, the second state, and the third state during running in the remote autonomous driving mode. The target vehicle 10 is, for example, the second vehicle 102 illustrated in FIG. 1. For example, the display control unit 528 illustrated in FIG. 5 causes the display unit 550 to display the information designation screen for allowing the operator to designate the in-vehicle sensor information or the detection information to display on the display unit 550. Furthermore, the display control unit 528 causes the display unit 550 to display the in-vehicle sensor information or the detection information designated via the information designation screen. In this case, the display control unit 528 may cause the display unit 550 to display, for example, information obtained by superimposing the intrusion position information on at least one imaging information of the internal imaging information included in the in-vehicle sensor information and the external imaging information included in the detection information. Note that control of the display control unit 528 and the display contents of the display unit 550 are not limited to these.

The area setting unit 529 sets a range of an intrusion forbidden area according to the driving mode of the vehicle 10. The intrusion forbidden area is an area that is set to the surroundings of the vehicle 10 and forbids intrusion of the moving object. When, for example, the remote autonomous driving mode is switched to the remote manual driving mode, the area setting unit 529 sets the intrusion forbidden area such that the range of the intrusion forbidden area in the remote manual driving mode is larger than a range of the intrusion forbidden area in the remote autonomous driving mode.

Note that at least part of the functions of the remote CPU 52 may be implemented as the functions of the vehicle control device 20 and the detection device 9. For example, the switching determination unit 524 may be implemented as the function of the vehicle control device 20. In this case, the vehicle control device 20 may directly acquire the detection information from the detection device 9 without the remote operation device 5. Furthermore, for example, the display control unit 528 may be implemented as the function of the detection device 9.

Figure 6:
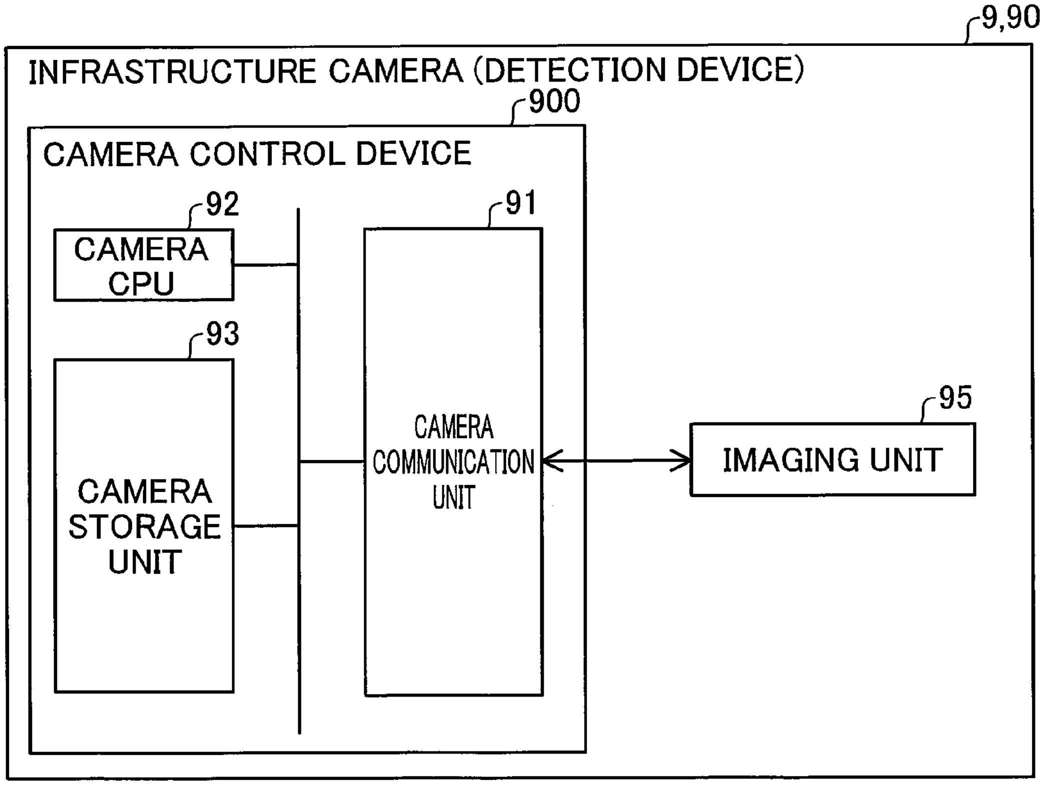
FIG. 6 is a block diagram illustrating a schematic configuration of an infrastructure camera that is a detection device.

FIG. 6 is a block diagram illustrating a schematic configuration of the infrastructure camera 90 that is the detection device 9. The detection device 9 is a device that acquires information on the vehicle 10 and the surrounding area from the outside of the vehicle 10. In the present embodiment, as described above, the detection device 9 is the infrastructure camera 90 that includes an imaging unit 95 and a camera control device 900.

The imaging unit 95 acquires external imaging information that looks down on a track such as the conveyance passage R or the storage place Y, and the vehicle 10 that runs on the track. The external imaging information acquired by the imaging unit 95 is used to remotely operate the vehicle 10 by the remote operation device 5, generate the vehicle position information, and detect the moving object that has intruded the surrounding area of the vehicle 10. Installation positions and the number of the installed detection devices 9 are determined taking the imaging range RG (angle of view) of the imaging unit 95 into account to image the entire track by the imaging unit 95. More specifically, as illustrated in FIG. 1, detection devices 901 and 902 are installed such that a first imaging range RG1 that is the imaging range RG of the imaging unit 95 of the neighboring first detection device 901, and a second imaging range RG2 that is the imaging range RG of the imaging unit 95 of the second detection device 902 overlap. Note that the imaging unit 95 may acquire not only information showing the vehicle 10 from above, but also information showing the vehicle 10 from the front, the back, the sides, and the like. Furthermore, the detection device 9 may include a sensor and the like other than the imaging unit 95.

As illustrated in FIG. 6, the camera control device 900 includes a camera communication unit 91 that is the communication unit of the camera control device 900, a camera storage unit 93 that is a storage unit of the camera control device 900, and a camera CPU 92 that is a central processing unit of the camera control device 900. The camera communication unit 91, the camera storage unit 93, and the camera CPU 92 are connected to each other via an internal bus or an interface circuit.

The camera communication unit 91 connects the remote control device 50, the vehicle control device 20, the imaging unit 95, and the camera control device 900 so as to enable communication therebetween. The camera communication unit 91 is, for example, a wireless communication device. Note that a communication method of the camera communication unit 91 is not limited to this.

The camera storage unit 93 stores various pieces of information including various programs for controlling the operation of the detection device 9. Furthermore, the camera storage unit 93 may store, for example, a vehicle position detection model and an intrusion detection model. The vehicle position detection model is a trained machine learning model that is used to specify the position (e.g., coordinate value) of the vehicle 10 included in the external imaging information. The intrusion detection model is a trained machine learning model that is used to detect the moving object having intruded the surrounding area of the vehicle 10. For the vehicle position detection model and the intrusion detection model, for example, an algorithm of a neural network is used.

Figure 7:
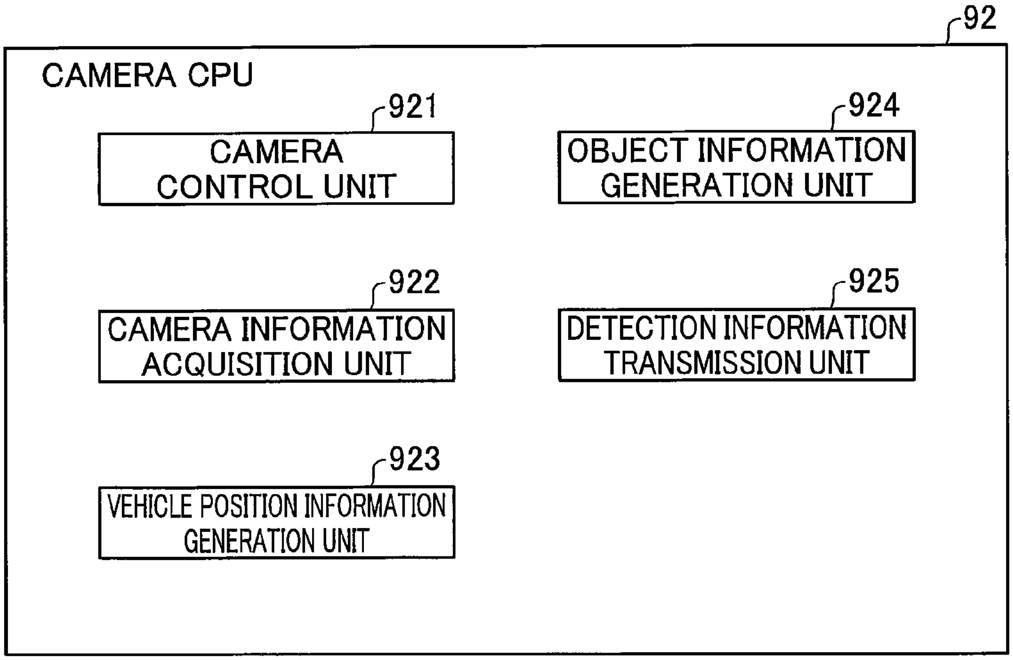
FIG. 7 is a block diagram illustrating a schematic configuration of a camera CPU.

FIG. 7 is a block diagram illustrating a schematic configuration of the camera CPU 92. The camera CPU 92 functions as a camera control unit 921, a camera information acquisition unit 922, a vehicle position information generation unit 923, an object information generation unit 924, and a detection information transmission unit 925 by expanding the various programs stored in the camera storage unit 93. The camera control unit 921 controls the operation of the imaging unit 95.

The camera information acquisition unit 922 acquires various pieces of information. For example, the camera information acquisition unit 922 acquires external imaging information acquired by the imaging unit 95. Furthermore, for example, the camera information acquisition unit 922 receives and acquires the abnormality information and the failure information transmitted from the vehicle 10 or the remote operation device 5.

The vehicle position information generation unit 923 generates the vehicle position information by performing image analysis on the external imaging information acquired by the camera information acquisition unit 922, and specifying the position of the vehicle 10. Note that, for image analysis performed by the vehicle position information generation unit 923, an image of the entire vehicle 10 may be used, or an image of part of the vehicle 10 such as an alignment mark provided to the vehicle 10 may be used.

The object information generation unit 924 generates object information including object basic information and intrusion position information by performing image analysis on the external imaging information acquired by the camera information acquisition unit 922. For example, the object information generation unit 924 detects the position, the shape, and the like of an object existing in the surrounding area of the vehicle 10. Consequently, the object information generation unit 924 generates the object basic information. Furthermore, the object information generation unit 924 determines which one of a fixed object and a moving object the detected object is. Furthermore, when determining that the detected object is the moving object, the object information generation unit 924 generates the intrusion information indicating that the moving object has intruded the surrounding area of the vehicle 10. Furthermore, the object information generation unit 924 specifies the position of the object that is included in the external imaging information and has been determined as the moving object. Consequently, the object information generation unit 924 generates the intrusion position information. That is, the object information generation unit 924 detects that the vehicle 10 has fallen in the second state during running in the remote autonomous driving mode.

The detection information transmission unit 925 transmits to the remote operation device 5 the detection information including the external imaging information acquired by the camera information acquisition unit 922, the vehicle position information generated by the vehicle position information generation unit 923, and the object information generated by the object information generation unit 924. Note that information transmitted by the detection information transmission unit 925 is not limited to this. Furthermore, the detection information transmission unit 925 may directly transmit the detection information to the vehicle 10 without the remote operation device 5. The detection information transmission unit 925 transmits, for example, various pieces of information together with device identification information. The device identification information is a unique IDentifier (ID) assigned to each detection device 9 without overlapping between the detection devices 9 to identify a plurality of the detection devices 9. In the present embodiment, the device IDs are camera IDs for identifying a plurality of the infrastructure cameras 90.

A-1a: Basic Running Control of Vehicle

Figure 8A:
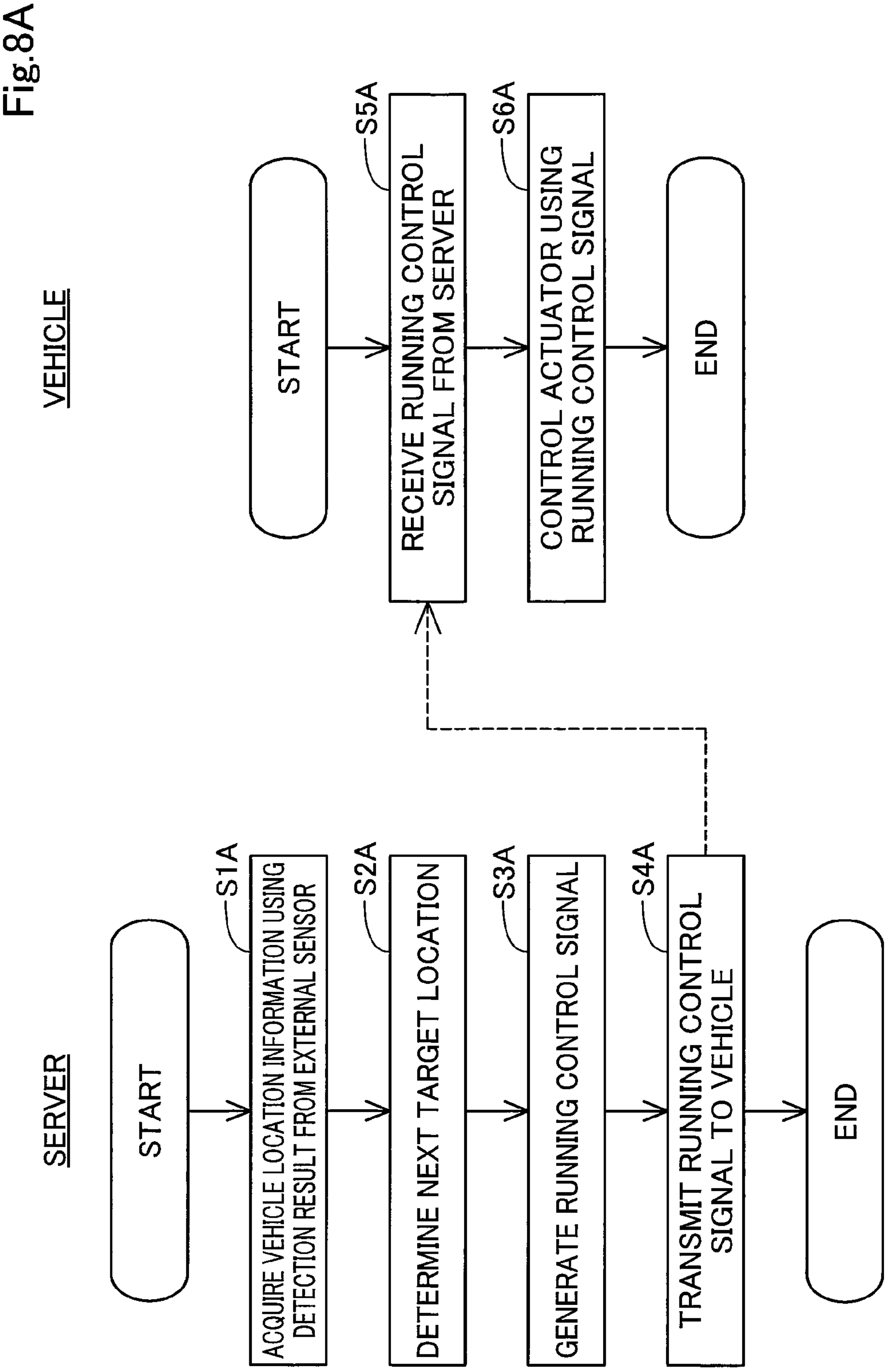
FIG. 8A is a flowchart illustrating a processing procedure of running control of the vehicle according to a first embodiment.

FIG. 8A is a flowchart showing a processing procedure for running control of the vehicle 10 in the first embodiment. In step S1A, the server 5 acquires vehicle location information using detection result output from an external sensor. The external sensor is located outside the vehicle 10. The vehicle location information is locational information as a basis for generating a running control signal. In the present embodiment, the vehicle location information includes the location and orientation of the vehicle 10 in a reference coordinate system of the factory. In the present embodiment, the reference coordinate system of the factory is a global coordinate system and a location in the factory can be expressed by X, Y, and Z coordinates in the global coordinate system. In the present embodiment, the external sensor is a camera that is disposed in the factory and outputs a captured image as detection result. In step S1A, the server 5 acquires the vehicle location information using the captured image acquired from the infrastructure camera 90 as the external sensor.

More specifically, in step S1, the server 5 for example, determines the outer shape of the vehicle 10 from the captured image, calculates the coordinates of a positioning point of the vehicle 10 in a coordinate system of the captured image, namely, in a local coordinate system, and converts the calculated coordinates to coordinates in the global coordinate system, thereby acquiring the location of the vehicle 10. The outer shape of the vehicle 10 in the captured image may be detected by inputting the captured image to a detection model using artificial intelligence, for example. The detection model is prepared in the remote operation system 1 or outside the remote operation system 1. The detection model is stored in advance in a memory of the server 5, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 10, and a label showing whether each region in the training image is a region indicating the vehicle 10 or a region indicating a subject other than the vehicle 10, for example. In training the CNN, a parameter for the CNN is preferably updated through backpropagation in such a manner as to reduce error between output result obtained by the detection model and the label. The server 5 can acquire the orientation of the vehicle 10 through estimation based on the direction of a motion vector of the vehicle 10 detected from change in location of a feature point of the vehicle 10 between frames of the captured images using optical flow process, for example.

In step S2A, the server 5 determines a target location to which the vehicle 10 is to move next. In the present embodiment, the target location is expressed by X, Y, and Z coordinates in the global coordinate system. The memory of the server 5 contains a reference route stored in advance as a route along which the vehicle 10 is to run. The route is expressed by a node indicating a departure place, a node indicating a way point, a node indicating a destination, and a link connecting nodes to each other. The server 5 determines the target location to which the vehicle 10 is to move next using the vehicle location information and the reference route. The server 5 determines the target location on the reference route ahead of a current location of the vehicle 10.

In step S3A, the server 5 generates a running control signal for causing the vehicle 10 to run toward the determined target location. In the present embodiment, the running control signal includes an acceleration and a steering angle of the vehicle 10 as parameters. The server 5 calculates a running speed of the vehicle 10 from transition of the location of the vehicle 10 and makes comparison between the calculated running speed and a target speed of the vehicle 10 determined in advance. If the running speed is lower than the target speed, the server 5 generally determines an acceleration in such a manner as to accelerate the vehicle 10. If the running speed is higher than the target speed as, the server 5 generally determines an acceleration in such a manner as to decelerate the vehicle 10. If the vehicle 10 is on the reference route, server 5 determines a steering angle and an acceleration in such a manner as to prevent the vehicle 10 from deviating from the reference route. If the vehicle 10 is not on the reference route, in other words, if the vehicle 10 deviates from the reference route, the server 5 determines a steering angle and an acceleration in such a manner as to return the vehicle 10 to the reference route. In other embodiments, the running control signal may include the speed of the vehicle 10 as a parameter instead of or in addition to the acceleration of the vehicle 10.

In step S4A, the server 5 transmits the generated running control signal to the vehicle 10. The server 5 repeats the acquisition of vehicle location information, the determination of a target location, the generation of a running control signal, the transmission of the running control signal, and others in a predetermined cycle.

In step S5A, the driving controller of the vehicle 10 receives the running control signal transmitted from the server 5. In step S6A, the vehicle 10 controls an actuator of the vehicle 10 using the received running control signal, thereby causing the vehicle 10 to run at the acceleration and the steering angle indicated by the running control signal. The vehicle 10 repeats the reception of a running control signal and the control over the actuator in a predetermined cycle. According to the remote operation system 1 in the present embodiment, it becomes possible to move the vehicle 10 without using a transport unit such as a crane or a conveyor.

A-2. Control Method for Vehicle in Remote Autonomous Driving Mode

Figure 8B:
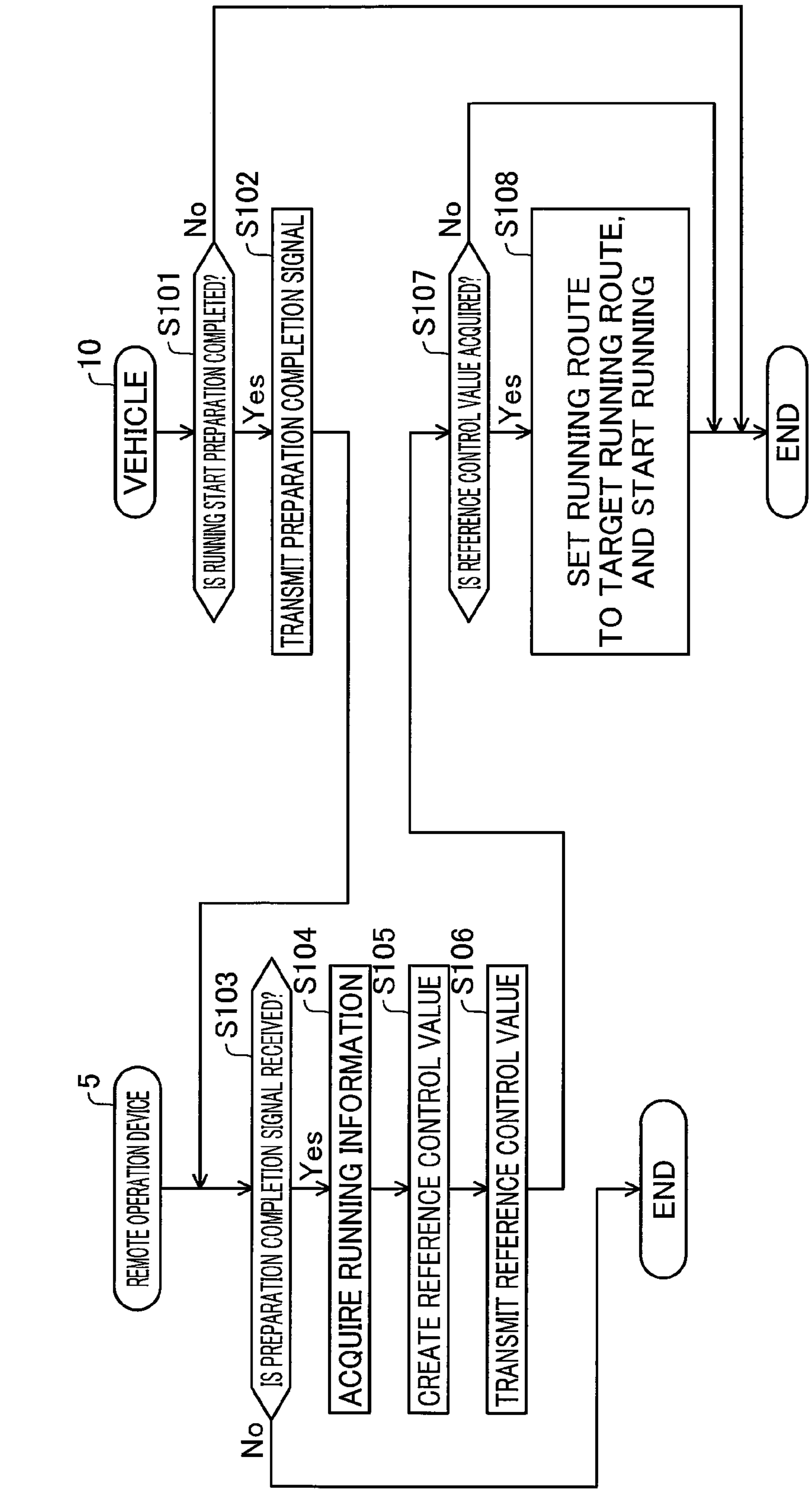
FIG. 8B is a flowchart illustrating a first operation control method.

FIG. 8B is a flowchart illustrating a first operation control process (step S1). The first operation control method (step S1) is a method for controlling the operation of the vehicle 10 to cause the vehicle 10 to start running in the remote autonomous driving mode.

According to the first operation control method (step S1), when running start preparation for starting running in the remote autonomous driving mode is completed (step S101: Yes), the vehicle information transmission unit 226 of the vehicle control device 20 executes following processing. In this case, the vehicle information transmission unit 226 transmits a preparation completion signal to the remote operation device 5 (step S102).

When the running information acquisition unit 521 of the remote operation device 5 receives the preparation completion signal (step S103: Yes), the running information acquisition unit 521 acquires the running information (step S104). In this case, the running information includes at least the running route information that indicates the target running route. After step S104, the control value creation unit 526 create using the running information the driving control value (hereinafter, reference control value) for the vehicle 10 to run along the target running route (step S105). After step S105, the remote transmission unit 527 transmits the reference control value created by the control value creation unit 526 to the vehicle 10 (step S106). Note that the reference control value may include only the target running route, or may include a specific running condition (e.g., target rudder angle) for achieving the target running route.

When the operation control unit 228 of the vehicle control device 20 receives the reference control value (step S107: Yes), the operation control unit 228 sets the running route of the vehicle 10 to the target running route, and starts running in the remote autonomous driving mode (step S108). That is, the operation control unit 228 controls the steering device 25 and the actuator 29 mounted on the vehicle 10 such that the vehicle 10 runs along the target running route.

Figure 9:
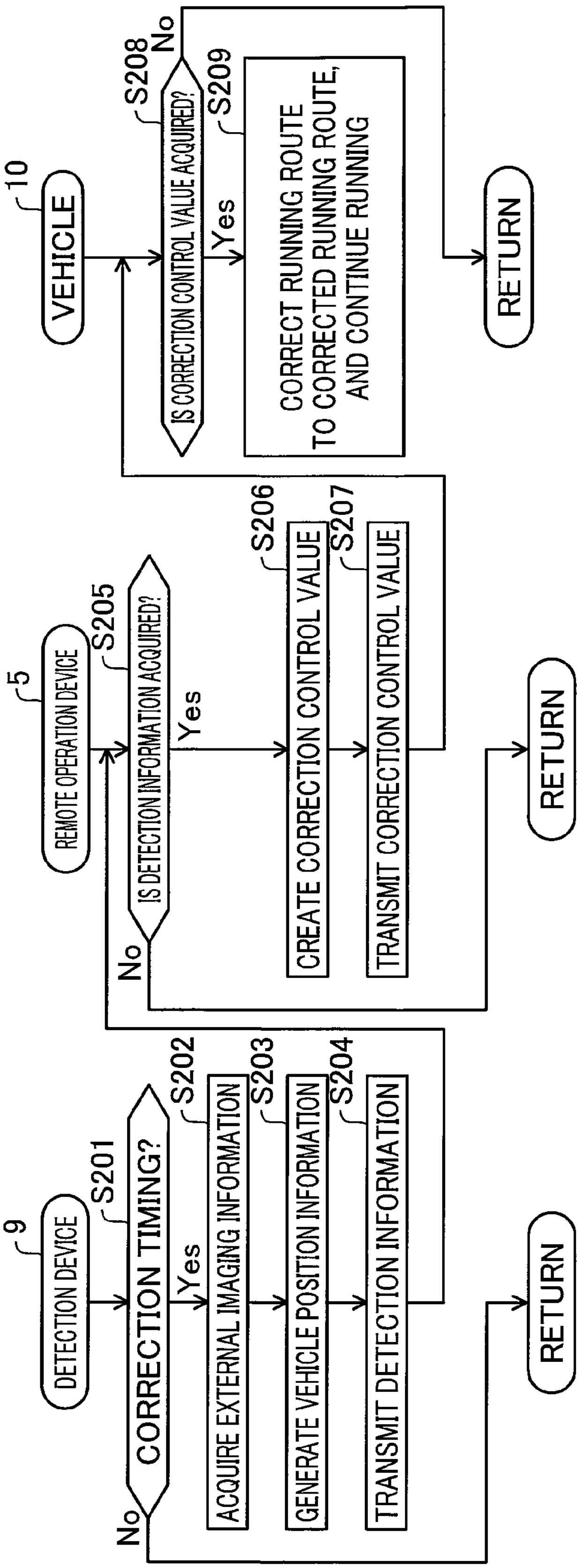
FIG. 9 is a flowchart illustrating a second operation control method.

FIG. 9 is a flowchart illustrating a second operation control method (step S2). The second operation control method (step S2) is a method for correcting the running route of the vehicle 10 that is running in the remote autonomous driving mode.

When a predetermined correction timing comes (step S201: Yes), the camera information acquisition unit 922 of the detection device 9 acquires the external imaging information acquired by the imaging unit 95 (step S202). The correction timing is, for example, a timing at which a time that passes from a timing at which running in the remote autonomous driving mode starts becomes a predetermined time or more, or a timing at which a predetermined time passes from a previous correction timing. After step S202, the vehicle position information generation unit 923 generates the vehicle position information using the external imaging information acquired by the camera information acquisition unit 922 (step S203). After step S203, the detection information transmission unit 925 transmits the detection information including at least the vehicle position information and the external imaging information to the remote operation device 5 (step S204).

When the running information acquisition unit 521 of the remote operation device 5 acquires the detection information (step S205: Yes), the control value creation unit 526 executes following processing. In this case, the control value creation unit 526 creates using the running information the driving control value (hereinafter, correction control value) for correcting the relative position of the vehicle 10 with respect to the target running route (step S206). More specifically, the control value creation unit 526 calculates an actual running trajectory of the vehicle 10 by, for example, aligning a plurality of pieces of external imaging information imaged in the different imaging ranges RG1 and RG2 in chronological order. Furthermore, the control value creation unit 526 compares the target running route and the actual running trajectory of the vehicle 10, and calculates a difference of the running trajectory from the target running route. Furthermore, the control value creation unit 526 creates the correction control value for achieving the target running route while analyzing the external imaging information to reduce the difference between the target running route and the actual running trajectory of the vehicle 10. Note that a calculation method for the relative position and the running trajectory of the vehicle 10 is not limited to this. The correction control value may include only a corrected running route, or may include a specific running condition for achieving the corrected running route. Furthermore, the running information acquisition unit 521 may acquire the vehicle side information including the in-vehicle sensor information and the vehicle state information in addition to the detection information. After step S206, the remote transmission unit 527 transmits the correction control value created by the control value creation unit 526 to the vehicle 10 (step S207).

When the operation control unit 228 of the vehicle control device 20 receives and acquires the correction control value (step S208: Yes), the operation control unit 228 corrects the running route of the vehicle 10 to the corrected running route according to the correction control value, and continues running in the remote autonomous driving mode (step S209). That is, the operation control unit 228 controls the operations of the steering device 25 and the actuator 29 mounted on the vehicle 10 such that the vehicle 10 runs along the corrected running route. When step S209 is completed, the flow returns to step S201, and each step from step S201 to step S209 is repeatedly executed.

A-3. Driving Mode Switching Method

Figure 10:
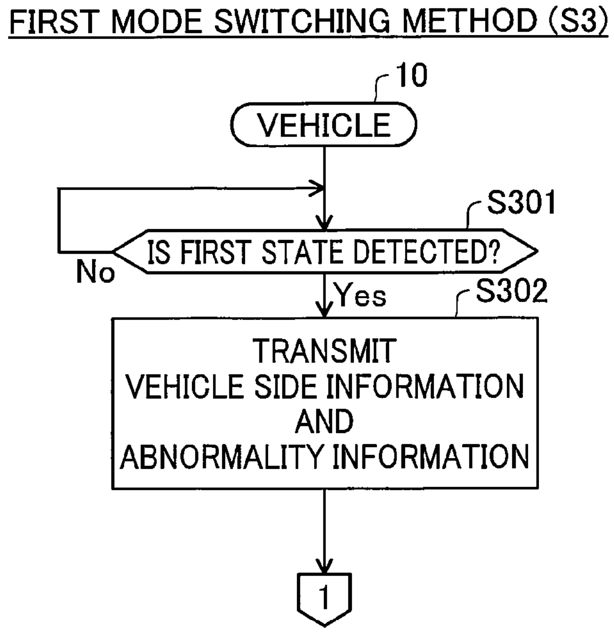
FIG. 10 is a first flowchart illustrating a first mode switching method.
Figure 11:
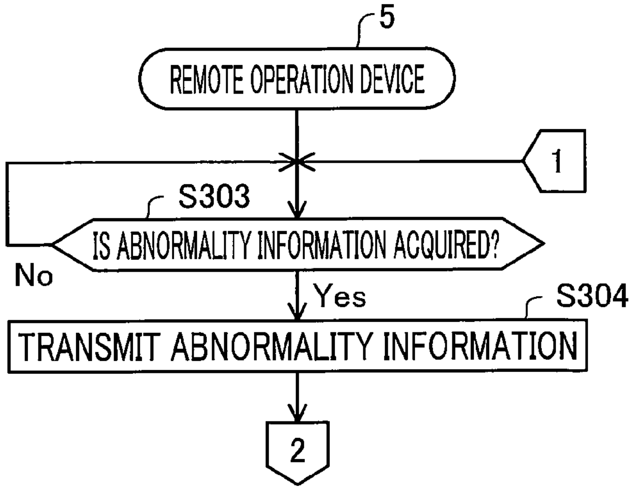
FIG. 11 is a second flowchart illustrating the first mode switching method.
Figure 12:
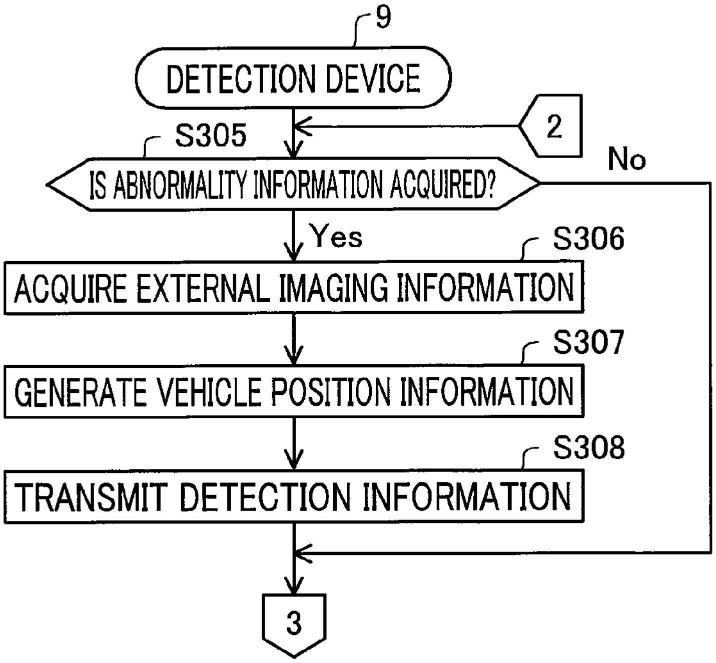
FIG. 12 is a third flowchart illustrating the first mode switching method.
Figure 13:
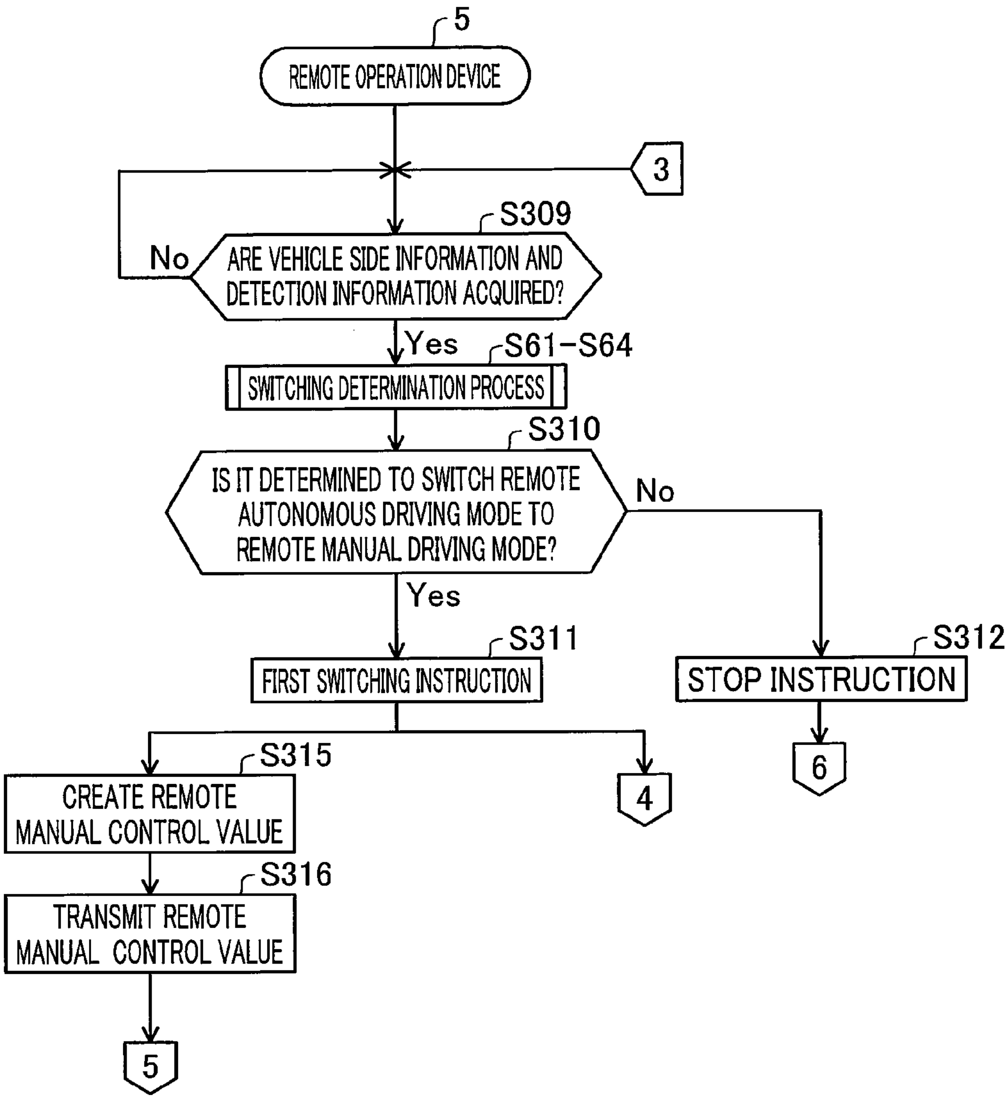
FIG. 13 is a fourth flowchart illustrating the first mode switching method.
Figure 14:
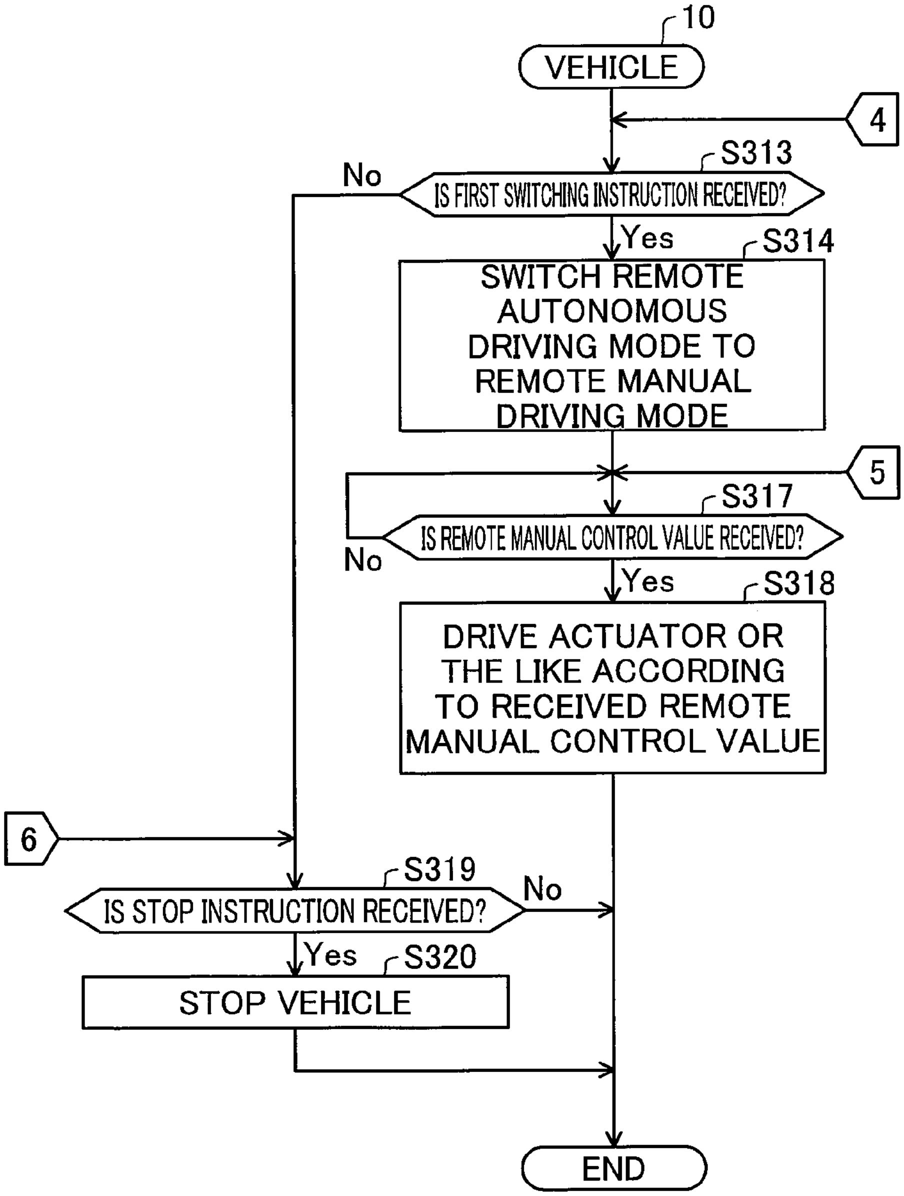
FIG. 14 is a fifth flowchart illustrating the first mode switching method.

FIG. 10 is a first flowchart illustrating a first mode switching process (step S3). FIG. 11 is a second flowchart illustrating the first mode switching process (step S3). FIG. 12 is a third flowchart illustrating the first mode switching process (step S3). FIG. 13 is a fourth flowchart illustrating the first mode switching process (step S3). FIG. 14 is a fifth flowchart illustrating the first mode switching process (step S3). The first switching method (step S3) is a method for switching the driving mode of the vehicle 10 from the remote autonomous driving mode to the remote manual driving mode when the vehicle 10 falls in the first state during running in the remote autonomous driving mode.

As illustrated in FIG. 10, when the abnormality detection unit 225 of the vehicle 10 detects that the state of the vehicle 10 has become the abnormal state (step S301: Yes), the vehicle information transmission unit 226 executes following processing. That is, when the abnormality detection unit 225 detects the first state, the vehicle information transmission unit 226 transmits vehicle side information including the in-vehicle sensor information and the vehicle state information, and the abnormality information together with the vehicle identification information to the remote operation device 5 (step S302).

As illustrated in FIG. 11, when the running information acquisition unit 521 of the remote operation device 5 receives and acquires the abnormality information (step S303: Yes), the remote transmission unit 527 may transmit the abnormality information to the detection device 9 (step S304). Note that, when the vehicle information transmission unit 226 transmits the abnormality information to the detection device 9 without the remote operation device 5, step S304 is omitted.

As illustrated in FIG. 12, when the camera information acquisition unit 922 of the detection device 9 acquires the abnormality information (step S305: Yes), the camera information acquisition unit 922 acquires the external imaging information (step S306). After step S306, the vehicle position information generation unit 923 generates the vehicle position information using the external imaging information acquired by the camera information acquisition unit 922 (step S307). After step S307, the detection information transmission unit 925 transmits the detection information including at least the external imaging information and the vehicle position information to the remote operation device 5 (step S308).

As illustrated in FIG. 13, when the switching determination unit 524 of the remote operation device 5 receives and acquires the vehicle side information and the detection information (step S309: Yes), a switching determination process is executed. In the switching determination process, the switching determination unit 524 determines, for example, whether or not to switch the driving mode of the vehicle 10 from the remote autonomous driving mode to the remote manual driving mode or whether or not to stop the vehicle 10 according to one of the switching determination methods illustrated in FIGS. 15 to 18 described later.

Figure 15:
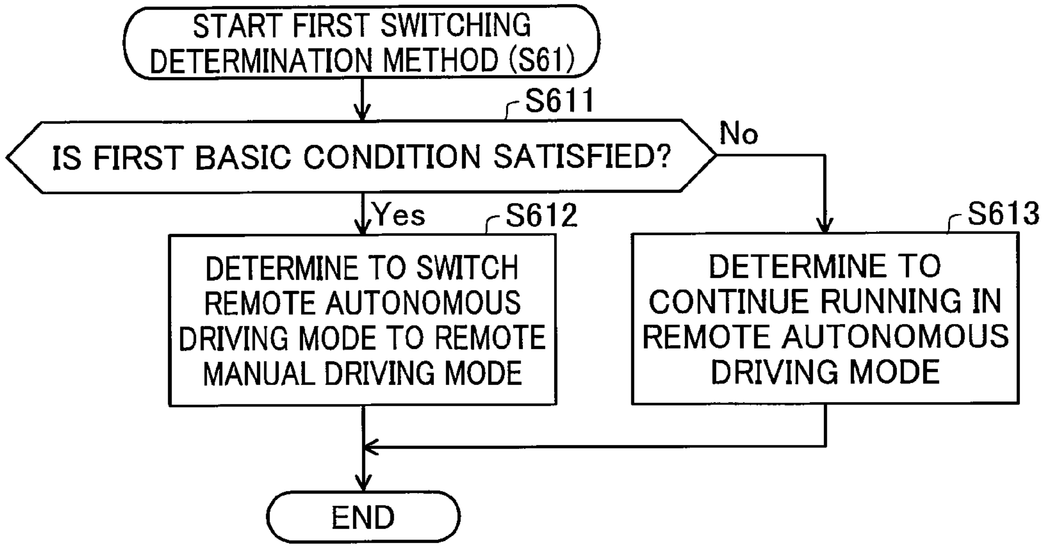
FIG. 15 is a flowchart illustrating a first switching determination method.

FIG. 15 is a flowchart illustrating a first switching determination method (step S61) in the switching determination process. The first switching determination method (step S61) is a first method for determining whether or not to switch the driving mode of the vehicle 10 from the remote autonomous driving mode to the remote manual driving mode.

According to the first switching determination method (step S61), the switching determination unit 524 first determines whether or not the first basic condition is satisfied (step S611). According to the present embodiment, the switching determination unit 524 checks whether or not information (the abnormality information in a case of the first switching determination method) for determining whether or not to switch the driving mode of the vehicle 10 from the remote autonomous driving mode to the remote manual driving mode has already been received. In a case where the switching determination unit 524 has already received the abnormality information (step S611: Yes), the switching determination unit 524 determines that the first basic condition is satisfied, and executes step S612. In this case, the switching determination unit 524 determines to switch the driving mode of the vehicle 10 from the remote autonomous driving mode to the remote manual driving mode (step S612). By contrast with this, in a case where the switching determination unit 524 has not received the abnormality information, the switching determination unit 524 determines that the first basic condition is not satisfied, and determines to continue running in the remote autonomous driving mode (step S613).

Figure 16:
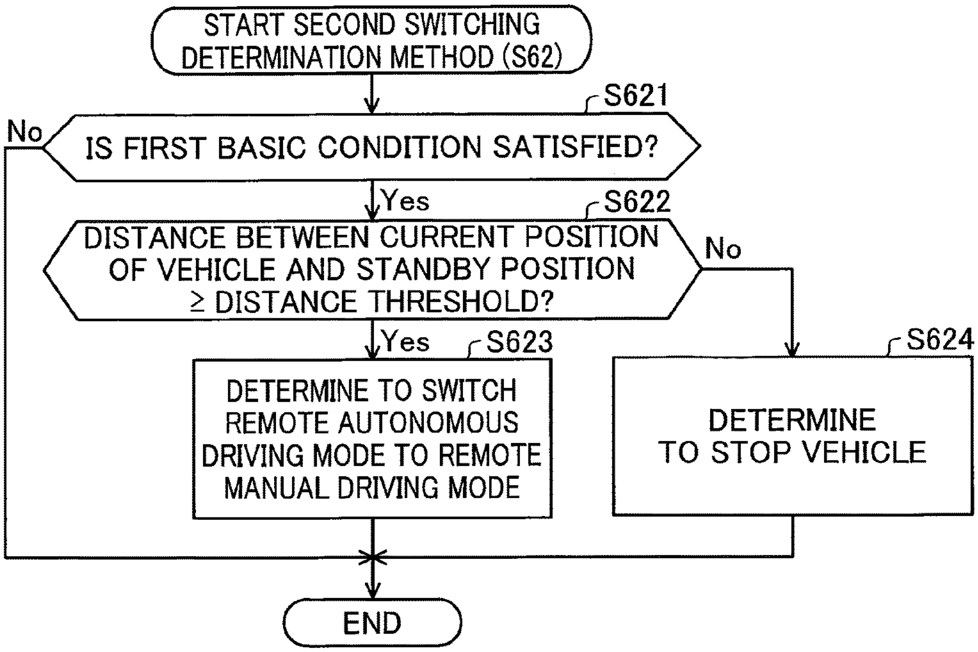
FIG. 16 is a flowchart illustrating a second switching determination method.

FIG. 16 is a flowchart illustrating a second switching determination method (step S62) in the switching determination process. The second switching determination method (step S62) is a second method for determining whether or not to switch the driving mode of the vehicle 10 from the remote autonomous driving mode to the remote manual driving mode. According to the second switching determination method (step S62), the first switching condition may include the first additional condition in addition to the first basic condition. The first additional condition according to the second switching determination method (step S62) is a condition related to a distance between a current position of the vehicle 10 and a standby position of the operator who can get on the vehicle 10 and operate the driver input device 24.

According to the second switching determination method (step S62), the switching determination unit 524 first determines whether or not the first basic condition is satisfied (step S621). According to the present embodiment, the switching determination unit 524 checks whether or not information (the abnormality information in a case of the second switching determination method) for determining whether or not to switch the driving mode of the vehicle 10 from the remote autonomous driving mode to the remote manual driving mode has already been received.

In a case where the switching determination unit 524 has already received the abnormality information (step S621: Yes), the switching determination unit 524 determines that the first basic condition is satisfied, and executes step S622. The switching determination unit 524 checks in step S622 whether or not the first additional condition is satisfied. More specifically, the switching determination unit 524 checks whether or not the distance between the current position of the vehicle 10 and the standby position of the operator who can get on the vehicle 10 and operate the driver input device 24 is a predetermined distance threshold or more. In this case, the switching determination unit 524 calculates the distance between the current position of the vehicle 10 and the standby position of the operator using, for example, the standby position of the operator stored in advance in the remote storage unit 53 and the vehicle position information. Note that a method for calculating the distance between the current position of the vehicle 10 and the standby position of the operator is not limited to this. The switching determination unit 524 may acquire the distance between the current position of the vehicle 10 and the standby position of the operator by, for example, accepting user's input via an input operation unit (not illustrated) including a mouse, a keyboard, and the like.

When the distance between the current position of the vehicle 10 and the standby position of the operator who can get on the vehicle 10 and operate the driver input device 24 is the distance threshold or more (step S622: Yes), the switching determination unit 524 makes following determination assuming that the first additional condition is satisfied. In this case, the switching determination unit 524 determines to switch the driving mode of the vehicle 10 from the remote autonomous driving mode to the remote manual driving mode (step S623). That is, when the first additional condition is satisfied in addition to the first basic condition, the switching determination unit 524 determines to switch the driving mode of the vehicle 10 from the remote autonomous driving mode to the remote manual driving mode. By so doing, even when the distance between the current position of the vehicle 10 and the standby position of the operator is long, it is possible to move the vehicle 10 by the remote operation of the operator via the operator input device 57.

By contrast with this, when the distance between the current position of the vehicle 10 and the standby position of the operator is less than the distance threshold (step S622: No), the switching determination unit 524 makes following determination assuming that the first additional condition is not satisfied. In this case, the switching determination unit 524 determines to stop the vehicle 10 without switching the driving mode of the vehicle 10 from the remote autonomous driving mode (step S624). That is, even when the first basic condition is satisfied and when the first additional condition is not satisfied, the switching determination unit 524 determines to stop the vehicle 10 without switching the driving mode of the vehicle 10 from the remote autonomous driving mode. By so doing, when the distance between the current position of the vehicle 10 and the standby position of the operator is less than the predetermined distance threshold, the operator who stands by at the standby position can quickly move the target vehicle 10 by getting on the target vehicle 10, and operating the driver input device 24.

Figure 17:
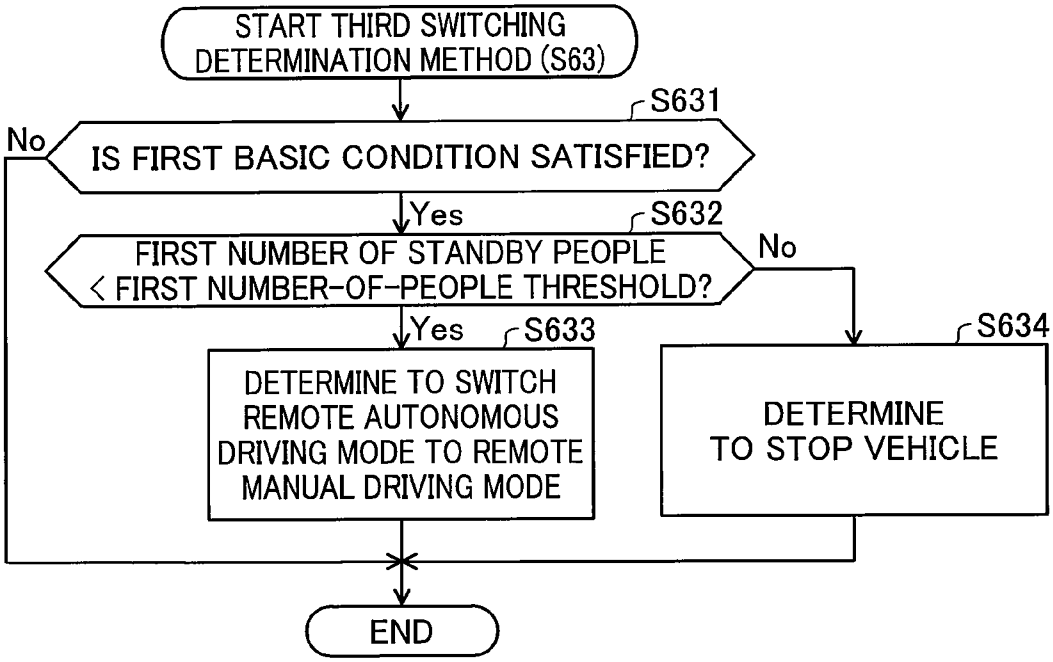
FIG. 17 is a flowchart illustrating a third switching determination method.

FIG. 17 is a flowchart illustrating a third switching determination method (step S63) in the switching determination process. The third switching determination method (step S63) is a third method for determining whether or not to switch the driving mode of the vehicle 10 from the remote autonomous driving mode to the remote manual driving mode. According to the third switching determination method (step S64), the first switching condition may include the first additional condition in addition to the first basic condition. The first additional condition according to the third switching determination method (step S63) is a condition related to the number of the operators (hereinafter, the first number-of-standby people) who can get on the vehicle 10 and operate the driver input device 24.

According to the third switching determination method (step S63), the switching determination unit 524 first determines whether or not the first basic condition is satisfied (step S631). According to the present embodiment, the switching determination unit 524 checks whether or not information (the abnormality information in a case of the third switching determination method) for determining whether or not to switch the driving mode of the vehicle 10 from the remote autonomous driving mode to the remote manual driving mode has already been received.

In a case where the switching determination unit 524 has already received the abnormality information (step S631: Yes), the switching determination unit 524 determines that the first basic condition is satisfied, and executes step S632. The switching determination unit 524 checks in step S632 whether or not the first additional condition is satisfied. More specifically, the switching determination unit 524 checks whether or not the first number-of-standby people is less than a predetermined first number-of-people threshold. In this case, the switching determination unit 524 acquires the first number-of-standby people by, for example, accepting user's input via the input operation unit (not illustrated). Furthermore, when the first number-of-standby people is less than the first number-of-people threshold (step S632: Yes), the switching determination unit 524 makes following determination assuming that the first additional condition is satisfied. In this case, the switching determination unit 524 determines to switch the driving mode of the vehicle 10 from the remote autonomous driving mode to the remote manual driving mode (step S633). That is, when the first additional condition is satisfied in addition to the first basic condition, the switching determination unit 524 determines to switch the driving mode of the vehicle 10 from the remote autonomous driving mode to the remote manual driving mode. By so doing, even when the operator has difficulty in moving the vehicle 10 by getting on the vehicle 10, and operating the driver input device 24, it is possible to quickly move the vehicle 10 by the remote operation of the operator via the operator input device 57.

By contrast with this, when the first number-of-standby people is the first number-of-people threshold or more (step S632: No), the switching determination unit 524 executes following processing assuming that the first additional condition is not satisfied. In this case, the switching determination unit 524 determines to stop the vehicle 10 without switching the driving mode of the vehicle 10 from the remote autonomous driving mode (step S634). That is, even when the first basic condition is satisfied and when the first additional condition is not satisfied, the switching determination unit 524 determines to stop the vehicle 10 without switching the driving mode of the vehicle 10 from the remote autonomous driving mode. By so doing, when the first number-of-standby people is the first number-of-people threshold or more, the operator who stands by can quickly move the target vehicle 10 by getting on the target vehicle 10, and operating the driver input device 24. Note that an acquisition method for the first number-of-standby people is not limited to this. The switching determination unit 524 may acquire the first number-of-standby people by performing image processing of, for example, detecting the number of the operators included in the external imaging information.

Figure 18:
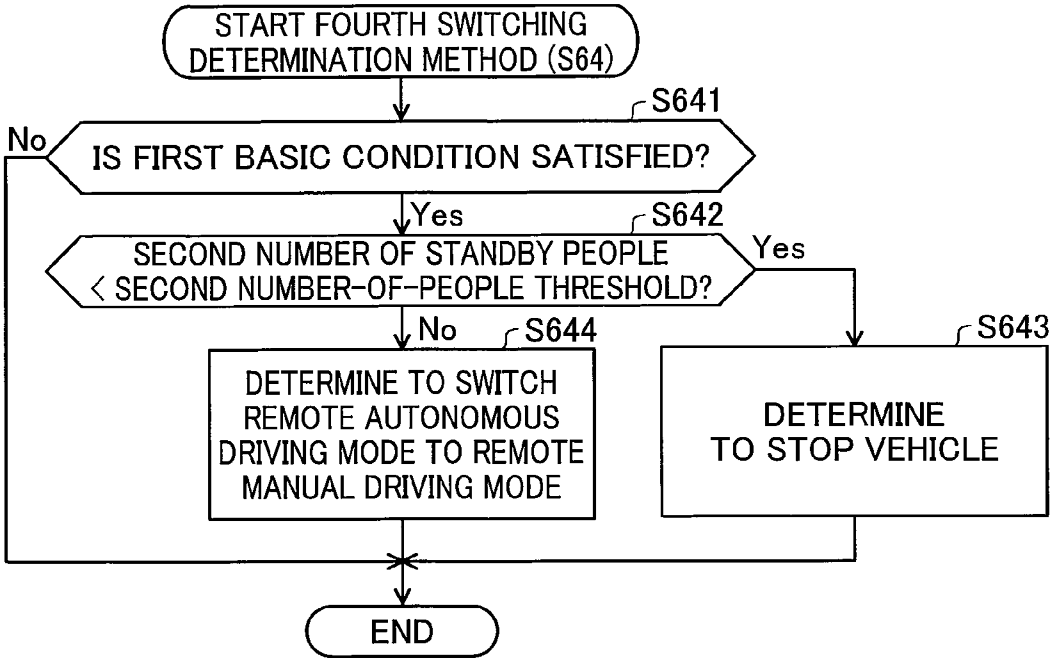
FIG. 18 is a flowchart illustrating a fourth switching determination method.

FIG. 18 is a flowchart illustrating a fourth switching determination method (step S64) in the switching determination process. The fourth switching determination method (step S64) is a fourth method for determining whether or not to switch the driving mode of the vehicle 10 from the remote autonomous driving mode to the remote manual driving mode. According to the fourth switching determination method (step S64), the first switching condition may include the first additional condition in addition to the first basic condition. The first additional condition according to the fourth switching determination method (step S64) is a condition related to the number of the operators (hereinafter, the second number-of-standby people) who can operate the operator input device 57 connected to the remote manual control device 50A.

According to the fourth switching determination method (step S64), the switching determination unit 524 first determines whether or not the first basic condition is satisfied (step S641). According to the present embodiment, the switching determination unit 524 checks whether or not information (the abnormality information in a case of the fourth switching determination method) for determining whether or not to switch the driving mode of the vehicle 10 from the remote autonomous driving mode to the remote manual driving mode has already been received.

In a case where the switching determination unit 524 has already received the abnormality information (step S641: Yes), the switching determination unit 524 determines that the first basic condition is satisfied, and executes step S642. The switching determination unit 524 checks in step S642 whether or not the first additional condition is satisfied. More specifically, the switching determination unit 524 checks whether or not the second number-of-standby people is less than a predetermined second number-of-people threshold. In this case, the switching determination unit 524 acquires the second number-of-standby people by, for example, accepting user's input via the input operation unit (not illustrated). Furthermore, when the second number-of-standby people is less than the second number-of-people threshold (step S642: Yes), the switching determination unit 524 makes following determination assuming that the first additional condition is satisfied. In this case, the switching determination unit 524 determines to stop the vehicle 10 without switching the driving mode of the vehicle 10 from the remote autonomous driving mode to the remote manual driving mode (step S643). That is, when the first additional condition is satisfied in addition to the first basic condition, the switching determination unit 524 determines to stop the vehicle 10 without switching the driving mode of the vehicle 10 from the remote autonomous driving mode to the remote manual driving mode. By so doing, even when it is difficult to move the vehicle 10 by the remote operation of the operator via the operator input device 57, it is possible to safely stop the vehicle 10.

By contrast with this, when the second number-of-standby people is the second number-of-people threshold or more (step S642: No), the switching determination unit 524 executes following processing assuming that the first additional condition is not satisfied. In this case, the switching determination unit 524 determines to switch the driving mode of the vehicle 10 from the remote autonomous driving mode to the remote manual driving mode (step S644). That is, when the second number-of-standby people is the second number-of-people threshold or more, that is, even when the first basic condition is satisfied and when the first additional condition is not satisfied, the operator who can operate the operator input device 57 has been able to sufficiently standby. Consequently, in this case, by switching the driving mode of the vehicle 10 from the remote autonomous driving mode to the remote manual driving mode, it is possible to quickly move the vehicle 10 by the remote operation of the operator via the operator input device 57. Note that an acquisition method for the second number-of-standby people is not limited to this. The switching determination unit 524 may acquire the second number-of-standby people by performing image processing of, for example, detecting the number of the operators included in the external imaging information.

As illustrated in FIG. 13, when the switching determination unit 524 determines to switch the driving mode of the vehicle 10 from the remote autonomous driving mode to the remote manual driving mode in the switching determination process (step S310: Yes), the switching instruction unit 525 executes following processing. In this case, the switching instruction unit 525 transmits to the vehicle 10 the first switching instruction for switching the driving mode of the vehicle 10 from the remote autonomous driving mode to the remote manual driving mode (step S311). On the other hand, when the switching determination unit 524 determines to stop the vehicle 10 in the switching determination process (step S310: No), the switching instruction unit 525 may transmit the stop instruction to the vehicle 10 (step S312).

As illustrated in FIG. 14, when the switching execution unit 227 of the vehicle 10 receives the first switching instruction (step S313: Yes), the switching execution unit 227 switches the driving mode of the vehicle 10 from the remote autonomous driving mode to the remote manual driving mode (step S314).

As illustrated in FIG. 13, after step S311, the control value creation unit 526 of the remote operation device 5 creates a driving control value (hereinafter, remote manual control value) corresponding to the operation of the operator input device 57 (step S315). Furthermore, the remote transmission unit 527 transmits the remote manual control value created by the control value creation unit 526 to the vehicle 10 (step S316). Note that any ones of step S313 and step S314 illustrated in FIG. 14, and step S315 and step S316 illustrated in FIG. 13 may be executed first, or these steps may be simultaneously executed in parallel.

As illustrated in FIG. 14, when the operation control unit 228 of the vehicle 10 receives the remote manual control value (step S317: Yes), the operation control unit 228 drives the steering device 25 and the actuator 29 mounted on the vehicle 10 according to the received remote manual control value (step S318). On the other hand, when receiving the stop instruction (step S319: Yes), the operation control unit 228 stops the vehicle 10 (step S320).

Note that processing contents of the first mode switching method (step S3) is not limited to this. In a case where, for example, the abnormality detection unit 225 is implemented as the function of the remote operation device 5, the remote transmission unit 527 only needs to transmit the abnormality information to each of the vehicle 10 and the detection device 9. Furthermore, the vehicle information transmission unit 226 of the vehicle 10 only needs to transmit the vehicle side information together with the vehicle identification information to the remote operation device 5.

Figure 19:
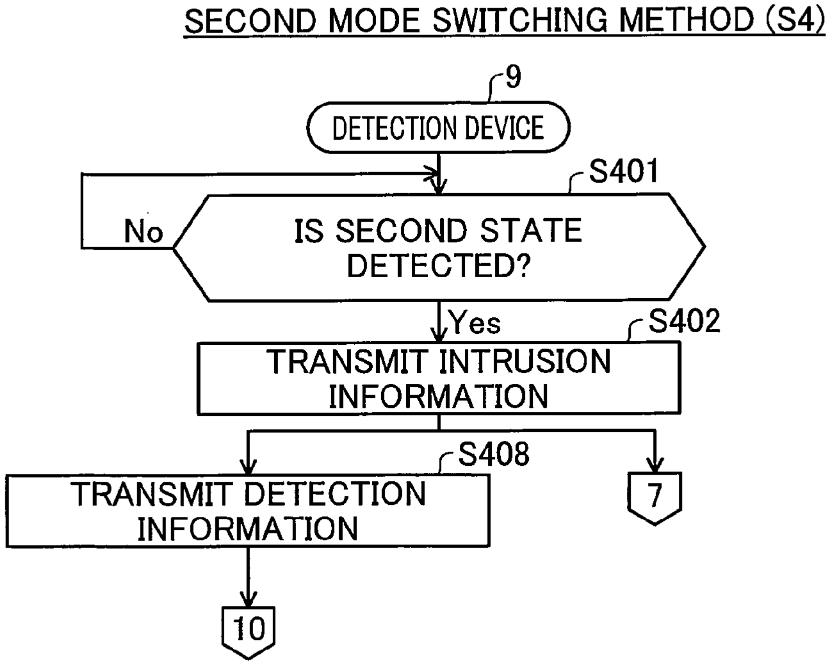
FIG. 19 is a first flowchart illustrating a second mode switching method.
Figure 20:
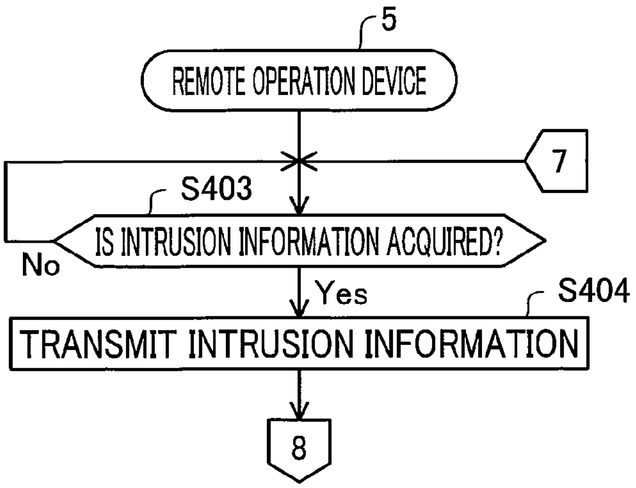
FIG. 20 is a second flowchart illustrating the second mode switching method.
Figure 21:
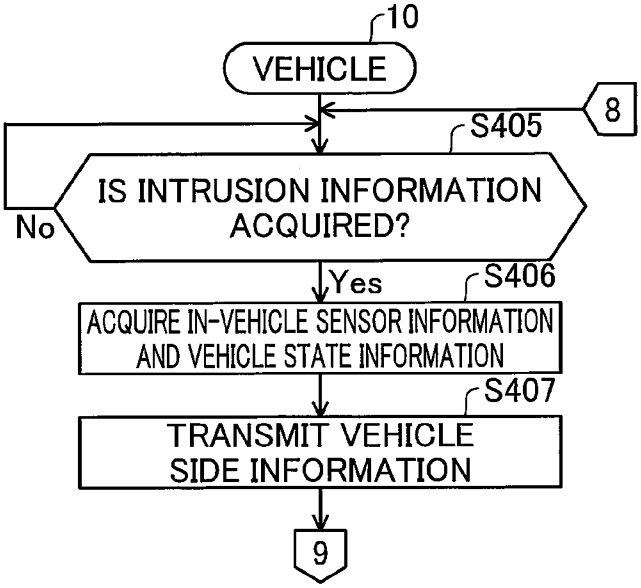
FIG. 21 is a third flowchart illustrating the second mode switching method.
Figure 22:
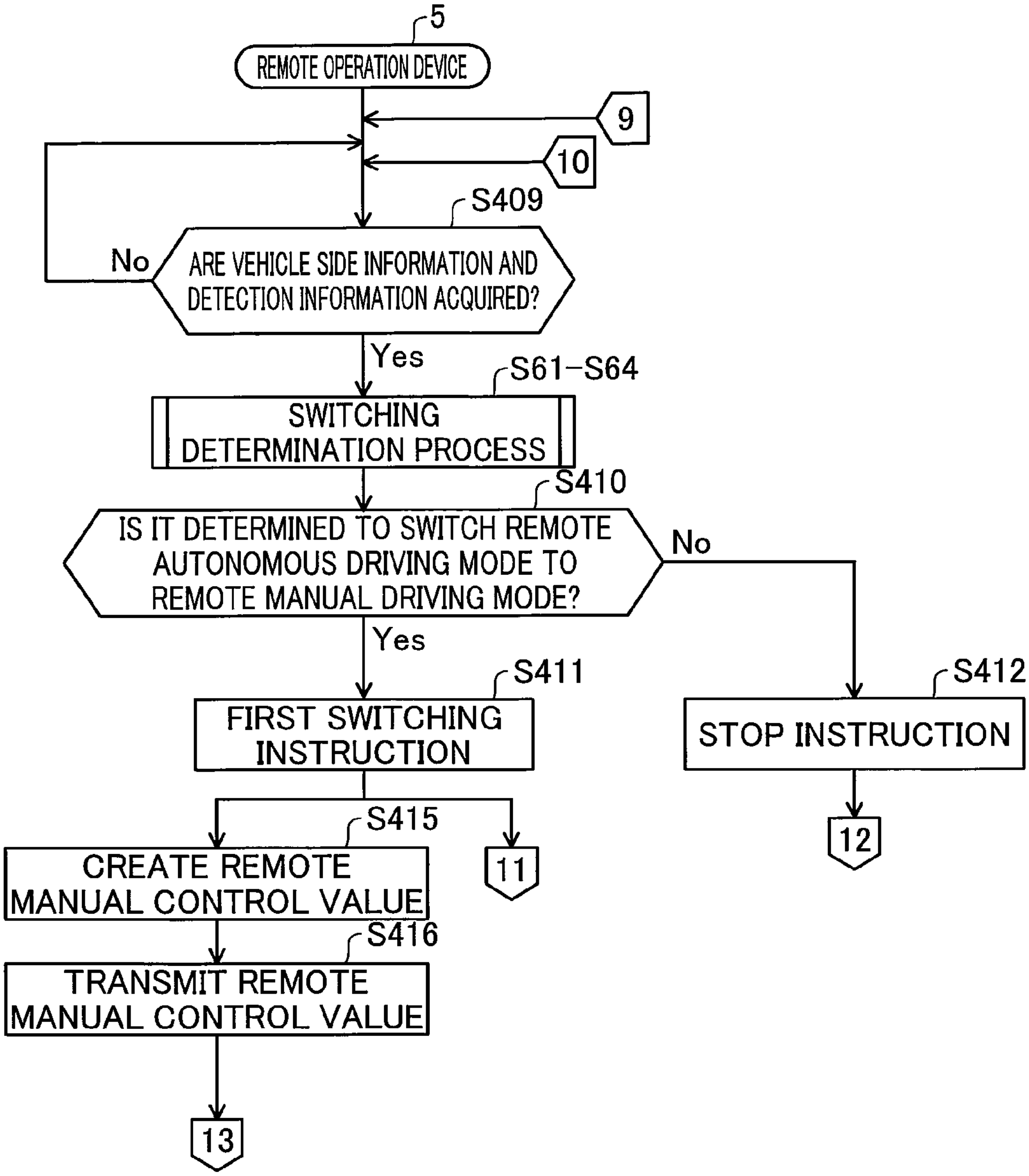
FIG. 22 is a fourth flowchart illustrating the second mode switching method.
Figure 23:
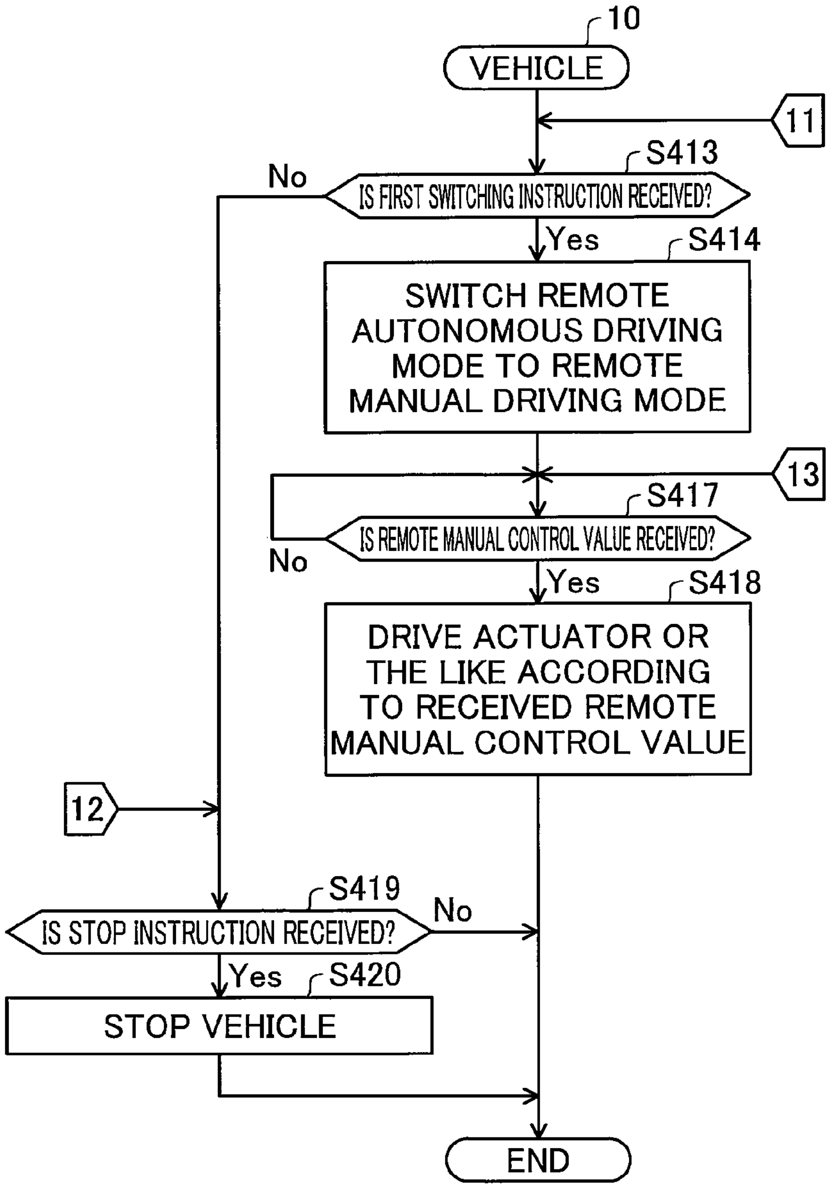
FIG. 23 is a fifth flowchart illustrating the second mode switching method.

FIG. 19 is a first flowchart illustrating a second mode switching method (step S4). FIG. 20 is a second flowchart illustrating the second mode switching method (step S4). FIG. 21 is a third flowchart illustrating the second mode switching method (step S4). FIG. 22 is a fourth flowchart illustrating the second mode switching method (step S4). FIG. 23 is a fifth flowchart illustrating the second mode switching method (step S4). The second switching method (step S4) is a method for switching the driving mode of the vehicle 10 from the remote autonomous driving mode to the remote manual driving mode when the vehicle 10 falls in the second state during running in the remote autonomous driving mode.

As illustrated in FIG. 19, when the object information generation unit 924 of the detection device 9 detects the second state (step S401: Yes), the detection information transmission unit 925 transmits the intrusion information generated by the object information generation unit 924 to the remote operation device 5 (step S402).

As illustrated in FIG. 20, when the running information acquisition unit 521 of the remote operation device 5 receives and acquires the intrusion information (step S403: Yes), the remote transmission unit 527 transmits the intrusion information to the vehicle 10 (step S404). Note that, when the detection information transmission unit 925 transmits the intrusion information to the vehicle 10 without the remote operation device 5, step S404 is omitted.

As illustrated in FIG. 21, when the running information acquisition unit 521 of the vehicle 10 receives and acquires the intrusion information (step S405: Yes), the vehicle information transmission unit 226 executes following processing. In this case, the running information acquisition unit 521 acquires the in-vehicle sensor information and the vehicle state information (step S406). After step S406, the vehicle information transmission unit 226 transmits the vehicle side information including the in-vehicle sensor information and the vehicle state information together with the vehicle identification information to the remote operation device 5 (step S407).

As illustrated in FIG. 19, after step S402, the detection information transmission unit 925 of the detection device 9 transmits detection information to the remote operation device 5 (step S408). Note that any ones of step S403 and step S404 illustrated in FIG. 20, each step from step S405 to step S407 illustrated in FIG. 21, and step S408 illustrated in FIG. 19 may be executed first, or these steps may be simultaneously executed in parallel.

As illustrated in FIG. 22, when the switching determination unit 524 of the remote operation device 5 receives and acquires the vehicle side information and the detection information (step S409: Yes), the switching determination process illustrated in FIGS. 15 to 18 is executed. When the switching determination unit 524 determines to switch the driving mode of the vehicle 10 from the remote autonomous driving mode to the remote manual driving mode in the switching determination process (step S410: Yes), the switching instruction unit 525 executes following processing. In this case, the switching instruction unit 525 transmits to the vehicle 10 the first switching instruction for switching the driving mode of the vehicle 10 from the remote autonomous driving mode to the remote manual driving mode (step S411). On the other hand, when the switching determination unit 524 determines to stop the vehicle 10 in the switching determination process (step S410: No), the switching instruction unit 525 may transmit the stop instruction to the vehicle 10 (step S412).

As illustrated in FIG. 23, when the switching execution unit 227 of the vehicle 10 receives the first switching instruction (step S413: Yes), the switching execution unit 227 switches the driving mode of the vehicle 10 from the remote autonomous driving mode to the remote manual driving mode (step S414).

As illustrated in FIG. 22, after step S411, the control value creation unit 526 of the remote operation device 5 creates a remote manual control value (step S415). Furthermore, the remote transmission unit 527 transmits the remote manual control value created by the control value creation unit 526 to the vehicle 10 (step S416). Note that any ones of step S413 and step S414 illustrated in FIG. 23, and step S415 and step S416 illustrated in FIG. 22 may be executed first, or these steps may be simultaneously executed in parallel.

As illustrated in FIG. 23, when the operation control unit 228 of the vehicle 10 receives the remote manual control value (step S417: Yes), the operation control unit 228 drives the steering device 25 and the actuator 29 mounted on the vehicle 10 according to the received remote manual control value (step S418). On the other hand, when receiving the stop instruction (step S419: Yes), the operation control unit 228 stops the vehicle 10 (step S420).

Note that processing contents of the second mode switching method (step S4) is not limited to this. In a case where, for example, the object information generation unit 924 is implemented as the function of the remote operation device 5, the remote operation device 5 only needs to transmit the intrusion information to each of the vehicle 10 and the detection device 9. Furthermore, the camera information acquisition unit 922 of the detection device 9 only needs to transmit the detection information to the remote operation device 5.

Figure 24:
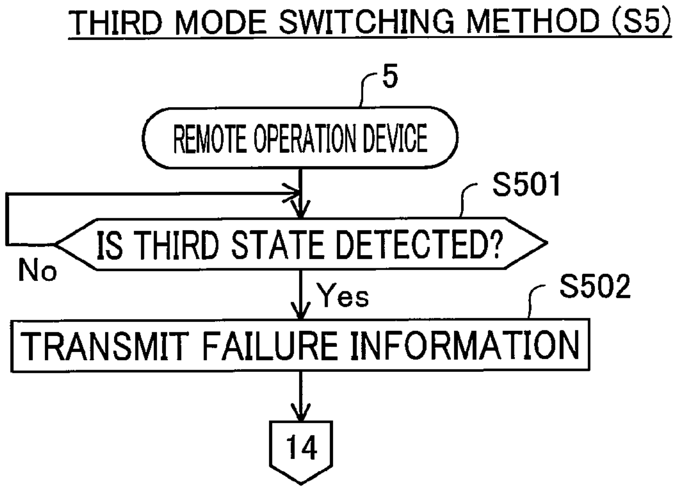
FIG. 24 is a first flowchart illustrating a third mode switching method.
Figure 25:
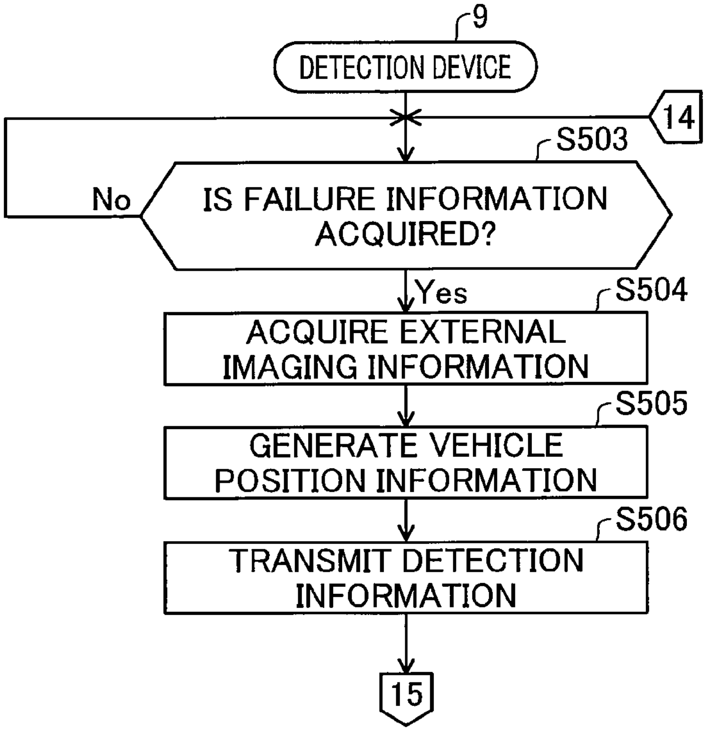
FIG. 25 is a second flowchart illustrating the third mode switching method.
Figure 26:
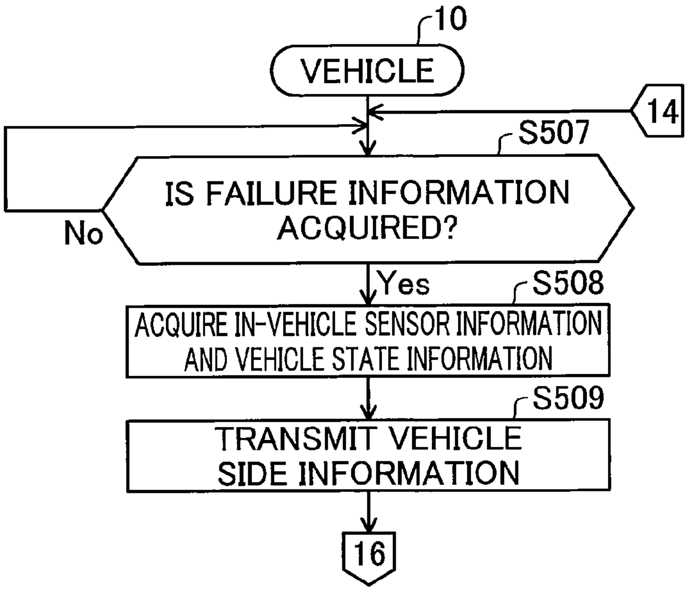
FIG. 26 is a third flowchart illustrating the third mode switching method.
Figure 27:
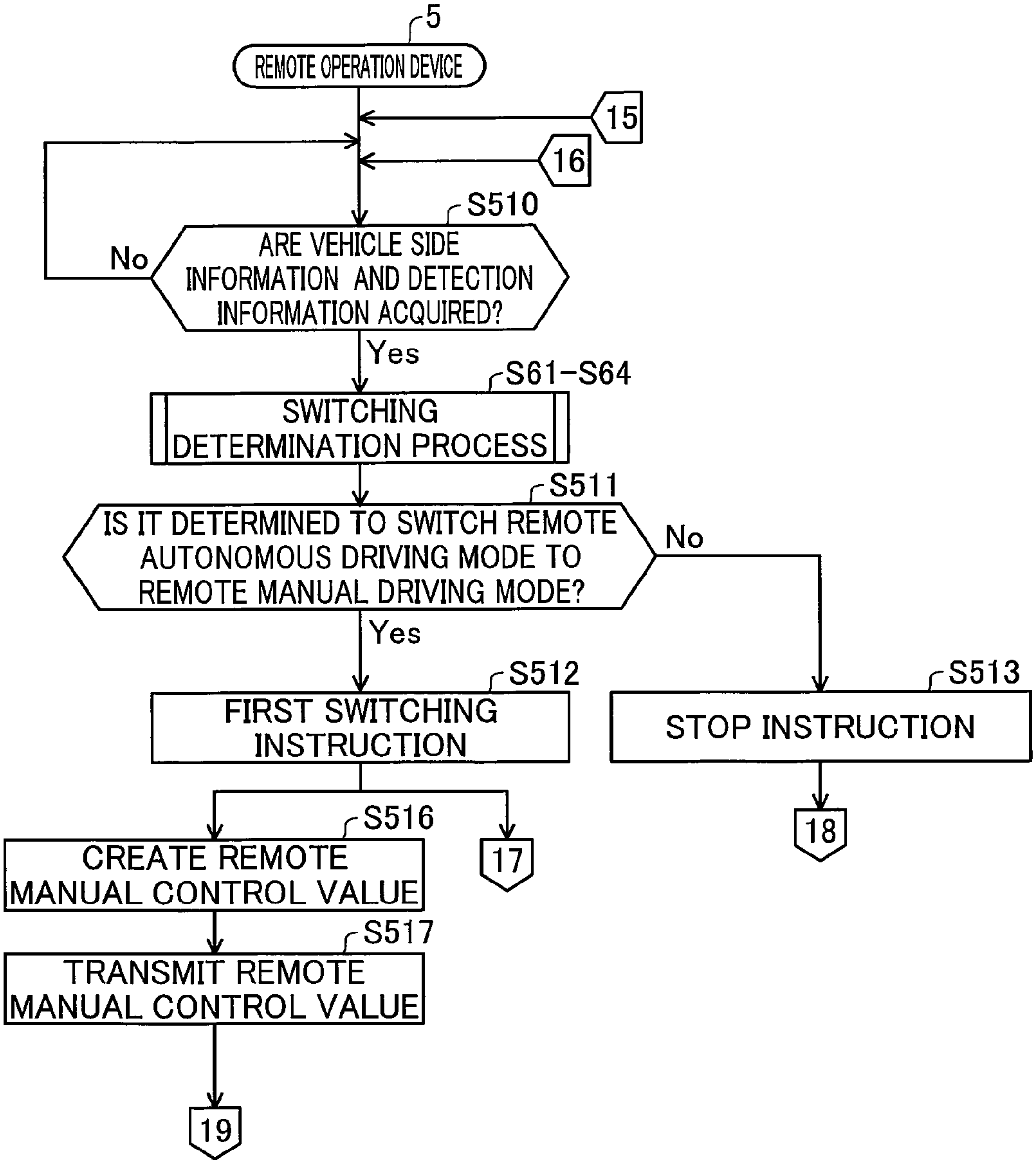
FIG. 27 is a fourth flowchart illustrating the third mode switching method.
Figure 28:
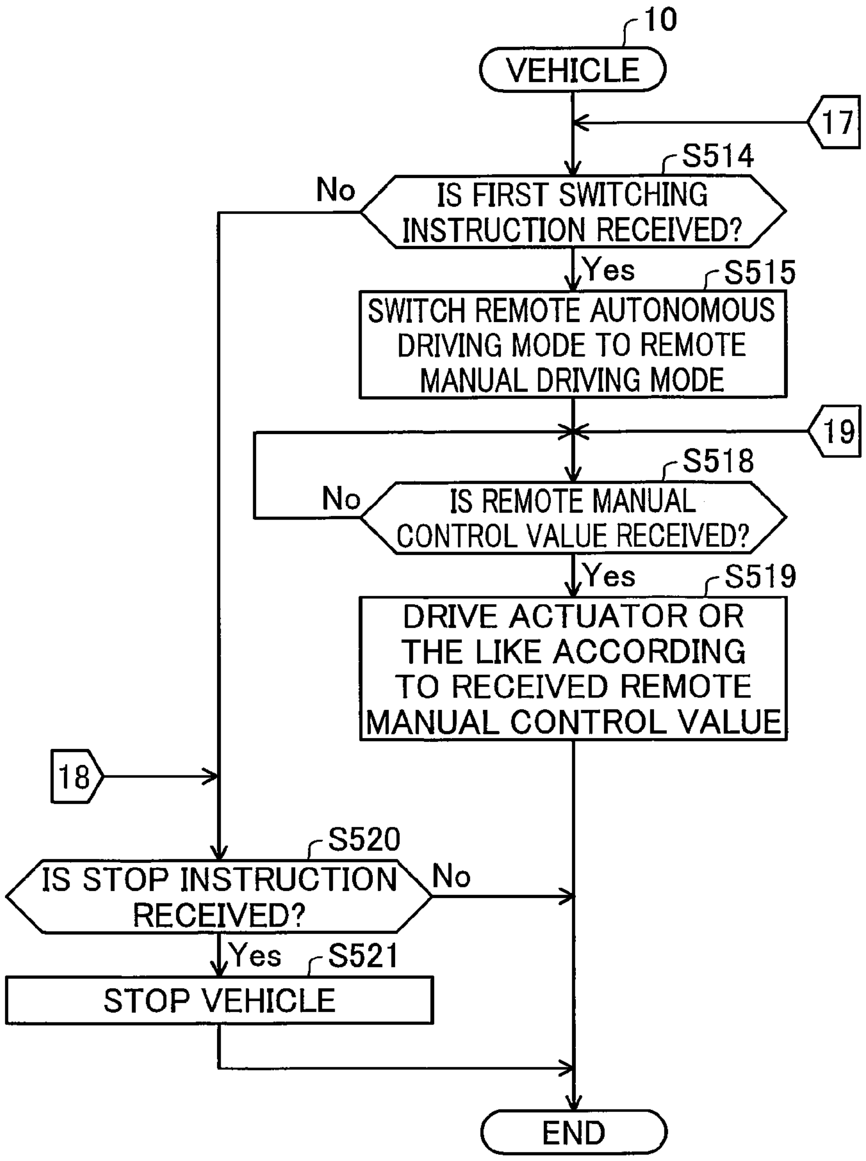
FIG. 28 is a fifth flowchart illustrating the third mode switching method.

FIG. 24 is a first flowchart illustrating a third mode switching method (step S5). FIG. 25 is a second flowchart illustrating the third mode switching method (step S5). FIG. 26 is a third flowchart illustrating the third mode switching method (step S5). FIG. 27 is a fourth flowchart illustrating the third mode switching method (step S5). FIG. 28 is a fifth flowchart illustrating the third mode switching method (step S5). The third switching method (step S5) is a method for switching the driving mode of the vehicle 10 from the remote autonomous driving mode to the remote manual driving mode when the vehicle 10 falls in the third state during running in the remote manual driving mode.

As illustrated in FIG. 24, when the failure detection unit 522 of the remote operation device 5 detects the third state (step S501: Yes), the remote transmission unit 527 transmits failure information to each of the vehicle 10 and the detection device 9 (step S502).

As illustrated in FIG. 25, when the camera information acquisition unit 922 of the detection device 9 receives and acquires the failure information (step S503: Yes), the camera information acquisition unit 922 acquires the external imaging information (step S504). After step S504, the vehicle position information generation unit 923 generates the vehicle position information using the external imaging information acquired by the camera information acquisition unit 922 (step S505). After step S505, the detection information transmission unit 925 transmits the detection information to the remote operation device 5 (step S506).

As illustrated in FIG. 26, when the running information acquisition unit 521 of the vehicle 10 receives and acquires the failure information (step S507: Yes), the vehicle information transmission unit 226 executes following processing. In this case, the running information acquisition unit 521 acquires the in-vehicle sensor information and the vehicle state information (step S508). After step S508, the vehicle information transmission unit 226 transmits the vehicle side information including the in-vehicle sensor information and the vehicle state information together with the vehicle identification information to the remote operation device 5 (step S509). Note that any ones of each step from step S503 to step S506 illustrated in FIG. 25 and each step from step S507 to step S509 illustrated in FIG. 26 may be executed first, or these steps may be simultaneously executed in parallel.

As illustrated in FIG. 27, when the switching determination unit 524 of the remote operation device 5 receives and acquires the vehicle side information and the detection information (step S510: Yes), the switching determination process illustrated in FIGS. 15 to 18 is executed. When the switching determination unit 524 determines to switch the driving mode of the vehicle 10 from the remote autonomous driving mode to the remote manual driving mode in the switching determination process (step S511: Yes), the switching instruction unit 525 executes following processing. In this case, the switching instruction unit 525 transmits to the vehicle 10 the first switching instruction for switching the driving mode of the vehicle 10 from the remote autonomous driving mode to the remote manual driving mode (step S512). On the other hand, when the switching determination unit 524 determines to stop the vehicle 10 in the switching determination process (step S511: No), the switching instruction unit 525 may transmit the stop instruction to the vehicle 10 (step S513).

As illustrated in FIG. 28, when the switching execution unit 227 of the vehicle 10 receives the first switching instruction (step S514: Yes), the switching execution unit 227 switches the driving mode of the vehicle 10 from the remote autonomous driving mode to the remote manual driving mode (step S515).

As illustrated in FIG. 27, after step S512, the control value creation unit 526 of the remote operation device 5 creates a remote manual control value (step S516). Furthermore, the remote transmission unit 527 transmits the remote manual control value created by the control value creation unit 526 to the vehicle 10 (step S517). Note that any ones of step S514 and step S515 illustrated in FIG. 28, and step S516 and step S517 illustrated in FIG. 27 may be executed first, or these steps may be simultaneously executed in parallel.

As illustrated in FIG. 28, when the operation control unit 228 of the vehicle 10 receives the remote manual control value (step S518: Yes), the operation control unit 228 drives the steering device 25 and the actuator 29 mounted on the vehicle 10 according to the received remote manual control value (step S519). On the other hand, when receiving the stop instruction (step S520: Yes), the operation control unit 228 stops the vehicle 10 (step S521).

Note that processing contents of the third mode switching method (step S5) is not limited to this. In a case where, for example, the failure detection unit 522 is implemented as the function of the vehicle control device 20, the vehicle 10 only needs to transmit the failure information to each of the remote operation device 5 and the detection device 9.

Figure 29:
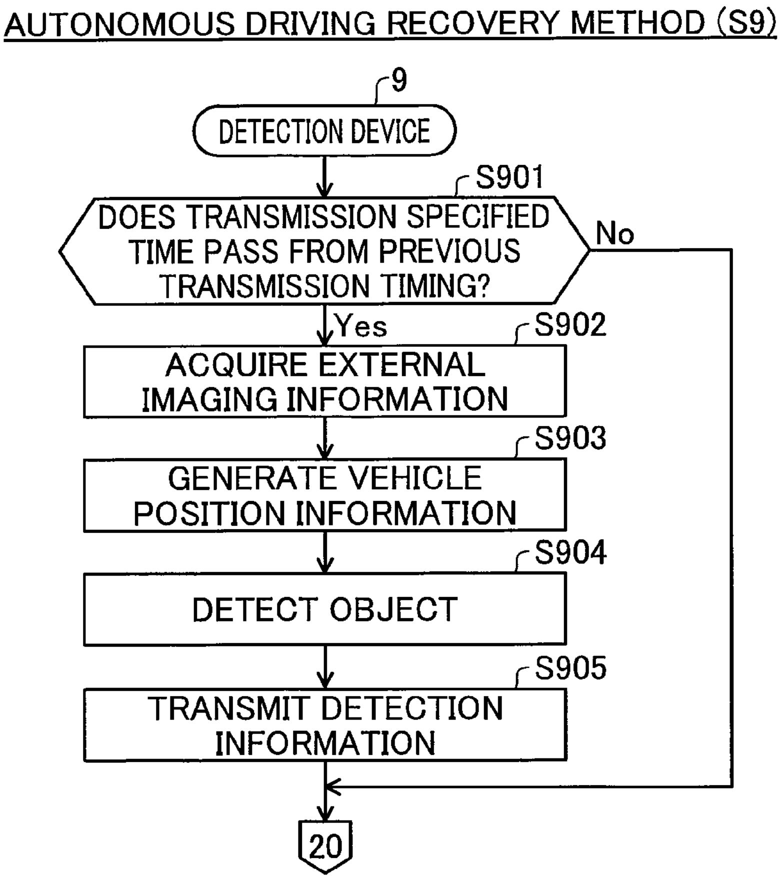
FIG. 29 is a first flowchart illustrating an autonomous driving recovery method.
Figure 30:
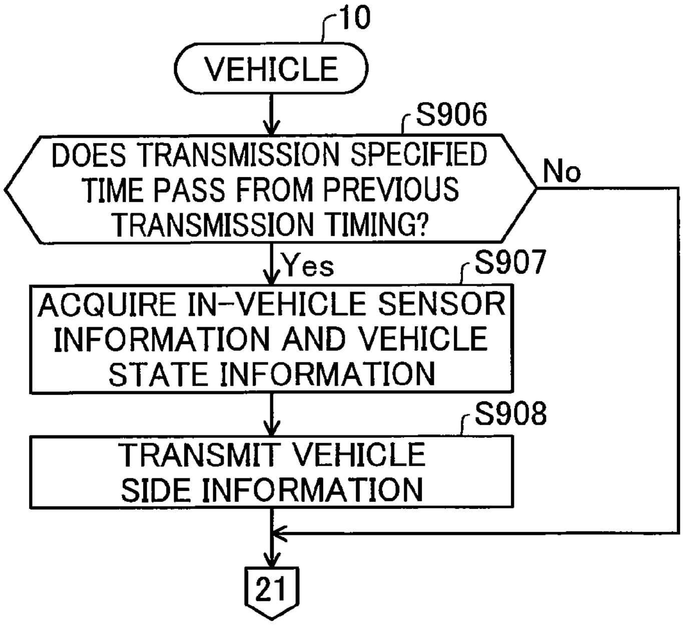
FIG. 30 is a second flowchart illustrating the autonomous driving recovery method.
Figure 31:
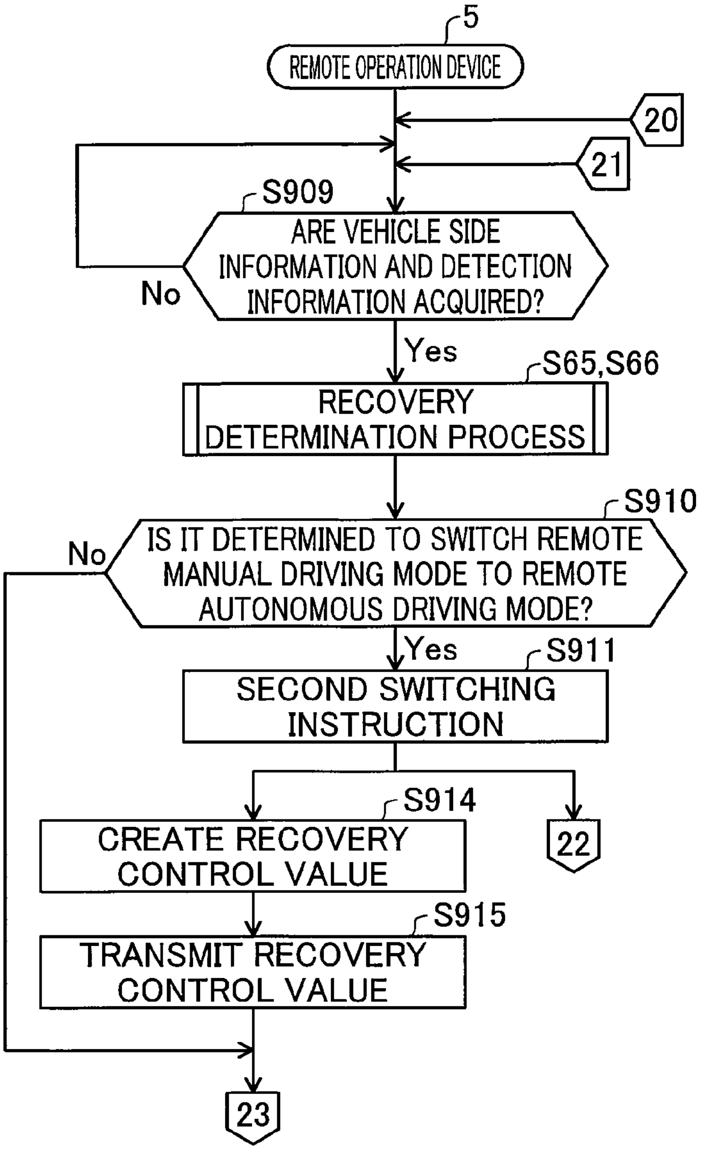
FIG. 31 is a third flowchart illustrating the autonomous driving recovery method.
Figure 32:
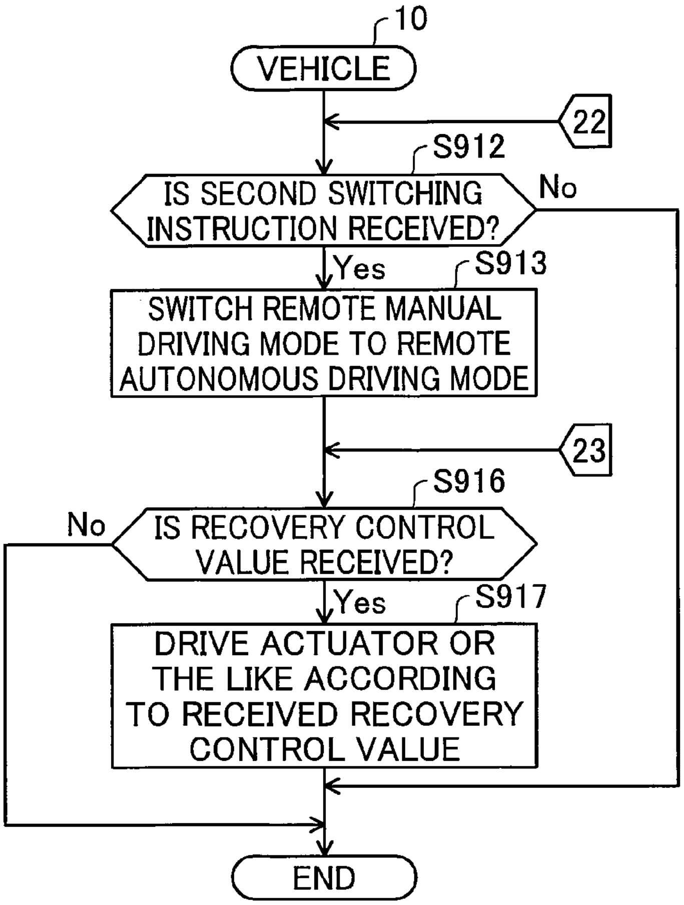
FIG. 32 is a fourth flowchart illustrating the autonomous driving recovery method.

FIG. 29 is a first flowchart illustrating an autonomous driving recovery method (step S9). FIG. 30 is a second flowchart illustrating the autonomous driving recovery method (step S9). FIG. 31 is a third flowchart illustrating the autonomous driving recovery method (step S9). FIG. 32 is a fourth flowchart illustrating the autonomous driving recovery method (step S9). The autonomous driving recovery method (step S9) is a method for switching the driving mode of the vehicle 10 from the remote manual driving mode to the remote autonomous driving mode.

As illustrated in FIG. 29, when running in the remote manual driving mode starts, and then a predetermined transmission specified time passes from a timing at which the detection information has been previously transmitted (step S901: Yes). In this case, the camera information acquisition unit 922 acquires the external imaging information (step S902). After step S902, the vehicle position information generation unit 923 generates vehicle position information using the external imaging information acquired by the camera information acquisition unit 922 (step S903). After step S903, the object information generation unit 924 detects an object existing in the surrounding area of the vehicle 10 using the external imaging information acquired by the camera information acquisition unit 922 (step S904). Furthermore, the object information generation unit 924 generates object basic information when determining that that the object exists in the surrounding area. Furthermore, the object information generation unit 924 generates intrusion position information when the detected object is a moving object. Consequently, the object information generation unit 924 generates object information according to whether or not there is an object in the surrounding area. After step S904, the detection information transmission unit 925 transmits the detection information to the remote operation device 5 (step S905).

As illustrated in FIG. 30, when running in the remote manual driving mode starts, and then a predetermined transmission specified time passes from a timing at which the detection information has been previously transmitted (step S906: Yes), the running information acquisition unit 521 executes following processing. In this case, the running information acquisition unit 521 acquires the in-vehicle sensor information and the vehicle state information (step S907). After step S907, the vehicle information transmission unit 226 transmits the vehicle side information including the in-vehicle sensor information and the vehicle state information to the remote operation device 5 (step S908). Note that any ones of each step from step S901 to step S905 illustrated in FIG. 29 and each step from step S906 to step S908 illustrated in FIG. 30 may be executed first, or these steps may be simultaneously executed in parallel.

As illustrated in FIG. 31, when the switching determination unit 524 of the remote operation device 5 receives and acquires the vehicle side information and the detection information (step S909: Yes), a recovery determination process is executed. In the recovery determination process, the switching determination unit 524 determines, for example, whether or not to switch the driving mode of the vehicle 10 from the remote manual driving mode to the remote autonomous driving mode according to one of the recovery determination methods illustrated in FIGS. 33 and 34 to be described later.

Figure 33:
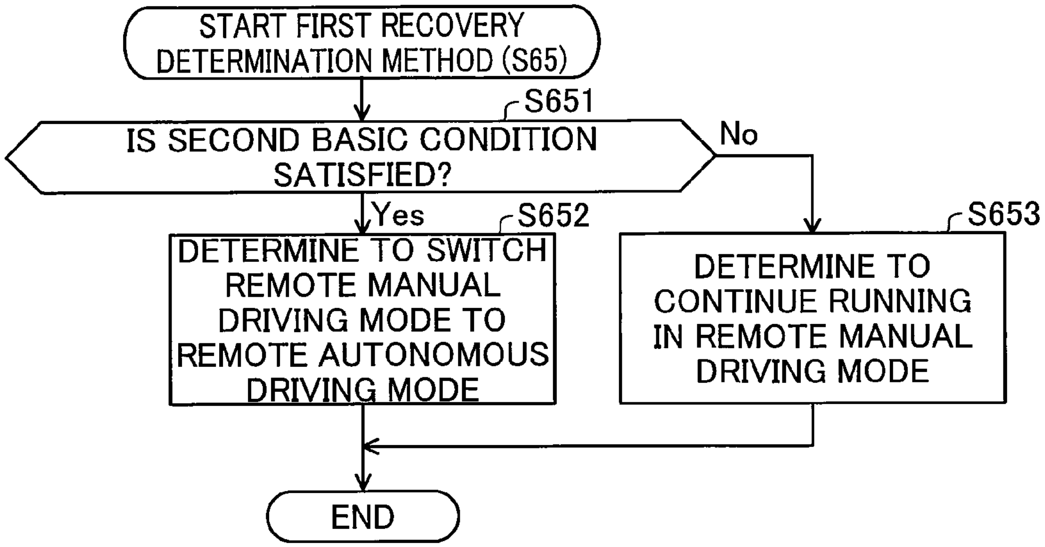
FIG. 33 is a flowchart illustrating a first recovery determination method.

FIG. 33 is a flowchart illustrating a first recovery determination method (step S65) in the recovery determination process. The first recovery determination method (step S65) is a first method for determining whether or not to switch the driving mode of the vehicle 10 from the remote manual driving mode to the remote autonomous driving mode.

According to the first recovery determination method (step S65), the switching determination unit 524 first determines whether or not the second basic condition is satisfied (step S651). In other words, the switching determination unit 524 determines in step S651 whether or not the state of the vehicle does not correspond to any one of the first state, the second state, and the third state.

When the second basic condition is satisfied, that is, the state of the vehicle does not correspond to any one of the first state, the second state, and the third state (step S651: Yes), the switching determination unit 524 executes step S652. In this case, the switching determination unit 524 determines to switch the driving mode of the vehicle 10 from the remote manual driving mode to the remote autonomous driving mode (step S652). According to the first recovery determination method (step S65), when the second basic condition is satisfied, the switching determination unit 524 determines to switch the driving mode of the vehicle 10 from the remote manual driving mode to the remote autonomous driving mode. By so doing, it is possible to move the vehicle 10 in the remote autonomous driving mode again when the state of the vehicle 10 returns to a state where the vehicle 10 can run in the remote autonomous driving mode.

By contrast with this, when the second basic condition is not satisfied, that is, when the state of the vehicle is at least one of the first state, the second state, and the third state (step S651: No), the switching determination unit 524 executes step S653. In this case, the switching determination unit 524 determines to continue running in the remote manual driving mode (step S653). According to the first recovery determination method (step S65), when the second basic condition is not satisfied, the switching determination unit 524 determines to switch the driving mode of the vehicle 10 from the remote manual driving mode to the remote autonomous driving mode. By so doing, it is possible to continue running in the remote manual driving mode until a factor state among the first state, the second state, and the third state is resolved. Consequently, it is possible to cause the vehicle 10 to continue running by the remote operation of the operator via the operator input device 57 while securing safety.

Figure 34:
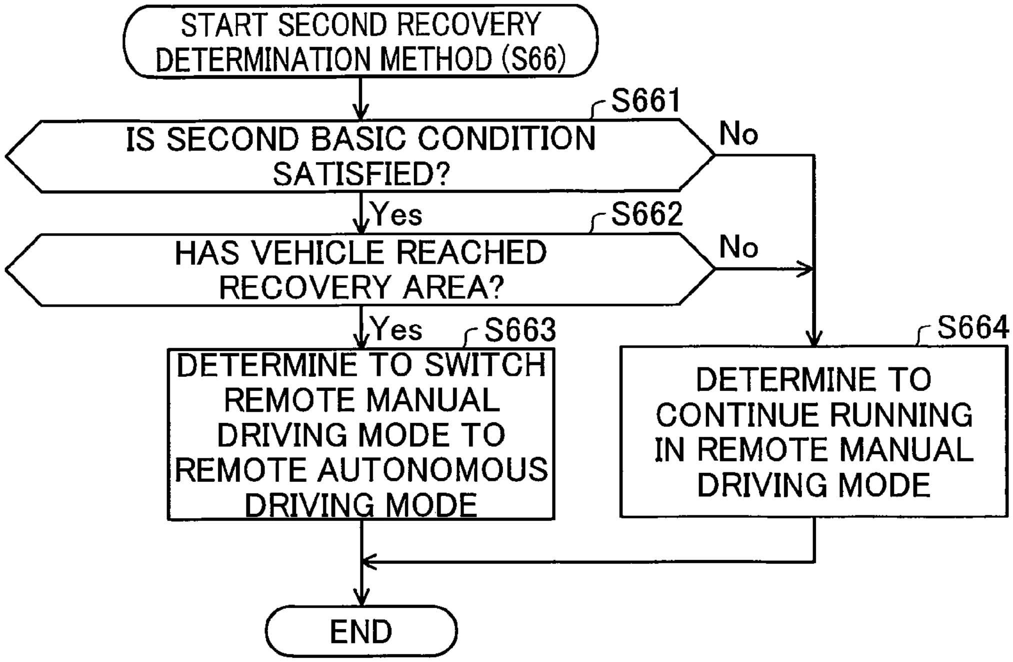
FIG. 34 is a flowchart illustrating a second recovery determination method.

FIG. 34 is a flowchart illustrating a second recovery determination method (step S66) in the recovery determination process. The second recovery determination method (step S66) is a second method for determining whether or not to switch the driving mode of the vehicle 10 from the remote manual driving mode to the remote autonomous driving mode. According to the second recovery determination method (step S66), the second switching condition may include the second additional condition in addition to the second basic condition. The second additional condition according to the second recovery determination method (step S66) is a condition related to a position of the vehicle 10.

According to the second recovery determination method (step S66), the switching determination unit 524 first determines whether or not the second basic condition is satisfied (step S661). Furthermore, when the second basic condition is satisfied (step S661: Yes), the switching determination unit 524 determines whether or not the vehicle 10 has reached a recovery area (step S662). At this time, the switching determination unit 524 determines whether or not the vehicle 10 has reached the recovery area using, for example, the external imaging information. Furthermore, the switching determination unit 524 may detect that the vehicle 10 has reached the recovery area by, for example, accepting operator's input via the input operation unit (not illustrated).

Figure 35:
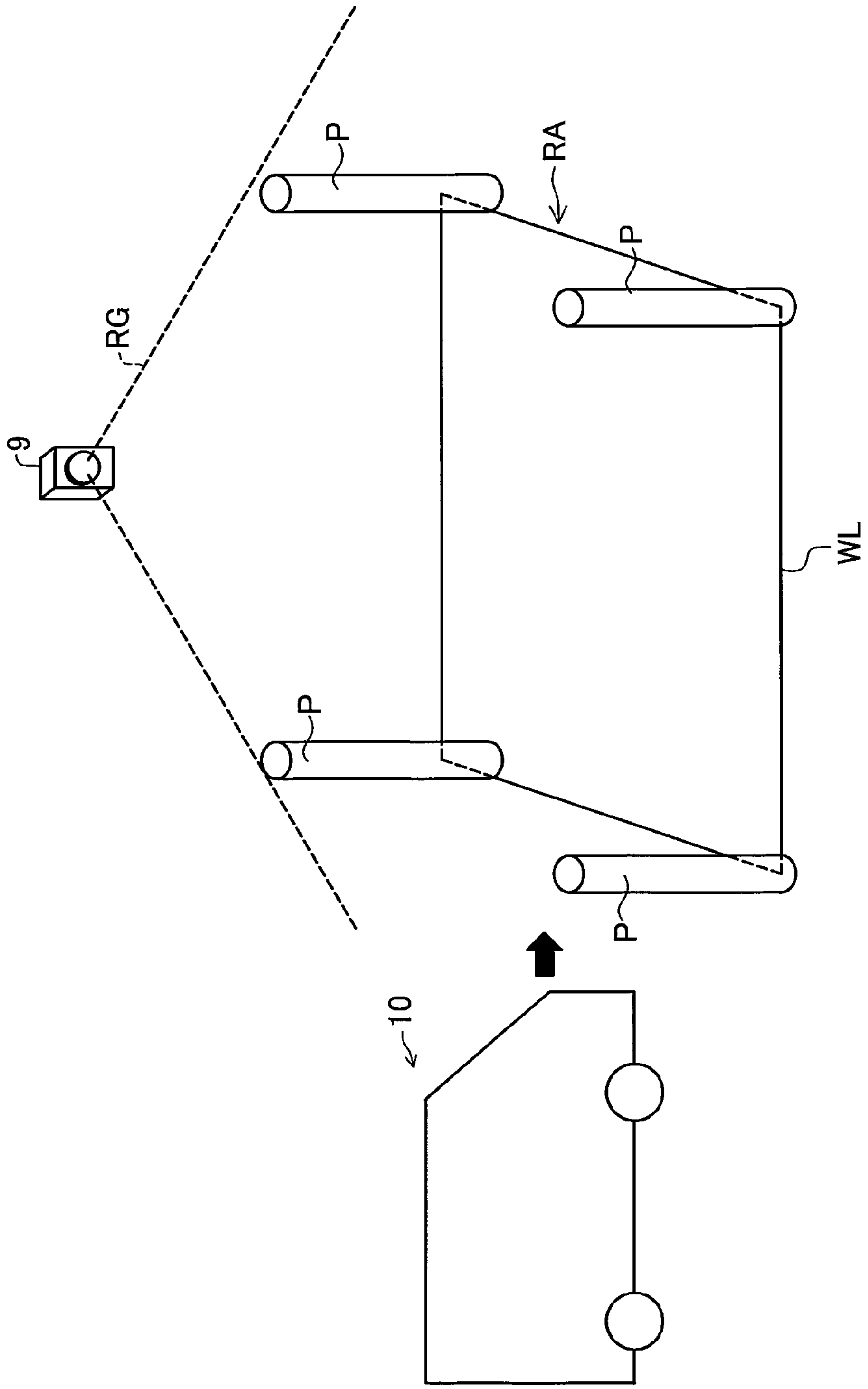
FIG. 35 is a conceptual diagram illustrating an example of a recovery area.

FIG. 35 is a conceptual diagram illustrating an example of a recovery area RA. The recovery area RA is an area that serves as a criteria to resume running in the remote autonomous driving mode. The recovery area RA is arranged, for example, at predetermined intervals at a place at which the detection devices 9 can easily detect the position, the traveling direction, and the like of the target vehicle 10. The places at which the detection devices 9 can easily detect the position, the traveling direction, and the like refer to, for example, places at which a moving object hardly intrudes, places that are hardly influenced by disturbance such as sun light, and places that are hardly influenced by a radio interference. That is, the recovery area RA is installed at a place at which more accurate vehicle position information can be acquired when running in the remote autonomous driving mode is resumed. Note that a support column (pole) P that is a mark may be disposed around the recovery area RA such that the operator who operates the operator input device 57 and the driver who operates the driver input device 24 readily recognizes the recovery area RA. Furthermore, a partition line WL such as a white line indicating the recovery area RA may be allocated to the conveyance passage R or the storage place Y. For example, the operator operates the operator input device 57, and moves the vehicle 10 to the recovery area RA that is the closest to the current position of the vehicle 10.

As illustrated in FIG. 34, when the vehicle 10 reaches the recovery area RA (step S662: Yes), the switching determination unit 524 executes following processing assuming that the second additional condition is satisfied. In this case, the switching determination unit 524 determines to switch the driving mode of the vehicle 10 from the remote manual driving mode to the remote autonomous driving mode (step S663). By so doing, it is possible to acquire more accurate vehicle position information when running in the remote autonomous driving mode is resumed.

By contrast with this, when the vehicle 10 does not reach the recovery area RA (step S662: No), the switching determination unit 524 determines to continue running in the remote manual driving mode assuming that the second additional condition is not satisfied (step S664). By so doing, it is possible to move the vehicle 10 in the remote manual driving mode from the current position to the recovery area RA at which the vehicle position information can be more accurately acquired.

As illustrated in FIG. 31, when the switching determination unit 524 determines to switch the driving mode of the vehicle 10 from the remote manual driving mode to the remote autonomous driving mode in the recovery determination process (step S910: Yes), the switching instruction unit 525 executes following processing. In this case, the switching instruction unit 525 transmits to the vehicle 10 the second switching instruction for switching the driving mode of the vehicle 10 from the remote manual driving mode to the remote autonomous driving mode (step S911). Note that, when the switching determination unit 524 determines to continue running in the remote manual driving mode in the recovery determination process (step S910: No), the autonomous driving recovery method (step S9) is finished.

As illustrated in FIG. 32, when the switching execution unit 227 of the vehicle 10 receives the second switching instruction (step S912: Yes), the switching execution unit 227 switches the driving mode of the vehicle 10 from the remote manual driving mode to the remote autonomous driving mode (step S913).

As illustrated in FIG. 31, after step S911, the control value creation unit 526 of the remote operation device 5 creates a driving control value (hereinafter, recovery control value) for resuming in the remote autonomous driving mode (step S914). Furthermore, the remote communication unit 51 transmits the recovery control value created by the control value creation unit 526 to the vehicle 10 (step S915). Note that any ones of step S912 and step S913 illustrated in FIG. 32, and step S914 and step S915 illustrated in FIG. 31 may be executed first, or these steps may be simultaneously executed in parallel.

As illustrated in FIG. 32, when the operation control unit 228 of the vehicle 10 receives the recovery control value (step S916: Yes), the operation control unit 228 drives the steering device 25 and the actuator 29 mounted on the vehicle 10 according to the received recovery control value (step S917).

A-4. Display Control Method

Figure 36:
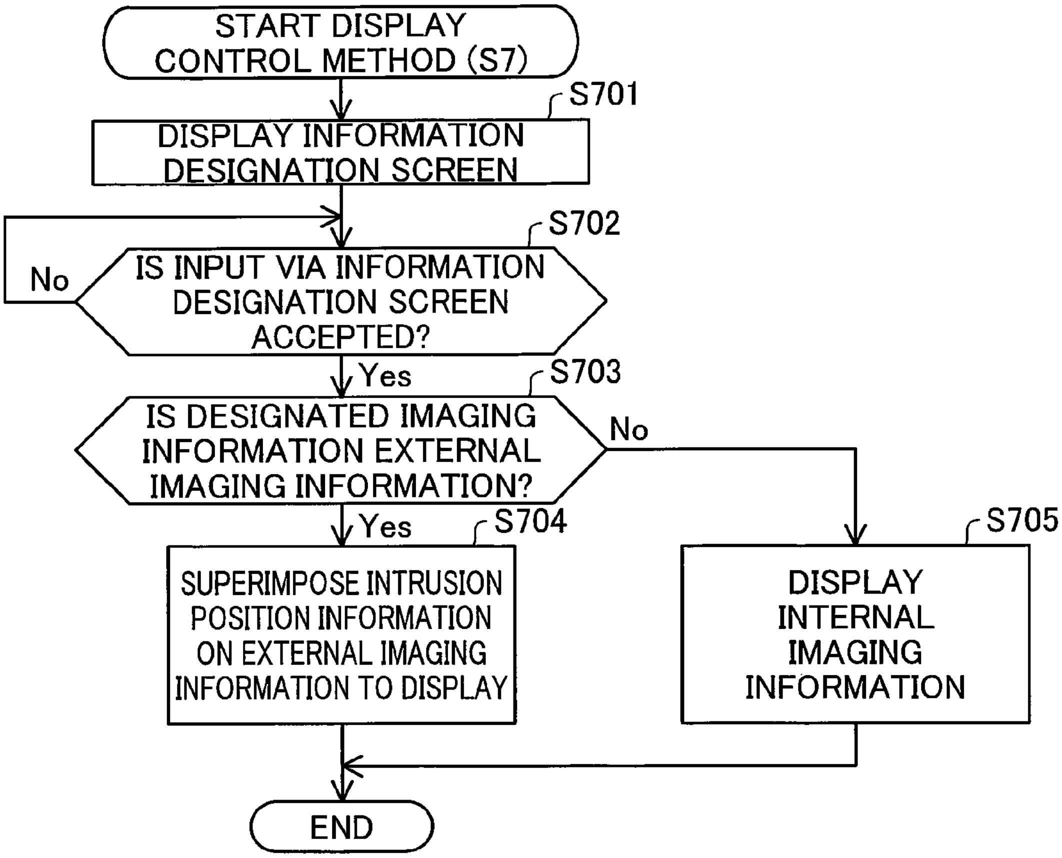
FIG. 36 is a flowchart illustrating a display control method.

FIG. 36 is a flowchart illustrating a display control method (step S7). The display control method (step S7) is a control method in a case where various pieces of information are provided via the display unit 550 to the operator who operates the operator input device 57. The display control method (step S7) is executed in a case where, for example, "Yes" is determined in step S310 in FIG. 13, step S410 in FIG. 22, and step S511 in FIG. 27.

First, the display control unit 528 causes the display unit 550 to display the information designation screen for designating the internal imaging information acquired by the in-vehicle camera 261 or the external imaging information acquired by the detection device 9 to display on the display unit 550 (step S701). When accepting an input from the operator who operates the operator input device 57 via the information designation screen (step S702: Yes), the display control unit 528 executes following processing. When the information designated via the information designation screen is the external imaging information (step S703: Yes), the display control unit 528 causes the display unit 550 to display information obtained by superimposing the intrusion position information on the imaging information (step S704). On the other hand, when the information designated via the information designation screen is the internal imaging information (step S703: No), the display control unit 528 causes the display unit 550 to display the internal imaging information (step S705). Note that the display control unit 528 may cause the display unit 550 to display the information included in the in-vehicle sensor information and the detection information in addition to the above display contents. Furthermore, when the information designated via the information designation screen is the internal imaging information (step S703: No), the display control unit 528 may superimpose information acquired by the radar 262 and the LiDAR 263 mounted on the vehicle 10 on the internal imaging information to display on the display unit 550. Furthermore, the display control unit 528 may cause the display unit 550 to display information obtained by superimposing the intrusion forbidden area on at least one of the external imaging information and the internal imaging information.

A-5. Broadcasting Control Method

Figure 37:
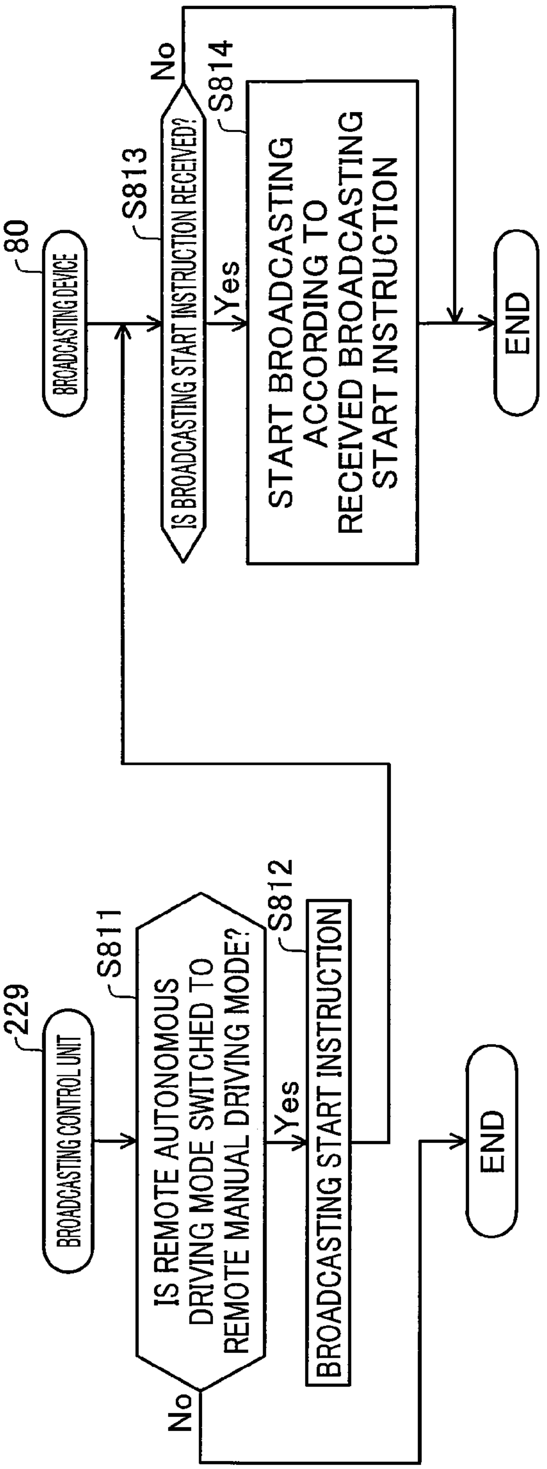
FIG. 37 is a flowchart illustrating a broadcasting start method.

FIG. 37 is a flowchart illustrating the broadcasting start method (step S81). The broadcasting start method (step S81) is a method for broadcasting that the vehicle 10 is running in the remote manual driving mode when the switching execution unit 227 switches the driving mode of the vehicle 10 from the remote autonomous driving mode to the remote manual driving mode. Hence, the broadcasting start method (step S81) is executed after, for example, step S318 in FIG. 14, step S418 in FIG. 23, and step S519 in FIG. 28.

When the driving mode of the vehicle 10 is switched from the remote autonomous driving mode to the remote manual driving mode (step S811: Yes), the broadcasting control unit 229 executes following processing. In this case, the broadcasting control unit 229 may transmit a broadcasting start instruction to a broadcasting device 80 (step S812). Furthermore, when receiving the broadcasting start instruction (step S813: Yes), the broadcasting device 80 starts broadcasting according to the received broadcasting start instruction (step S814). Thus, the broadcasting device 80 broadcasts to workers outside the vehicle 10 that the vehicle 10 is running in the remote manual driving mode.

In this case, when the broadcasting device 80 (hereinafter, in-vehicle broadcasting device) mounted on the vehicle 10 performs broadcasting, the broadcasting control unit 229 transmits the broadcasting start instruction to the vehicle 10 in step S812. Furthermore, the vehicle control device 20 receives the broadcasting start instruction, and drives the in-vehicle broadcasting device. The in-vehicle broadcasting device is a pair of lamps provided at, for example, left and right ends along a vehicle width direction at the front and the rear of the vehicle 10. In this case, the vehicle control device 20 broadcasts to the outside that the vehicle 10 is running in the remote manual driving mode by, for example, turning on or off or flashing the lamps that are the in-vehicle broadcasting device. Note that a broadcasting mode of the in-vehicle broadcasting device is not limited to this. The in-vehicle broadcasting device may be, for example, a warning device (not illustrated) that is connected to a car horn (not illustrated) mounted on the vehicle 10, and includes an in-vehicle speaker that emits a sound to the outside of the vehicle 10. In this case, the vehicle control device 20 broadcasts to the outside that the vehicle 10 is running in the remote manual driving mode by, for example, playing back a broadcasting sound from the in-vehicle speaker of the warning device that is the in-vehicle broadcasting device.

Furthermore, when the broadcasting device 80 (hereinafter, extra-vehicle broadcasting device) provided at a different place from that of the vehicle 10 performs broadcasting, the broadcasting control unit 229 transmits the broadcasting start instruction to the extra-vehicle broadcasting device in step S812. The extra-broadcasting device is, for example, an outdoor monitor that is installed at the conveyance passage R or the storage place Y, and includes a display. In this case, the outdoor monitor that is the extra-vehicle broadcasting device broadcasts to the outside that the vehicle is running in the remote manual driving mode by displaying on the display the vehicle identification information and a broadcasting indication indicating that the vehicle is running in the remote manual driving mode. Note that a broadcasting mode of the extra-vehicle broadcasting device is not limited to this. The extra-vehicle broadcasting device may be, for example, a projection device (not illustrated) that can project videos or the like on the vehicle 10. In this case, the projection device that is the extra-vehicle broadcasting device broadcasts that the vehicle 10 is running in the remote manual driving mode by, for example, projecting light of a predetermined tone on the outer surface (e.g., body) of the vehicle 10 that is running in the remote manual driving mode. Furthermore, the projection device that is the extra-vehicle broadcasting device broadcasts to the outside that the vehicle 10 is running in the remote manual driving mode by projecting a video of a human shape that imitates the operator on the inside (vehicle interior) of the vehicle 10. Note that the broadcasting control unit 229 may broadcast the intrusion forbidden area to the outside by additionally projecting a video indicating the intrusion forbidden area of the vehicle 10 that is running in the remote manual driving mode.

Figure 38:
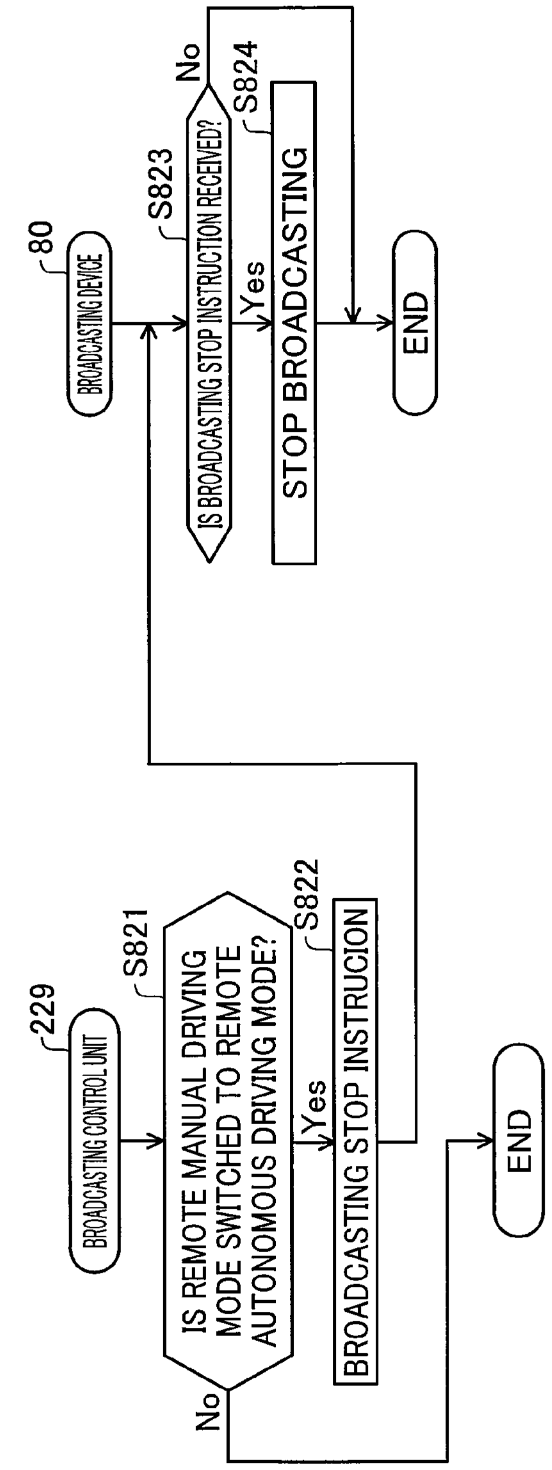
FIG. 38 is a flowchart illustrating a broadcasting stop method.

FIG. 38 is a flowchart illustrating a broadcasting stop method (step S82). The broadcasting stop method (step S82) is a method for stopping broadcasting when the switching execution unit 227 switches the driving mode of the vehicle 10 from the remote manual driving mode to the remote autonomous driving mode. Hence, the broadcasting stop method (step S82) is executed after, for example, step S917 in FIG. 32.

When the driving mode of the vehicle 10 is switched from the remote manual driving mode to the remote autonomous driving mode (step S821: Yes), the broadcasting control unit 229 transmits a broadcasting stop instruction to the broadcasting device 80 (step S822). Furthermore, when receiving the broadcasting stop instruction (step S823: Yes), the broadcasting device 80 stops broadcasting (step S824).

A-6. Intrusion Forbidden Area Setting Method

Figure 39:
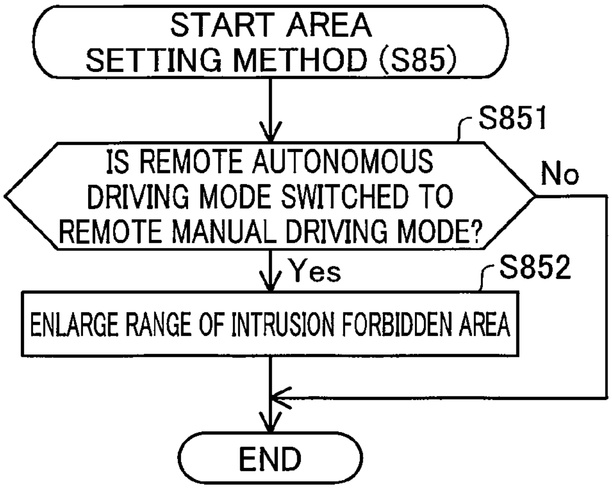
FIG. 39 is a flowchart illustrating an intrusion forbidden area setting method.

FIG. 39 is a flowchart illustrating the intrusion forbidden area setting method (step S85). When the driving mode of the vehicle 10 is switched from the remote autonomous driving mode to the remote manual driving mode (step S851: Yes), the area setting unit 529 executes following processing. In this case, the area setting unit 529 sets the intrusion forbidden area such that the range of the intrusion forbidden area in the remote manual driving mode is larger than the range of the intrusion forbidden area in the remote autonomous driving mode (step S852). That is, the area setting unit 529 enlarges the range of the intrusion forbidden area more at the time of running in the remote manual driving mode than at the time of running in the remote autonomous driving mode.

According to the above embodiment, when the vehicle 10 falls in at least one of the first state, the second state, and the third state during running in the remote autonomous driving mode, it is possible to switch the driving mode of the vehicle 10 from the remote autonomous driving mode to the remote manual driving mode. By so doing, even when the vehicle 10 falls in at least one of the first state, the second state, and the third state in the process of moving the vehicle 10 from the first place to the second place in the remote autonomous driving mode, and therefore the vehicle 10 stops, it is possible to move the vehicle 10 by the remote operation of the operator. Consequently, even when the distance between the stop position of the vehicle 10 and the standby position of the operator is long, the operator can move the vehicle 10 without getting on the stopped vehicle 10, so that it is possible to prevent conveyance of the vehicle 10 from delaying.

Furthermore, according to the above embodiment, when the factor state that is a factor of switching to the remote manual driving mode is resolved, and the state of the vehicle does not correspond to any one of the first state, the second state, and the third state, it is possible to switch the remote manual driving mode to the remote autonomous driving mode. That is, it is possible to move in the remote manual driving mode the vehicle 10 that can run in the remote autonomous driving mode. Consequently, it is possible to reduce the number of operators and a work load.

Furthermore, according to the above embodiment, when the driving mode of the vehicle 10 is switched from the remote autonomous driving mode to the remote manual driving mode, the vehicle control device 20 that is the control device 2 can transmit the in-vehicle sensor information to the remote operation device 5. Furthermore, when the driving mode of the vehicle 10 is switched from the remote autonomous driving mode to the remote manual driving mode, the detection device 9 can transmit the detection information to the remote operation device 5. By so doing, when the driving mode of the vehicle 10 is switched from the remote autonomous driving mode to the remote manual driving mode, the remote operation device 5 can acquire the in-vehicle sensor information and the detection information including the vehicle position information and the surroundings information. Consequently, the remote operation device 5 can determine whether or not to switch the driving mode of the vehicle 10, and create the driving control value.

Furthermore, according to the above embodiment, the vehicle 10 includes the in-vehicle camera 261, the radar 262, and the LiDAR 263 as the first in-vehicle sensors 260 that can detect the state of the surrounding area of the vehicle 10. Consequently, it is possible to acquire and transmit the internal imaging information, the radar information, and the LiDAR information to the remote operation device 5 or the like.

Furthermore, according to the above embodiment, it is possible to cause the display unit 550 to display at least one of the in-vehicle sensor information and the detection information. Consequently, it is possible to convey information necessary for the operation to the operator who operates the operator input device 57.

Furthermore, according to the above embodiment, it is possible to cause the display unit 550 to display the information designation screen for allowing the operator to designate the in-vehicle sensor information or the detection information to display on the display unit 550. Consequently, the operator can easily designate the information to display on the display unit 550.

Furthermore, according to the above embodiment, it is possible to cause the display unit 550 to display the information designation screen for allowing the operator to designate the internal imaging information or the external imaging information to display on the display unit 550. Consequently, the operator can designate the information in more detail to display on the display unit 550.

Furthermore, according to the above embodiment, it is possible to cause the display unit 550 to display the information obtained by superimposing the intrusion position information on the external imaging information. Consequently, the operator can easily grasp the presence and the position of the moving object that has intruded the surrounding area of the vehicle 10 during the operation of the operator input device 57. That is, the operator can reduce a probability that, for example, the operator misses the moving object that has intruded the surrounding area of the vehicle 10. Consequently, it is possible to more safely move the vehicle 10 in the remote manual driving mode.

Furthermore, according to the above embodiment, when the driving mode of the vehicle 10 is switched from the remote autonomous driving mode to the remote manual driving mode, it is possible to broadcast to the outside that the vehicle 10 is running in the remote manual driving mode. Consequently, it is possible to easily distinguish from the outside the vehicle 10 that is running in the remote autonomous driving mode and the vehicle 10 that is running in remote manual driving mode.

Furthermore, according to the above embodiment, when the remote autonomous driving mode is switched to the remote manual driving mode, it is possible to set the intrusion forbidden area such that the range of the intrusion forbidden area in the remote manual driving mode is larger than the range of the intrusion forbidden area in the remote autonomous driving mode. By so doing, by broadcasting the intrusion forbidden area of the vehicle 10 to the outside, it is possible to reduce the probability that a worker or the like unexpectedly intrudes the intrusion forbidden area. Furthermore, by causing the display unit 550 to display the information obtained by superimposing the intrusion forbidden area on the imaging information, the operator can quickly execute an operation of, for example, decelerating or stopping the vehicle 10 when, for example, the moving object intrudes the intrusion forbidden area. Consequently, it is possible to much more safely move the vehicle 10 in the remote manual driving mode.

Furthermore, according to the above embodiment, it is possible to acquire the vehicle position information using the external imaging information acquired by the detection device 9. By so doing, it is possible to implement automatic running of the vehicle 10 by the remote operation without using the first in-vehicle sensors 260 such as the in-vehicle camera 261, the radar 262, and the LiDAR 263. Note that, to prevent, for example, collision of the vehicles 10 during the remote operation, at least part of the first in-vehicle sensors 260 may be secondarily used to acquire the vehicle position information of the vehicle 10 that is running in the remote autonomous driving mode.

Aa. Second Embodiment

Figure 40:
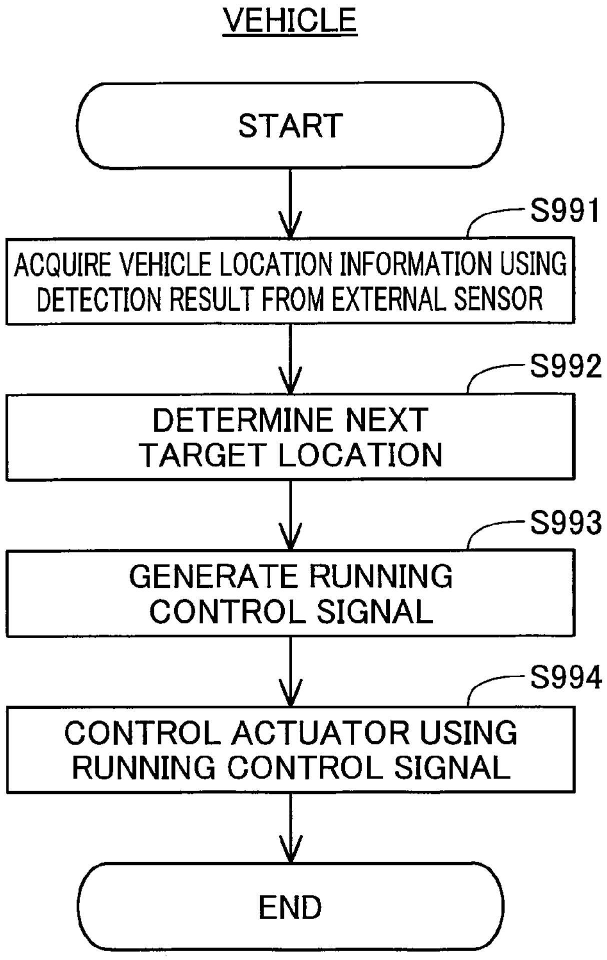
FIG. 40 is a flowchart illustrating a processing procedure of running control of the vehicle according to a second embodiment.

FIG. 40 is a flowchart showing a processing procedure for running control of the vehicle 10 in the first embodiment. Since the configuration of the vehicle in the present embodiment is the same as in the first embodiment, the vehicle in the present embodiment is denoted as vehicle 10 for convenience. In step S991, the vehicle 10 acquires vehicle location information using detection result output from the camera as an external sensor. In step S992, the vehicle 10 determines a target location to which the vehicle 10 is to move next. In step S993, the vehicle 10 generates a running control signal for causing the vehicle 10 to run to the determined target location. In step S994, the vehicle 10 controls an actuator using the generated running control signal, thereby causing the vehicle 10 to run by following a parameter indicated by the running control signal. The vehicle 10 repeats the acquisition of vehicle location information, the determination of a target location, the generation of a running control signal, and the control over the actuator in a predetermined cycle. According to the running control in the present embodiment, it is possible to cause the vehicle 10 to run by autonomous control without controlling the vehicle 10 remotely using the server 5.

B. Other Embodiment

B-1. Other Embodiment 1

In the above embodiment, the position of the vehicle 10 is specified by analyzing the external imaging information imaged and acquired by the imaging unit 95 of the infrastructure camera 90 that is the detection device 9. By contrast with this, in the other embodiment, the position of the vehicle 10 may be specified using information acquired by a position information reception unit (not illustrated) mounted on the vehicle 10. In this case, the position information reception unit is a GNSS receiver than can receive radio waves emitted from GNSS satellites.

B-2. Other Embodiment 2

In the above embodiment, the remote manual control device 50A and the remote automatic control device 50B are integrally configured as the remote operation device 5. By contrast with this, in the other embodiment, the remote manual control device 50A and the remote automatic control device 50B may be separately configured.

B-3. Other Embodiment 3

In the above embodiment, the driving control value created by the remote operation device 5 is transmitted from the remote operation device 5 to the vehicle 10. By contrast with this, in the other embodiment, the driving control value created by the remote operation device 5 may be transmitted to the detection device 9, and then transmitted from the detection device 9 to the vehicle 10. By so doing, the vehicle 10 can receive the driving control value from the detection device 9 that is at a closer distance to the vehicle 10. Consequently, it is possible to minimize an influence of a communication failure. Consequently, it is possible to reduce the probability that the vehicle 10 that is running in the remote unmanned driving mode stops due to the communication failure.

B-4. Other Embodiment 4

In the other embodiment, the remote operation system 1 may include a plurality of the remote manual control devices 50A and a plurality of the remote automatic control devices 50B. By so doing, even when a failure or the like occurs in the remote communication unit 51 of one of the remote manual control device 50A and the remote automatic control device 50B in the remote operation system 1, it is possible to acquire the running information or the like or transmit the driving control value or the like using the remote communication unit 51 of the other one of the remote manual control device 50A and the remote automatic control device 50B. Consequently, it is possible to reduce the probability that the vehicle 10 that is running in the remote unmanned driving mode stops due to the communication failure.

B-5. Other Embodiment 5

In the above embodiment, the control device 2 is the vehicle control device 20. By contrast with this, in the other embodiment, the function of the control device 2 may be implemented as the function of the detection device 9. In this case, the camera CPU 92 includes the detection information transmission unit 925, the switching execution unit 227, and the broadcasting control unit 229.

C. Other Embodiment (C1) In each of the above-described embodiments, the external sensor is not limited to the camera but may be the distance measuring device, for example. The distance measuring device is a light detection and ranging (LiDAR) device, for example. In this case, detection result output from the external sensor may be three-dimensional point cloud data representing the vehicle 10. The server 5 and the vehicle 10 may acquire the vehicle location information through template matching using the three-dimensional point cloud data as the detection result and reference point cloud data, for example.

(C2) In the above-described first embodiment, the server 5 performs the processing from acquisition of vehicle location information to generation of a running control signal. By contrast, the vehicle 10 may perform at least part of the processing from acquisition of vehicle location information to generation of a running control signal. For example, embodiments (1) to (3) described below are applicable, for example.

(1) The server 5 may acquire vehicle location information, determine a target location to which the vehicle 10 is to move next, and generate a route from a current location of the vehicle 10 indicated by the acquired vehicle location information to the target location. The server 5 may generate a route to the target location between the current location and a destination or generate a route to the destination. The server 5 may transmit the generated route to the vehicle 10. The vehicle 10 may generate a running control signal in such a manner as to cause the vehicle 10 to run along the route received from the server 5 and control an actuator using the generated running control signal.

(2) The server 5 may acquire vehicle location information and transmit the acquired vehicle location information to the vehicle 10. The vehicle 10 may determine a target location to which the vehicle 10 is to move next, generate a route from a current location of the vehicle 10 indicated by the received vehicle location information to the target location, generate a running control signal in such a manner as to cause the vehicle 10 to run along the generated route, and control an actuator using the generated running control signal.

(3) In the foregoing embodiments (1) and (2), an internal sensor may be mounted on the vehicle 10, and detection result output from the internal sensor may be used in at least one of the generation of the route and the generation of the running control signal. The internal sensor is a sensor mounted on the vehicle 10. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the server 5 may acquire detection result from the internal sensor, and in generating the route, may reflect the detection result from the internal sensor in the route. In the foregoing embodiment (1), the vehicle 10 may acquire detection result from the internal sensor, and in generating the running control signal, may reflect the detection result from the internal sensor in the running control signal. In the foregoing embodiment (2), the vehicle 10 may acquire detection result from the internal sensor, and in generating the route, may reflect the detection result from the internal sensor in the route. In the foregoing embodiment (2), the vehicle 10 may acquire detection result from the internal sensor, and in generating the running control signal, may reflect the detection result from the internal sensor in the running control signal.

(C3) In the above-described embodiment in which the vehicle 10 can be running by autonomous control, the vehicle 10 may be equipped with an internal sensor, and detection result output from the internal sensor may be used in at least one of generation of a route and generation of a running control signal. For example, the vehicle 10 may acquire detection result from the internal sensor, and in generating the route, may reflect the detection result from the internal sensor in the route. The vehicle 10 may acquire detection result from the internal sensor, and in generating the running control signal, may reflect the detection result from the internal sensor in the running control signal.

(C4) In the above-described embodiment in which the vehicle 10 can be running by autonomous control, the vehicle 10 acquires vehicle location information using detection result from the external sensor. By contrast, the vehicle 10 may be equipped with an internal sensor, the vehicle 10 may acquire vehicle location information using detection result from the internal sensor, determine a target location to which the vehicle 10 is to move next, generate a route from a current location of the vehicle 10 indicated by the acquired vehicle location information to the target location, generate a running control signal for running along the generated route, and control an actuator of the vehicle 10 using the generated running control signal. In this case, the vehicle 10 is capable of running without using any detection result from an external sensor. The vehicle 10 may acquire target arrival time or traffic congestion information from outside the vehicle 10 and reflect the target arrival time or traffic congestion information in at least one of the route and the running control signal. The functional configuration of the remote operation system 1 may be entirely provided at the vehicle 10. Specifically, the processes realized by the remote operation system 1 in the present disclosure may be realized by the vehicle 10 alone.

(C5) In the above-described first embodiment, the server 5 automatically generates a running control signal to be transmitted to the vehicle 10. By contrast, the server 5 may generate a running control signal to be transmitted to the vehicle 10 in response to operation by an external operator existing outside the vehicle 10. For example, the external operator may operate an operating device including a display on which a captured image output from the external sensor is displayed, steering, an accelerator pedal, and a brake pedal for operating the vehicle 10 remotely, and a communication device for making communication with the server 5 through wire communication or wireless communication, for example, and the server 5 may generate a running control signal responsive to the operation on the operating device.

(C6) In each of the above-described embodiments, the vehicle 10 is simply required to have a configuration to become movable by unmanned driving. The vehicle 10 may embodied as a platform having the following configuration, for example. The vehicle 10 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 10. In order for the vehicle 10 to acquire information from outside for unmanned driving, the vehicle 10 is simply required to include the communication device further. Specifically, the vehicle 10 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 10 before the vehicle 10 is shipped from a factory, or a remaining component such as a bodyshell may be mounted on the vehicle 10 after the vehicle 10 is shipped from a factory while the remaining component such as a bodyshell is not mounted on the vehicle 10. Each of components may be mounted on the vehicle 10 from any direction such as from above, from below, from the front, from the back, from the right, or from the left. Alternatively, these components may be mounted from the same direction or from respective different directions. The location determination for the platform may be performed in the same way as for the vehicle 10 in the first embodiments.

(C7) The vehicle 10 may be manufactured by combining a plurality of modules. The module means a unit composed of one or more components grouped according to a configuration or function of the vehicle 10. For example, a platform of the vehicle 10 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 10 different from the platform may be modularized. Various modules may include an arbitrary exterior component such as a bumper or a grill, or an arbitrary interior component such as a seat or a console. Not only the vehicle 10 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(C8) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The present disclosure is not limited to the above-described embodiments, and can be implemented by various configurations without departing from the gist of the present disclosure. For example, technical features in the embodiments corresponding to technical features in the aspects described in the summary can be replaced or combined as appropriate to solve part or all of the above-described problems or achieve part or all of the above-described effects. Furthermore, the technical features that are not described as indispensable in this description can be deleted as appropriate.

What is claimed is:

1. A remote operation device that remotely controls an operation of a moving object, comprising:
- a remote manual control device; and
- an operator input device that is connected to the remote manual control device, wherein
- the moving object has
- a manned driving mode that a driver having got on the moving object operates a driver input device provided to the moving object, and thereby determines a running condition that defines a running operation of the moving object to run, and a remote unmanned driving mode that the moving object receives the running condition of the moving object from an outside of the moving object, and thereby runs without the driver's getting on the moving object, the remote unmanned driving mode includes a remote manual driving mode that the moving object receives the running condition generated by an operator by operating an operator input device provided at a place different from a place of the moving object, and thereby runs without the driver's getting on the moving object, and a remote autonomous driving mode that the moving object receives the running condition generated by a remote automatic control device provided at a place different from the place of the moving object, and thereby runs without an operation of any one of the driver input device and the operator input device, the remote manual control device includes a switching information acquisition unit that acquires at least one of (2a) abnormality information indicating that a state of the moving object has become an abnormal state, (2b) intrusion information indicating that a moving object has intruded a surrounding area set in advance to surroundings of the moving object, and (2c) failure information indicating that a failure has occurred during running in the remote autonomous driving mode, and a switching instruction unit that, when a predetermined first switching condition is satisfied, transmits to the moving object a first switching instruction for switching a driving mode of the moving object from the remote autonomous driving mode to the remote manual driving mode, and the first switching condition includes as a condition a case where, during the running in the remote autonomous driving mode, the moving object falls in at least one state of (1a) a first state where the state of the moving object has become the abnormal state, (1b) a second state where the moving object has intruded the surrounding area, (1c) a third state that is different from the first state and in which the failure has occurred during the running in the remote autonomous driving mode, wherein the first switching condition further includes as a condition a case where a distance between a current position of the moving object and a standby position of the operator who can get on the moving object and operate the driver input device has become a predetermined distance or more.

2. The remote operation device according to claim 1, wherein the remote manual control device further includes an information acquisition unit that, when the driving mode is switched from the remote autonomous driving mode to the remote manual driving mode, acquires at least one of first sensor information acquired by a first sensor mounted on the moving object and detection information acquired by a detection device provided at a place different from the place of the moving object, the first sensor information includes at least one of moving object position information indicating a position of the moving object, and surroundings information indicating a state of the surrounding area, and the detection information includes information that is acquired from the outside of the moving object, and is at least one of the moving object position information indicating the position of the moving object, and the surroundings information indicating the state of the surrounding area.

3. The remote operation device according to claim 2, wherein the first sensor is a sensor that can detect at least the state of the surrounding area.

4. The remote operation device according to claim 3, wherein the first sensor is at least one of a camera, a LiDAR, and a radar.

5. The remote operation device according to claim 2, further comprising a display device that includes a display unit that conveys at least one of the first sensor information and the detection information to the operator, wherein the remote manual control device further includes a display control unit that controls display contents to display on the display unit.

6. The remote operation device according to claim 5, wherein the display control unit causes the display unit to display an information designation screen for allowing the operator to designate the first sensor information or the detection information to display on the display unit.

7. The remote operation device according to claim 5, wherein at least one of the first sensor and the detection device is a camera, the detection information may include imaging information imaged by the camera, and intrusion position information indicating a position of the moving object that has intruded the surrounding area, and the display control unit causes the display unit to display information obtained by superimposing the intrusion position information on the imaging information.

8. The remote operation device according to claim 1, wherein the remote manual control device further includes an area setting unit that, when the driving mode is switched from the remote autonomous driving mode to the remote manual driving mode, sets an intrusion forbidden area such that a range of the intrusion forbidden area that is set to the surroundings of the moving object and forbids the intrusion of the moving object is larger than a range of the intrusion forbidden area in the remote autonomous driving mode.

9. A remote operation device that remotely controls an operation of a moving object, comprising:

a remote manual control device; and an operator input device that is connected to the remote manual control device, wherein the moving object has a manned driving mode that a driver having got on the moving object operates a driver input device provided to the moving object, and thereby determines a running condition that defines a running operation of the moving object to run, and a remote unmanned driving mode that the moving object receives the running condition of the moving object from an outside of the moving object, and thereby runs without the driver's getting on the moving object, the remote unmanned driving mode includes a remote manual driving mode that the moving object receives the running condition generated by an operator by operating an operator input device provided at a place different from a place of the moving object, and thereby runs without the driver's getting on the moving object, and a remote autonomous driving mode that the moving object receives the running condition generated by a remote automatic control device provided at a place different from the place of the moving object, and thereby runs without an operation of any one of the driver input device and the operator input device, the remote manual control device includes a switching information acquisition unit that acquires at least one of (2a) abnormality information indicating that a state of the moving object has become an abnormal state, (2b) intrusion information indicating that a moving object has intruded a surrounding area set in advance to surroundings of the moving object, and (2c) failure information indicating that a failure has occurred during running in the remote autonomous driving mode, and a switching instruction unit that, when a predetermined first switching condition is satisfied, transmits to the moving object a first switching instruction for switching a driving mode of the moving object from the remote autonomous driving mode to the remote manual driving mode, and the first switching condition includes as a condition a case where, during the running in the remote autonomous driving mode, the moving object falls in a least one state of (1a) a first state where the state of the moving object has become the abnormal state, (1b) a second state where the moving object has intruded the surrounding area, (1c) a third state that is different from the first state and in which the failure has occurred during the running in the remote autonomous driving mode, wherein the first switching condition further includes as a condition a case where a number of the operators who can get on the moving object that runs in the remote manual driving mode, and operate the driver input device has become a predetermined number of people or more.

10. A remote operation device that remotely controls an operation of a moving object, comprising:

a remote manual control device; and an operator input device that is connected to the remote manual control device, wherein the moving object has a manned driving mode that a driver having got on the moving object operates a driver input device provided to the moving object, and thereby determines a running condition that defines a running operation of the moving object to run, and a remote unmanned driving mode that the moving object receives the running condition of the moving object from an outside of the moving object, and thereby runs without the driver's getting on the moving object, the remote unmanned driving mode includes a remote manual driving mode that the moving object receives the running condition generated by an operator by operating an operator input device provided at a place different from a place of the moving object, and thereby runs without the driver's getting on the moving object, and a remote autonomous driving mode that the moving object receives the running condition generated by a remote automatic control device provided at a place different from the place of the moving object, and thereby runs without an operation of any one of the driver input device and the operator input device, the remote manual control device includes a switching information acquisition unit that acquires at least one of (2a) abnormality information indicating that a state of the moving object has become an abnormal state, (2b) intrusion information indicating that a moving object has intruded a surrounding area set in advance to surroundings of the moving object, and (2c) failure information indicating that a failure has occurred during running in the remote autonomous driving mode, and a switching instruction unit that, when a predetermined first switching condition is satisfied, transmits to the moving object a first switching instruction for switching a driving mode of the moving object from the remote autonomous driving mode to the remote manual driving mode, and the first switching condition includes as a condition a case where, during the running in the remote autonomous driving mode, the moving object falls in at least one state of (1a) a first state where the state of the moving object has become the abnormal state, (1b) a second state where the moving object has intruded the surrounding area, (1c) a third state that is different from the first state and in which the failure has occurred during the running in the remote autonomous driving mode, wherein even when the first switching condition is satisfied, and when a number of the operators who can operate the operator input device is a predetermined number of people or less, the switching instruction unit transmits a stop instruction for stopping the moving object to the moving object without transmitting the first switching instruction to the moving object.

* * * * *